(12) United States Patent
Lee

(10) Patent No.: US 12,436,368 B2
(45) Date of Patent: Oct. 7, 2025

(54) IMAGING LENS SYSTEM

(71) Applicant: SAMSUNG ELECTRO-MECHANICS CO., LTD., Suwon-si (KR)

(72) Inventor: Da Ye Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 469 days.

(21) Appl. No.: 17/891,787

(22) Filed: Aug. 19, 2022

(65) Prior Publication Data

US 2023/0384561 A1 Nov. 30, 2023

(30) Foreign Application Priority Data

May 25, 2022 (KR) .......................... 10-2022-0064176

(51) Int. Cl.
*G02B 9/64* (2006.01)
*G02B 13/00* (2006.01)

(52) U.S. Cl.
CPC ........... *G02B 9/64* (2013.01); *G02B 13/0045* (2013.01)

(58) Field of Classification Search
None
See application file for complete search history.

(56) References Cited

U.S. PATENT DOCUMENTS

| | | |
|---|---|---|
| 2012/0056978 A1 | 3/2012 | Abe et al. |
| 2018/0196233 A1 | 7/2018 | Chang et al. |
| 2018/0196239 A1 | 7/2018 | Chang et al. |
| 2018/0259744 A1 | 9/2018 | Pao et al. |
| 2019/0278055 A1* | 9/2019 | Lin ........................... G02B 9/62 |
| 2019/0324232 A1 | 10/2019 | Yang et al. |
| 2020/0278516 A1* | 9/2020 | Hudyma ............ G02B 13/0045 |
| 2020/0301105 A1* | 9/2020 | Jung ....................... G02B 21/36 |
| 2020/0363609 A1 | 11/2020 | Bao et al. |
| 2021/0080694 A1* | 3/2021 | Yao ........................ G02B 13/06 |
| 2021/0191087 A1 | 6/2021 | Komiyama et al. |
| 2021/0239946 A1* | 8/2021 | Chang .................... G02B 5/208 |
| 2023/0288669 A1 | 9/2023 | Chen et al. |

FOREIGN PATENT DOCUMENTS

| | | |
|---|---|---|
| CN | 107193114 A | 9/2017 |
| CN | 108279476 A | 7/2018 |
| CN | 108469667 A | 8/2018 |

(Continued)

OTHER PUBLICATIONS

Taiwanese Office Action issued on Jan. 3, 2025 in corresponding Taiwanese Patent Application No. 113120674. (6 pages in English and 5 pages in Taiwanese).

(Continued)

*Primary Examiner* — Darryl J Collins
(74) *Attorney, Agent, or Firm* — NSIP Law

(57) ABSTRACT

An imaging lens system includes a first lens having refractive power; a second lens having a concave object-side surface; a third lens having refractive power; a fourth lens having a concave object-side surface; a fifth lens having refractive power; a sixth lens having a concave object-side surface; and a seventh lens having refractive power, wherein the first to the seventh lenses are disposed in sequential order from an object side, and wherein a field of view is 190 degrees or more.

19 Claims, 28 Drawing Sheets

(56) References Cited

FOREIGN PATENT DOCUMENTS

| | | | |
|---|---|---|---|
| CN | 108627949 | A | 10/2018 |
| CN | 109313323 | A | 2/2019 |
| CN | 110045491 | A | 7/2019 |
| CN | 110389428 | A | 10/2019 |
| CN | 112526727 | A | 3/2021 |
| CN | 112882209 | A | 6/2021 |
| CN | 112987263 | A | 6/2021 |
| CN | 113156627 | A | 7/2021 |
| CN | 114384665 | A | 4/2022 |
| JP | 5369867 | B2 | 12/2013 |
| JP | 6836211 | B2 | 2/2021 |
| JP | 2021-170145 | A | 10/2021 |
| TW | M564165 | U | 7/2018 |
| TW | 202030516 | A | 8/2020 |
| TW | I813196 | B | 8/2023 |
| WO | WO-2017213109 | A1 * | 12/2017 ............. G02B 13/04 |

OTHER PUBLICATIONS

Taiwanese Office Action issued on Dec. 11, 2023, in counterpart Taiwanese Patent Application No. 111132301 (14 pages in English, 8 pages in Chinese).

Korean Office Action issued on Aug. 2, 2024, in counterpart Korean Patent Application No. 10-2022-0064176 (9 pages in English, 7 pages in Korean).

Chinese Office Action issued on Feb. 26, 2025, in corresponding Chinese Patent Application No. 202211380497.5. (5pages in English, 10pages in Chinese).

Korean Office Action Issued on Apr. 23, 2025, in Counterpart Korean Patent Application No. 10-2022-0064176 (4 Pages in English, 4 Pages in Korean).

\* cited by examiner

IMAGING LENS SYSTEM

CROSS-REFERENCE TO RELATED APPLICATIONS

This application claims the benefit under 35 USC 119(a) of Korean Patent Application No. 10-2022-0064176 filed on May 25, 2022, in the Korean Intellectual Property Office, the entire disclosure of which is incorporated herein by reference for all purposes.

BACKGROUND

1. Field

Embodiments of the present disclosure relate to an imaging lens system which may be mounted on a camera requiring a wide field of view.

2. Description of the Background

Vehicles may include a camera to reduce damages to persons and property due to traffic accidents. For example, one or more cameras may be installed on a front bumper and a rear bumper of a vehicle to provide a driver with object information located in front of and behind the vehicle. Since it may be important for a vehicle camera to accurately recognize objects around a vehicle and to provide the information to a driver, an imaging lens system having high-resolution performance and a wide field of view may be necessary. However, it may not be easy to mount an imaging lens system having high resolution and a wide field of view in a vehicle camera due to a limitation of an installation position. For example, to implement a vehicle camera having a relatively low f number, a diameter of front lens and other lenses may need to be increased, but it may be difficult to change the lens size due to structural and design limitations of vehicle components (for example, bumpers) on which cameras are installed.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an imaging lens system includes a first lens having refractive power, a second lens having a concave object-side surface, a third lens having refractive power, a fourth lens having a concave object-side surface, a fifth lens having refractive power, a sixth lens having a concave object-side surface, and a seventh lens having refractive power, wherein the first to the seventh lenses are disposed in sequential order from an object side, and wherein a field of view is 190 degrees or more.

The first lens may have a convex object-side surface.
The third lens may have a convex image-side surface.
The fifth lens may have a convex object-side surface.
The seventh lens may have a convex object-side surface.

A conditional expression as follows may be satisfied: $0<f1/f2$, where f1 is a focal length of the first lens, and f2 is a focal length of the second lens.

A conditional expression as follows may be satisfied: $f1/f3<0$, where f1 is a focal length of the first lens, f3 is a focal length of the third lens.

A conditional expression as follows may be satisfied: $15<V1-V3$, where V1 is an Abbe number of the first lens, and V3 is an Abbe number of the third lens.

A conditional expression as follows may be satisfied: $30<V5-V6$, where V5 is an Abbe number of the fifth lens, and V6 is an Abbe number of the sixth lens.

A conditional expression as follows may be satisfied: $-168$ mm$<f1234<23.0$ mm, where f1234 is a combined focal length of the first to fourth lenses.

A conditional expression as follows may be satisfied: 3.5 mm$<f567<7.0$ mm, where f567 is a focal length of the fifth to seventh lenses.

In another general aspect, an imaging lens system includes a first lens having refractive power, a second lens having refractive power, a third lens having refractive power, a fourth lens having a concave object-side surface, a fifth lens having refractive power, a sixth lens having a concave object-side surface, and a seventh lens having refractive power, wherein the first to the seventh lenses are disposed in sequential order from an object side, and wherein f number is equal to or less than 1.9, and a field of view (FOV) is equal to or greater than 190 degrees.

A conditional expression as follows may be satisfied: $330°$ mm$<$FOV$*$f$<370°$ mm, where f is the focal length of the imaging lens system.

A conditional expression as follows may be satisfied: $0.6<f1/f2<2.0$, where f1 is a focal length of the first lens, and f2 is a focal length of the second lens.

A conditional expression as follows may be satisfied: $-3.0<R1/R3<-0.4$, where R1 is a radius of curvature of an object-side surface of the first lens, and R3 is a radius of curvature of an object-side surface of the second lens.

In another general aspect, an imaging lens system includes a first lens having negative refractive power and a convex object-side surface, a second lens having negative refractive power and a concave object-side surface, a third lens having positive refractive power and a convex image-side surface, a fourth lens having a concave object-side surface, a fifth lens having positive refractive power and a convex image-side surface, a sixth lens having negative refractive power and a concave object-side surface, and a seventh lens having positive refractive power and a convex object-side surface, wherein the first to the seventh lenses are disposed in sequential order from an object side.

The fourth lens may have positive refractive power.
The fourth lens may have negative refractive power.
F number may be equal to or less than 1.9, and a field of view (FOV) may be equal to or greater than 190 degrees.

Other features and aspects will be apparent from the following detailed description, the drawings, and the claims.

DETAILED DESCRIPTION

Figure 1:
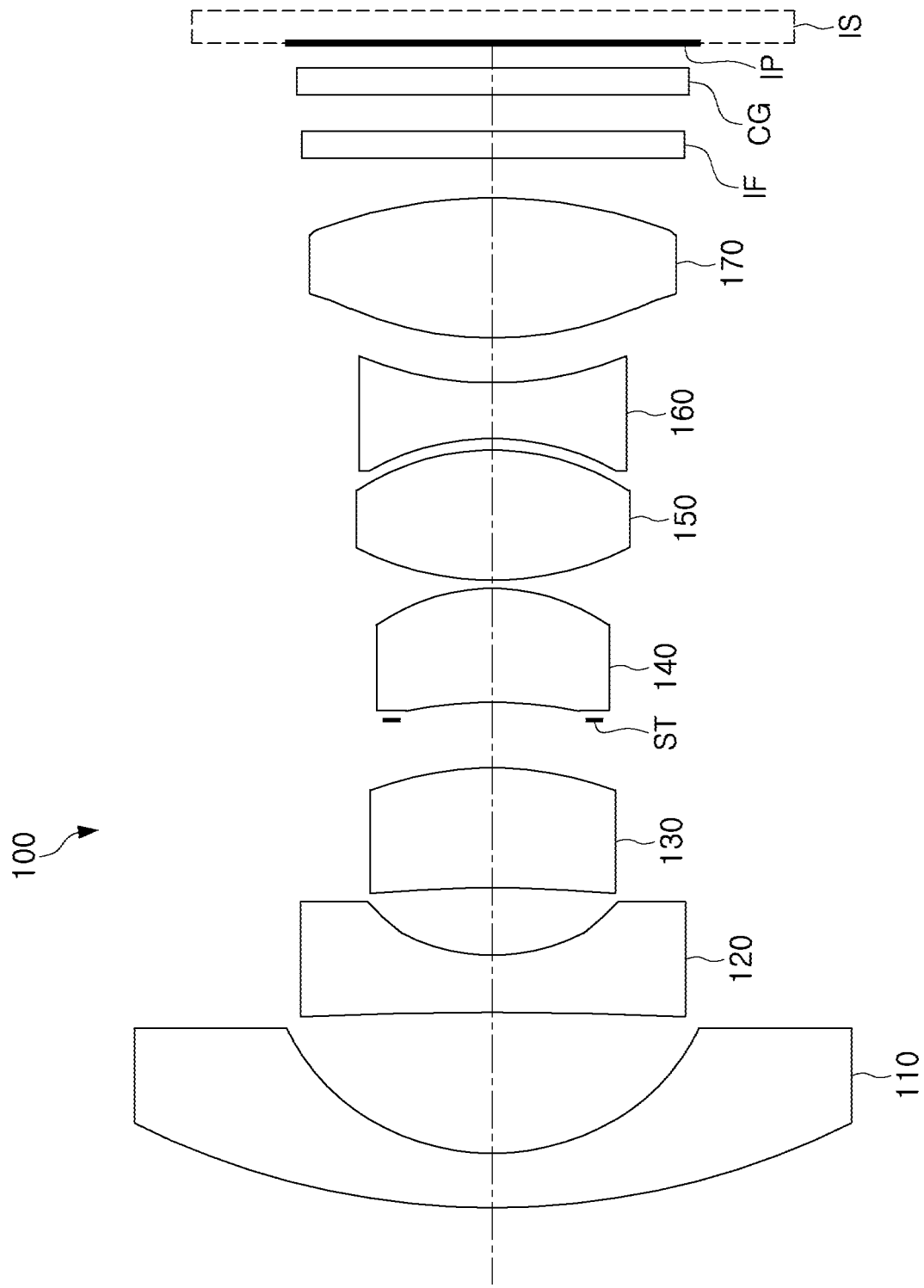
FIG. 1 is a diagram illustrating an imaging lens system according to a first embodiment of the present disclosure.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain sequence. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An embodiment of the present disclosure may provide an imaging lens system having high resolution and a wide field of view with less change of lens size than a conventional imaging lens system having high resolution and a wide field of view.

In the embodiments, a first lens refers to a lens most adjacent to an object (or a subject), and a seventh lens refers to a lens most adjacent to an imaging plane (or an image sensor). In the embodiments, a unit of a radius of curvature, a thickness, a TTL (a distance from an object-side surface of the first lens to an imaging plane), an ImgH (a height of an imaging plane), a focal length, and an effective diameter are indicated in millimeters (mm).

A thickness of a lens, a gap between lenses, and a TTL refer to a distance of a lens on an optical axis. Also, in the descriptions of a shape of a lens, a configuration in which one surface is convex indicates that a paraxial region of the surface is convex, while a configuration in which one surface is concave indicates that a paraxial region of the surface is concave. Thus, even when it is described that one surface of a lens is convex, an edge of the lens may be concave. Similarly, even when it is described that one surface of a lens is concave, an edge of the lens may be convex.

The imaging lens system described in embodiments may be configured to be mounted on a transportation device. For example, the imaging lens system may be mounted on a front and/or rear surveillance camera or an autonomous driving camera mounted on a passenger car, a truck, a fire truck, a forklift, or the like. However, the embodiments of the imaging lens system are not limited to the above-described examples. For example, the imaging lens system may be mounted on an imaging camera of a surveillance drone or a transportation drone.

The imaging lens system according to one or more embodiments may include a plurality of lenses. For example, the imaging lens system may include a first lens, a second lens, a third lens, a fourth lens, a fifth lens, a sixth lens, and a seventh lens disposed in sequential order from an object side. The imaging lens system according to the one or more embodiments may include one or more lenses having a concave object-side surface. For example, in the imaging lens system according to the one or more embodiments, at least one of the second lens, the fourth lens, and the sixth lens may have a concave object-side surface. As another example, in the imaging lens system according to the one or more embodiments, two or more of the second lens, the fourth lens, and the sixth lens may have a concave object-side surface. As another example, in the imaging lens system according to the one or more embodiments, each of the second lens, the fourth lens, and the sixth lens may have a concave object-side surface. The imaging lens system according to the one or more embodiments may be configured to have a relatively wide field of view (FOV). For example, the field of view of the imaging lens system according to the one or more embodiments may be 190 degrees or more.

The imaging lens system according to the one or more embodiments may include a plurality of lenses. For example, the imaging lens system may include a first lens, a second lens, a third lens, a fourth lens, a fifth lens, a sixth lens, and a seventh lens disposed in sequential order from an object side. The imaging lens system according to the one or more embodiments may include one or more lenses having a concave object-side surface. For example, in the imaging lens system according to the one or more embodiments, at least one of the fourth lens and the sixth lens may have a concave object-side surface. As another example, in the imaging lens system according to the one or more embodiments, each of the fourth lens and the sixth lens may have a concave object-side surface. The imaging lens system according to the one or more embodiments may have a relatively low f number. For example, the f number of the imaging lens system according to the one or more embodiments may be 1.9 or less. The imaging lens system according to the one or more embodiments may be configured to have a relatively wide field of view (FOV). For example, the field of view of the imaging lens system according to the one or more embodiments may be 190 degrees or more.

The imaging lens system according to the one or more embodiments may include a plurality of lenses. For example, the imaging lens system may include a first lens, a second lens, a third lens, a fourth lens, a fifth lens, a sixth lens, and a seventh lens disposed in sequential order from an object side. The imaging lens system according to the one or more embodiments may include a lens having negative refractive power. For example, in the imaging lens system according to the one or more embodiments, the first lens and the second lens may have negative refractive power. The imaging lens system according to the one or more embodiments may include two or more lenses having a concave object-side surface. For example, in the imaging lens system according to the one or more embodiments, each of the fourth lens and the sixth lens may have a concave object-side surface. The imaging lens system according to the one or more embodiments may generally have a relatively low f number. For example, the f number of the imaging lens system according to the one or more embodiments may be 1.9 or less.

The imaging lens system according to the one or more embodiments may be configured to satisfy one or more conditional expressions as below. For example, the imaging lens system according to the one or more embodiments may include seven lenses, and may satisfy at least two of conditional expressions as below. As another example, the imaging lens system according to the one or more embodiments may include seven lenses and may be configured to satisfy the entirety of conditional expressions as below. As another example, the imaging lens system according to the one or more embodiments may include the characteristics of one of the imaging lens systems according to the one or more embodiments described above and may satisfy one or more conditional expressions as below:

$HFOV/L1S1ED < 17.0$ $0.62 < L1S1ED/TTL$ $0 < f1/f2$ $f1/f3 < 0$ $-10\text{ mm}<f6<0\text{ mm}$ $15<V1-V3$ $30<V5-V6$ $320°\text{ mm}<HFOV*f$ $-167\text{ mm}<f1234<3.1\text{ mm}$ $3.5\text{ mm}<f567<5.0\text{ mm}$ $-1.0<f/f6<0$ In the conditional expressions above, HFOV is the horizontal field of view of the imaging lens system, f is the focal length of the imaging lens system, L1S1ED is the effective diameter of an object-side surface of the first lens, TTL is the distance from an object-side surface of the first lens to an imaging plane, f1 is the focal length of the first lens, f2 is the focal length of the second lens, f3 is the focal length of the third lens, f6 is the focal length of the sixth lens, f1234 is the combined focal length of the first to fourth lenses, f567 is the combined focal length of the fifth to seventh lenses, V1 is the Abbe number of the first lens, V3 is the Abbe number of the third lens, V5 is the Abbe number of the fifth lens, V6 is the Abbe number of the sixth lens, and f is the focal length of the imaging lens system.

The imaging lens system according to the one or more embodiments may be configured to satisfy one or more conditional expressions as below. For example, the imaging lens system according to the one or more embodiments may include seven lenses, and may satisfy two or more of conditional expressions as below. As another example, the imaging lens system according to the one or more embodiments may include seven lenses and may be configured to satisfy the entirety of conditional expressions as below. As another example, the imaging lens system according to the one or more embodiments may include the characteristics of one of the imaging lens systems according to the one or more embodiments described above and may satisfy one or more conditional expressions as below:

$330°\text{ mm}<HFOV*f<370°\text{ mm}$ $-4.0<f1/f<-3.0$ $0.6<f1/f2<2.0$ $-2.0<f1/f3<0$ $-2.0<f1/f4<0.1$ $-2.0<f5/f6<-1.0$ $8<V1-V3<30$ $30<V5-V6<40$ $0.2<\text{ImgHT}/TTL<0.3$ $8.0<HFOV/TTL<12.0$ $-168\text{ mm}<f1234<23.0\text{ mm}$ $3.5\text{ mm}<f567<7.0\text{ mm}$ $2.6\text{ mm}<HImH<3.2\text{ mm}$ In the conditional expression above, f4 is the focal length of the fourth lens, f5 is the focal length of the fifth lens, ImgHT is the height of the imaging plane, FOV is the field of view of the imaging lens system, and HImH is the horizontal height of the imaging plane.

The imaging lens system according to the one or more embodiments may be configured to satisfy one or more conditional expressions as below. For example, the imaging lens system according to the one or more embodiments may include seven lenses, and may satisfy two or more of conditional expressions as below. As another example, the imaging lens system according to the one or more embodiments may include seven lenses and may be configured to satisfy the entirety of conditional expressions as below. As another example, the imaging lens system according to the one or more embodiments may include the characteristics of one of the imaging lens systems according to the one or more embodiments described above and may satisfy one or more conditional expressions as below:

$-3.0<R1/R3<-0.4$ $-6.0<R3/R4<-0.6$ $0.2<(R3+R4)/(R3-R4)<0.8$ $0.8<(R5+R6)/(R5-R6)<2.3$ $1.0<(R7+R8)/(R7-R8)<4.0$ $1.0<(T2+T3)/D23<4.0$ $2.0<(T3+T4)/D34<10.0$ $10<(T4+T5)/D45<40$ $0.9<T3/D34<6.0$ $5.0<14/D45<18.0$ $1.0<D23/D67<20$ $0.1<D45/D67<3.0$

In the conditional expression above, R1 is the radius of curvature of an object-side surface of the first lens, R3 is the radius of curvature of an object-side surface of the second lens, R4 is the radius of curvature of an image-side surface of the second lens, R5 is the radius of curvature of an object-side surface of the third lens, R6 is the radius of curvature of an image-side surface of the third lens, R7 is the radius of curvature of an image-side surface of the fourth lens, R8 is the radius of curvature of an image-side surface of the fourth lens, T2 is the thickness at the center of the optical axis of the second lens, T3 is the thickness at the center of the optical axis of the third lens, T4 is the thickness at the center of the optical axis of the fourth lens, T5 is the thickness at the center of the optical axis of the fifth lens, D23 is the distance from an image-side surface of the second lens to an object-side surface of the third lens, D34 is the distance from the image-side surface of the third lens to an object-side surface of the fourth lens, D45 is the distance from the image-side surface of the third lens to an object-side surface of the fifth lens, and D67 is the distance from the image-side surface of the sixth lens to an object-side surface of the seventh lens.

The imaging lens system according to the embodiments may include one or more lenses having the characteristics as below, if desired. For example, the imaging lens system according to the one or more embodiments may include one of the first to seventh lenses according to the characteristics as below. As another example, the imaging lens systems according to the one or more embodiments may include one or more of the first to seventh lenses according to the characteristics as below. However, the imaging lens system according to the above-described form does not necessarily include the lens according to the characteristics as below. Hereinafter, the characteristics of the first to seventh lenses will be described.

The first lens may have refractive power. For example, the first lens may have negative refractive power. One surface of the first lens may be convex. For example, the first lens may have a convex object-side surface. The first lens may include a spherical surface. For example, both surfaces of the first lens may be spherical. The first lens may be formed of a material having high light transmittance and excellent workability. For example, the first lens may be formed of a plastic material or a glass material. The first lens may be configured to have a predetermined refractive index. For example, the refractive index of the first lens may be greater than 1.7. As a specific example, the refractive index of the first lens may be greater than 1.72 and less than 1.84. The first lens may have a predetermined Abbe number. For example, the Abbe number of the first lens may be 40 or more. As a specific example, the Abbe number of the first lens may be greater than 40 and less than 60.

The second lens may have refractive power. For example, the second lens may have negative refractive power. One surface of the second lens may be concave. For example, the second lens may have a concave object-side surface. The second lens may include an aspherical surface. For example, both surfaces of the second lens may be aspherical. The second lens may include an inflection point. For example, an inflection point may be formed on an object-side surface of the second lens. The second lens may be formed of a material having high light transmittance and excellent workability. For example, the second lens may be formed of a plastic material or a glass material. The second lens may be configured to have a predetermined refractive index. For example, the refractive index of the second lens may be greater than 1.5. As a specific example, the refractive index of the second lens may be greater than 1.52 and less than 1.62. The second lens may have a predetermined Abbe number. For example, the Abbe number of the second lens may be 50 or more. As a specific example, the Abbe number of the second lens may be greater than 50 and less than 64.

The third lens may have refractive power. For example, the third lens may have positive refractive power. One surface of the third lens may be convex. For example, the third lens may have a convex image-side surface. The third lens may include an aspherical surface. For example, both surfaces of the third lens may be aspherical. The third lens may be formed of a material having high light transmittance and excellent workability. For example, the third lens may be formed of a plastic material or a glass material. The third lens may be configured to have a predetermined refractive index. For example, the refractive index of the third lens may be greater than 1.6 and less than 1.7. The third lens may have a predetermined Abbe number. For example, the Abbe number of the third lens may be greater than 20 and less than 40.

The fourth lens may have refractive power. For example, the fourth lens may have positive or negative refractive power. One surface of the fourth lens may be concave. For example, the fourth lens may have a concave object-side surface. The fourth lens may include an aspherical surface. For example, both surfaces of the fourth lens may be aspherical. The fourth lens may include an inflection point. For example, an inflection point may be formed on an object-side surface of the fourth lens. The fourth lens may be formed of a material having high light transmittance and excellent workability. For example, the fourth lens may be formed of a plastic material or a glass material. The fourth lens may be configured to have a predetermined refractive index. For example, the refractive index of the fourth lens may be greater than 1.46 and less than 1.56. The fourth lens may have a predetermined Abbe number. For example, the Abbe number of the fourth lens may be greater than 50 and less than 64.

The fifth lens may have refractive power. For example, the fifth lens may have positive refractive power. One surface of the fifth lens may be convex. For example, the fifth lens may have a convex image-side surface. The fifth lens may include an aspherical surface. For example, both surfaces of the fifth lens may be aspherical. The fifth lens may be formed of a material having high light transmittance and excellent workability. For example, the fifth lens may be formed of a plastic material or a glass material. The fifth lens may be configured to have a predetermined refractive index. For example, the refractive index of the fifth lens may be greater than 1.4. As a specific example, the refractive index of the fifth lens may be greater than 1.48 and less than 1.64. The fifth lens may have a predetermined Abbe number. For example, the Abbe number of the fifth lens may be 50 or more. As a specific example, the Abbe number of the fifth lens may be greater than 50 and less than 64.

The sixth lens may have refractive power. For example, the sixth lens may have negative refractive power. One surface of the sixth lens may be concave. As an example, the sixth lens may have a concave object-side surface. The sixth lens may include an aspherical surface. For example, both surfaces of the sixth lens may be spherical. The sixth lens may be formed of a material having high light transmittance and excellent workability. For example, the sixth lens may be formed of a plastic material or a glass material. The sixth lens may be configured to have a predetermined refractive index. For example, the refractive index of the sixth lens may be greater than 1.60 and less than 1.74. The sixth lens may have a predetermined Abbe number. For example, the Abbe number of the sixth lens may be greater than 16 and less than 30. The sixth lens may have stronger refractive power than those of other lenses. For example, the sixth lens may have the smallest absolute value of the focal lengths of the first to seventh lenses.

The seventh lens may have refractive power. For example, the seventh lens may have positive refractive power. One surface of the seventh lens may be convex. For example, the seventh lens may have a convex object-side surface. The seventh lens may include an aspherical surface. For example, both surfaces of the seventh lens may be aspherical. The seventh lens may be formed of a material having high light transmittance and excellent workability. For example, the seventh lens may be formed of a plastic material or a glass material. The seventh lens may be configured to have a predetermined refractive index. For example, the refractive index of the seventh lens may be greater than 1.50 and less than 1.64. The seventh lens may have a predetermined Abbe number. For example, the Abbe number of the seventh lens may be greater than 50 and less than 64.

The aspherical surface of the aforementioned lenses may be represented by Equation 1.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} \qquad \text{Equation 1}$$

In Equation 1, c is the reciprocal of the radius of curvature of the corresponding lens, k is the conic constant, r is the distance from one point on the aspherical surface to the optical axis, A to H and J are aspherical constants, and Z (or SAG) is the height from one point on the aspherical surface to the apex of the aspherical surface in the optical axis direction.

The imaging lens system according to the aforementioned one or more embodiments may further include a stop, a filter, and a cover glass. As an example, the imaging lens system may further include a stop disposed on the third lens and the fourth lens. The stop may be configured to adjust the amount of light incident in the direction of the imaging plane. As another example, the imaging lens system may further include a filter and a cover glass disposed between the seventh lens and the imaging plane. The filter may be configured to block light of a specific wavelength, and the cover glass may be configured to block foreign substances entering in the direction of the imaging plane. The filter described herein may be configured to block infrared rays, but may be configured to block ultraviolet rays if desired.

Hereinafter, a specific embodiment of the imaging lens system will be described with reference to the drawings.

An imaging lens system according to a first embodiment will be described with reference to FIG. 1.

The imaging lens system 100 may include a first lens 110, a second lens 120, a third lens 130, a fourth lens 140, a fifth lens 150, a sixth lens 160, and a seventh lens 170.

The first lens 110 may have negative refractive power, and may have a convex object-side surface and a concave image-side surface. The second lens 120 may have negative refractive power, and may have a concave object-side surface and a concave image-side surface.

The third lens 130 may have positive refractive power, and may have a concave object-side surface and a convex image-side surface. The fourth lens 140 may have positive refractive power, and may have a concave object-side surface and a convex image-side surface. The fifth lens 150 may have positive refractive power, and may have a convex object-side surface and a convex image-side surface. The sixth lens 160 may have negative refractive power, and may have a concave object-side surface and a concave image-side surface. The seventh lens 170 may have positive refractive power, and may have a convex object-side surface and a convex image-side surface.

The imaging lens system 100 may include a lens having an inflection point. For example, an inflection point may be formed on an object-side surface of the second lens 120 in the imaging lens system 100 according to the embodiment. However, the lens in which the inflection point is formed is not limited to the second lens 120.

The imaging lens system 100 may further include a stop ST, a filter IF, a cover glass CG, and an imaging plane IP. The stop ST may be disposed between the third lens 130 and the fourth lens 140, and the filter IF and the cover glass CG may be disposed in this order between the seventh lens 170 and the imaging plane IP. The imaging plane IP may be formed on one surface of the image sensor IS of the camera module or in the image sensor IS.

Figure 2:
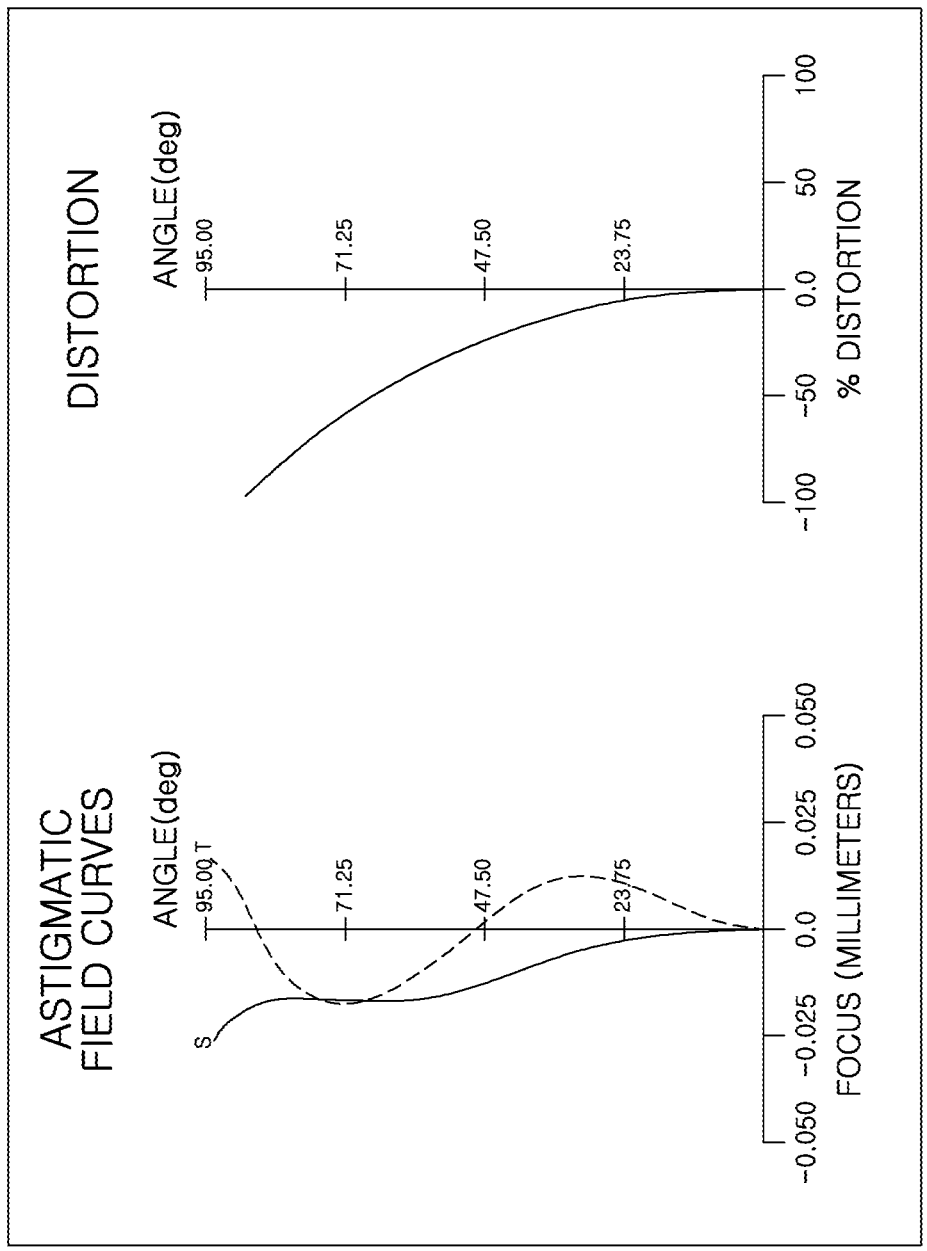
FIG. 2 displays aberration curves of the imaging lens system illustrated in FIG. 1.

Tables 1 and 2 list characteristics of the lenses and aspheric values of the imaging lens system according to the embodiment, and FIG. 2 displays aberration curves of the imaging lens system according to the embodiment.

TABLE 1

| Surface No. | Components | Radius of Curvature | Thickness/ Distance | Refractive Index | Abbe Number | Effective Radius |
|---|---|---|---|---|---|---|
| S1 | 1st lens | 12.0630 | 0.8000 | 1.776 | 49.6 | 5.322 |
| S2 | | 3.5000 | 2.0830 | | | 3.084 |
| S3 | 2nd lens | −9.8760 | 0.8000 | 1.539 | 56.0 | 2.871 |
| S4 | | 3.9380 | 0.9890 | | | 1.878 |
| S5 | 3rd lens | −13.5100 | 1.7800 | 1.677 | 28.2 | 1.844 |
| S6 | | −4.0270 | 0.6640 | | | 1.667 |
| S7 | Stop | Infinity | 0.2790 | | | 1.302 |
| S8 | 4th lens | −5.6880 | 1.6660 | 1.539 | 56.0 | 1.325 |
| S9 | | −3.0780 | 0.1100 | | | 1.723 |
| S10 | 5th lens | 4.2210 | 1.8890 | 1.537 | 56.1 | 1.919 |
| S11 | | −3.7580 | 0.1800 | | | 1.931 |
| S12 | 6th lens | −4.1330 | 0.8000 | 1.668 | 20.4 | 1.856 |
| S13 | | 4.9660 | 0.6540 | | | 2.013 |
| S14 | 7th lens | 4.6660 | 2.0360 | 1.539 | 56.0 | 2.532 |
| S15 | | −6.5940 | 0.6000 | | | 2.727 |
| S16 | Filter | Infinity | 0.4000 | 1.519 | 64.2 | 2.838 |
| S17 | | Infinity | 0.5000 | | | 2.865 |
| S18 | Cover glass | Infinity | 0.4000 | 1.500 | 67.0 | 2.917 |
| S19 | | Infinity | 0.3720 | | | 2.945 |
| S20 | Imaging plane | Infinity | 0.0000 | | | 2.987 |

TABLE 2

| Surface No. | S3 | S4 | S5 | S6 | S8 | S9 |
|---|---|---|---|---|---|---|
| K | 0 | 0 | 0 | 0 | 0 | 0 |
| A | 1.739E−02 | 3.028E−02 | 3.757E−03 | 1.285E−02 | 1.846E−02 | 1.228E−03 |
| B | −2.832E−03 | 1.705E−05 | 1.055E−03 | −6.083E−04 | −6.337E−03 | −3.674E−04 |
| C | 2.053E−04 | 8.705E−06 | −6.701E−05 | −1.339E−04 | 7.892E−04 | −2.963E−05 |
| D | −5.396E−06 | −8.959E−05 | −7.083E−05 | 5.373E−06 | −1.422E−04 | 0.000E+00 |

| Surface No. | S10 | S11 | S12 | S13 | S14 | S15 |
|---|---|---|---|---|---|---|
| K | 0 | 0 | 0 | 0 | −8.762E−01 | −1.030E+01 |
| A | −6.676E−03 | −1.132E−02 | −5.399E−03 | 4.555E−03 | −2.806E−03 | −3.320E−03 |
| B | 7.200E−04 | 7.159E−03 | 3.918E−03 | −2.389E−03 | 1.854E−04 | 8.473E−04 |
| C | 7.777E−05 | −1.457E−03 | −9.861E−04 | 4.816E−04 | 1.040E−05 | −6.446E−05 |
| D | −1.018E−05 | 1.005E−04 | 4.242E−05 | −3.977E−05 | −3.741E−06 | −7.610E−07 |

Figure 3:
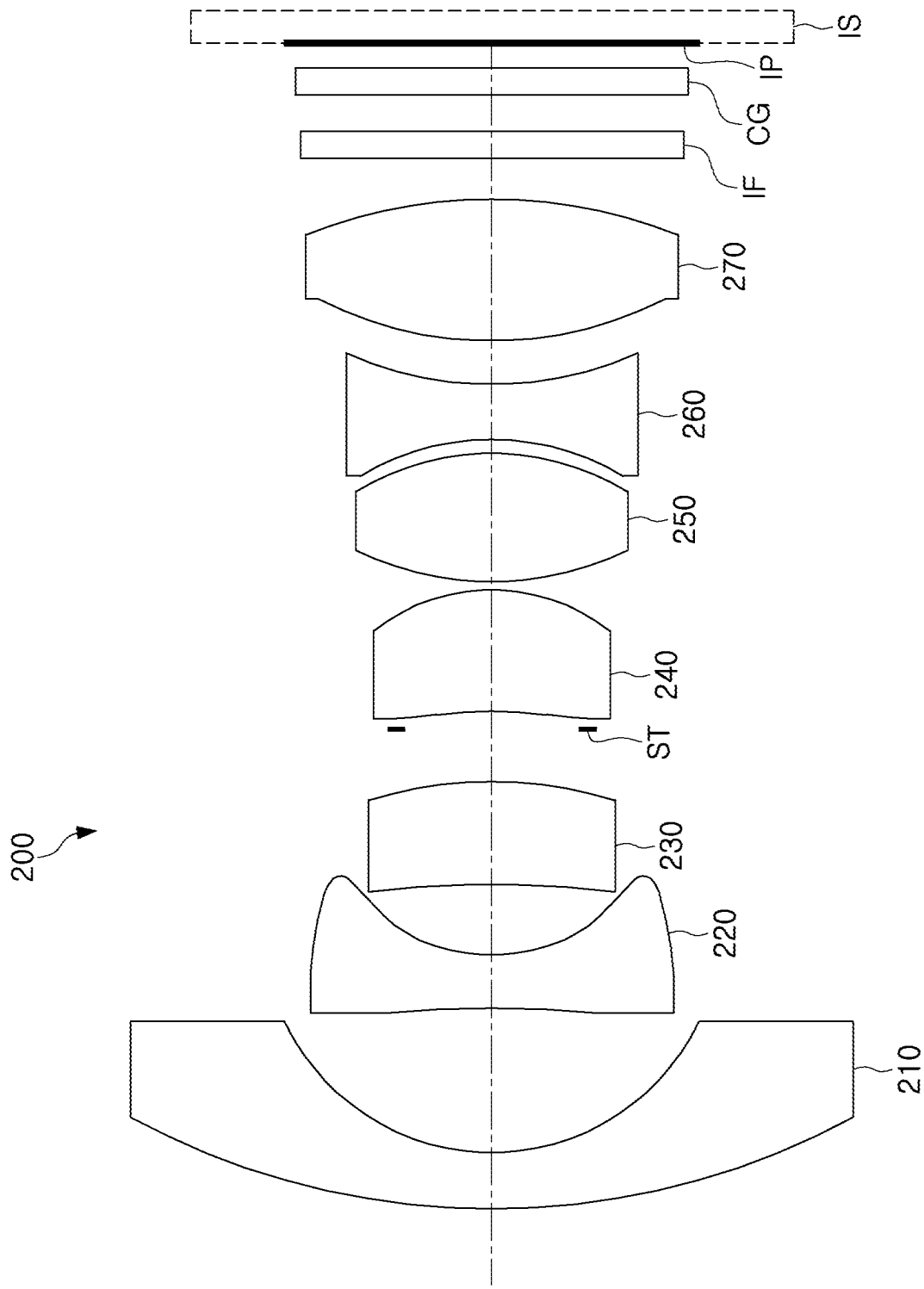
FIG. 3 is a diagram illustrating an imaging lens system according to a second embodiment of the present disclosure.

An imaging lens system according to a second embodiment will be described with reference to FIG. 3.

The imaging lens system 200 may include a first lens 210, a second lens 220, a third lens 230, a fourth lens 240, a fifth lens 250, a sixth lens 260, and a seventh lens 270.

The first lens 210 may have negative refractive power, and may have a convex object-side surface and a concave image-side surface. The second lens 220 may have negative refractive power, and may have a concave object-side surface and a concave image-side surface. The third lens 230 may have positive refractive power, and may have a concave object-side surface and a convex image-side surface. The fourth lens 240 may have positive refractive power, and may have a concave object-side surface and a convex image-side surface. The fifth lens 250 may have positive refractive power, and may have a convex object-side surface and a convex image-side surface. The sixth lens 260 may have negative refractive power, and may have a concave object-side surface and a concave image-side surface. The seventh lens 270 may have positive refractive power, and may have a convex object-side surface and a convex image-side surface.

The imaging lens system 200 may include a lens having an inflection point. For example, an inflection point may be formed on an object-side surface of the second lens 220 in the imaging lens system 200 according to the embodiment.

However, the lens in which the inflection point is formed is not limited to the second lens 220.

The imaging lens system 200 may further include a stop ST, a filter IF, a cover glass CG, and an imaging plane IP. The stop ST may be disposed between the third lens 230 and the fourth lens 240, and the filter IF and the cover glass CG may be disposed in this order between the seventh lens 270 and the imaging plane IP. The imaging plane IP may be formed on one surface of the image sensor IS of the camera module or in the image sensor IS.

Figure 4:
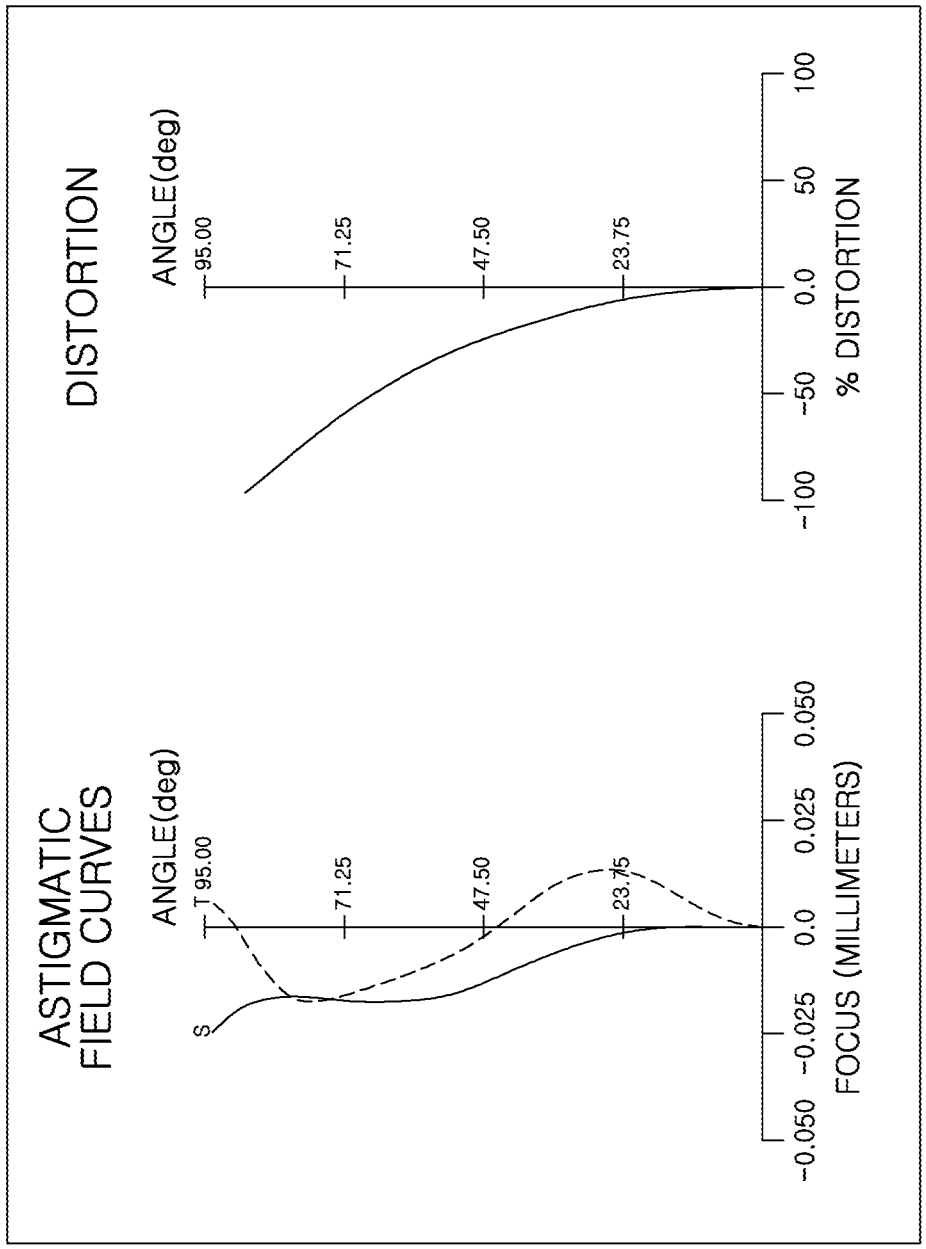
FIG. 4 displays aberration curves of the imaging lens system illustrated in FIG. 3.

Tables 3 and 4 list characteristics of the lenses and aspheric values of the imaging lens system according to the embodiment, and FIG. 4 displays aberration curves of the imaging lens system according to the embodiment.

TABLE 3

| Surface No. | Components | Radius of Curvature | Thickness/Distance | Refractive Index | Abbe Number | Effective Radius |
|---|---|---|---|---|---|---|
| S1 | 1st lens | 11.7850 | 0.8000 | 1.776 | 49.6 | 5.392 |
| S2 | | 3.5000 | 2.0980 | | | 3.111 |
| S3 | 2nd lens | −10.4950 | 0.8000 | 1.539 | 56.0 | 2.908 |
| S4 | | 3.7740 | 1.0040 | | | 1.890 |
| S5 | 3rd lens | −13.5990 | 1.5060 | 1.751 | 24.8 | 1.857 |
| S6 | | −4.8070 | 0.7780 | | | 1.674 |
| S7 | Stop | Infinity | 0.2450 | | | 1.288 |
| S8 | 4th lens | −7.3570 | 1.7880 | 1.539 | 56.0 | 1.353 |
| S9 | | −3.0760 | 0.1100 | | | 1.792 |
| S10 | 5th lens | 4.2470 | 1.9130 | 1.537 | 56.1 | 2.051 |
| S11 | | −3.8150 | 0.1800 | | | 2.056 |
| S12 | 6th lens | −4.0380 | 0.8000 | 1.668 | 20.4 | 1.978 |
| S13 | | 5.1410 | 0.6010 | | | 2.200 |
| S14 | 7th lens | 4.7800 | 2.0810 | 1.539 | 56.0 | 2.641 |
| S15 | | −6.1310 | 0.6000 | | | 2.795 |
| S16 | Filter | Infinity | 0.4000 | 1.519 | 64.2 | 2.875 |
| S17 | | Infinity | 0.5000 | | | 2.894 |
| S18 | Cover glass | Infinity | 0.4000 | 1.500 | 67.0 | 2.931 |
| S19 | | Infinity | 0.3960 | | | 2.950 |
| S20 | Imaging plane | Infinity | 0.0000 | | | 2.986 |

TABLE 4

| Surface No. | S3 | S4 | S5 | S6 | S8 | S9 |
|---|---|---|---|---|---|---|
| K | 0 | 0 | 0 | 0 | 0 | 0 |
| A | 1.706E−02 | 3.017E−02 | 5.072E−03 | 1.205E−02 | 1.670E−02 | 8.562E−04 |
| B | −2.689E−03 | −3.241E−04 | 1.332E−03 | 2.749E−04 | −4.957E−03 | −7.523E−05 |
| C | 1.891E−04 | 5.084E−04 | −1.641E−04 | −4.299E−04 | 4.041E−04 | −8.744E−05 |
| D | −4.686E−06 | −2.010E−04 | −9.119E−05 | 2.965E−05 | −1.049E−04 | 0.000E+00 |

| Surface No. | S10 | S11 | S12 | S13 | S14 | S15 |
|---|---|---|---|---|---|---|
| K | 0 | 0 | 0 | 0 | −7.237E−01 | −1.541E+01 |
| A | −6.579E−03 | −1.326E−02 | −7.668E−03 | 3.565E−03 | −2.606E−03 | −5.910E−03 |
| B | 5.735E−04 | 8.382E−03 | 5.976E−03 | −1.681E−03 | 2.820E−04 | 1.481E−03 |
| C | 7.225E−05 | −1.726E−03 | −1.560E−03 | 2.111E−04 | −1.405E−05 | −1.341E−04 |
| D | −5.930E−06 | 1.200E−04 | 9.371E−05 | −1.299E−05 | −2.104E−06 | 2.281E−06 |

Figure 5:
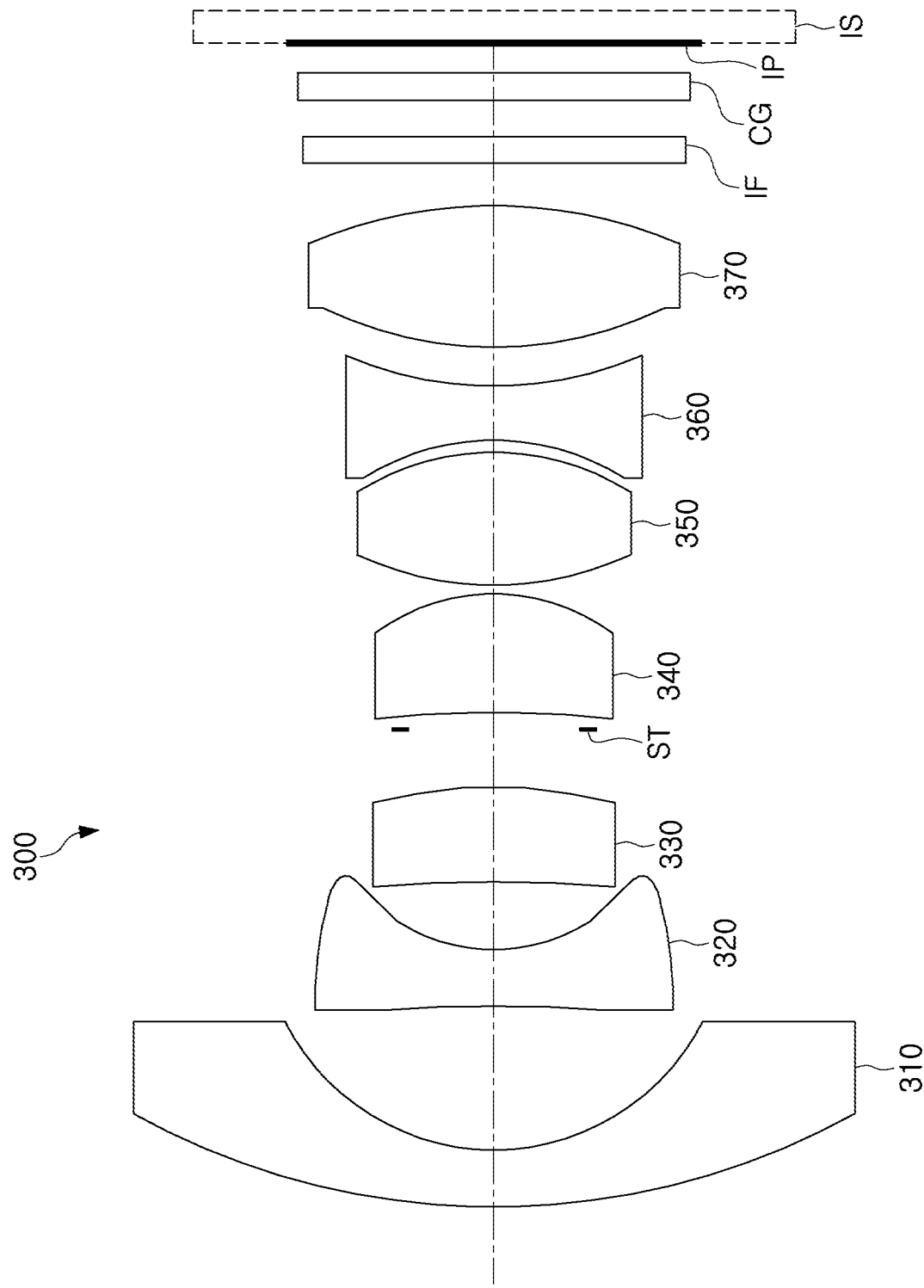
FIG. 5 is a diagram illustrating an imaging lens system according to a third embodiment of the present disclosure.

An imaging lens system according to a third embodiment will be described with reference to FIG. 5.

The imaging lens system 300 may include a first lens 310, a second lens 320, a third lens 330, a fourth lens 340, a fifth lens 350, a sixth lens 360, and a seventh lens 370.

The first lens 310 may have negative refractive power, and may have a convex object-side surface and a concave image-side surface. The second lens 320 may have negative refractive power, and may have a concave object-side surface and a concave image-side surface. The third lens 330 may have positive refractive power, and may have a concave object-side surface and a convex image-side surface. The fourth lens 340 may have positive refractive power, and may have a concave object-side surface and a convex image-side surface. The fifth lens 350 may have positive refractive power, and may have a convex object-side surface and a convex image-side surface. The sixth lens 360 may have negative refractive power, and may have a concave object-side surface and a concave image-side surface. The seventh lens 370 may have positive refractive power, and may have a convex object-side surface and a convex image-side surface.

The imaging lens system 300 may include a lens having an inflection point. For example, an inflection point may be formed on an object-side surface of the second lens 320 in and the imaging plane IP. The imaging plane IP may be formed on one surface of the image sensor IS of the camera module or in the image sensor IS.

Figure 6:
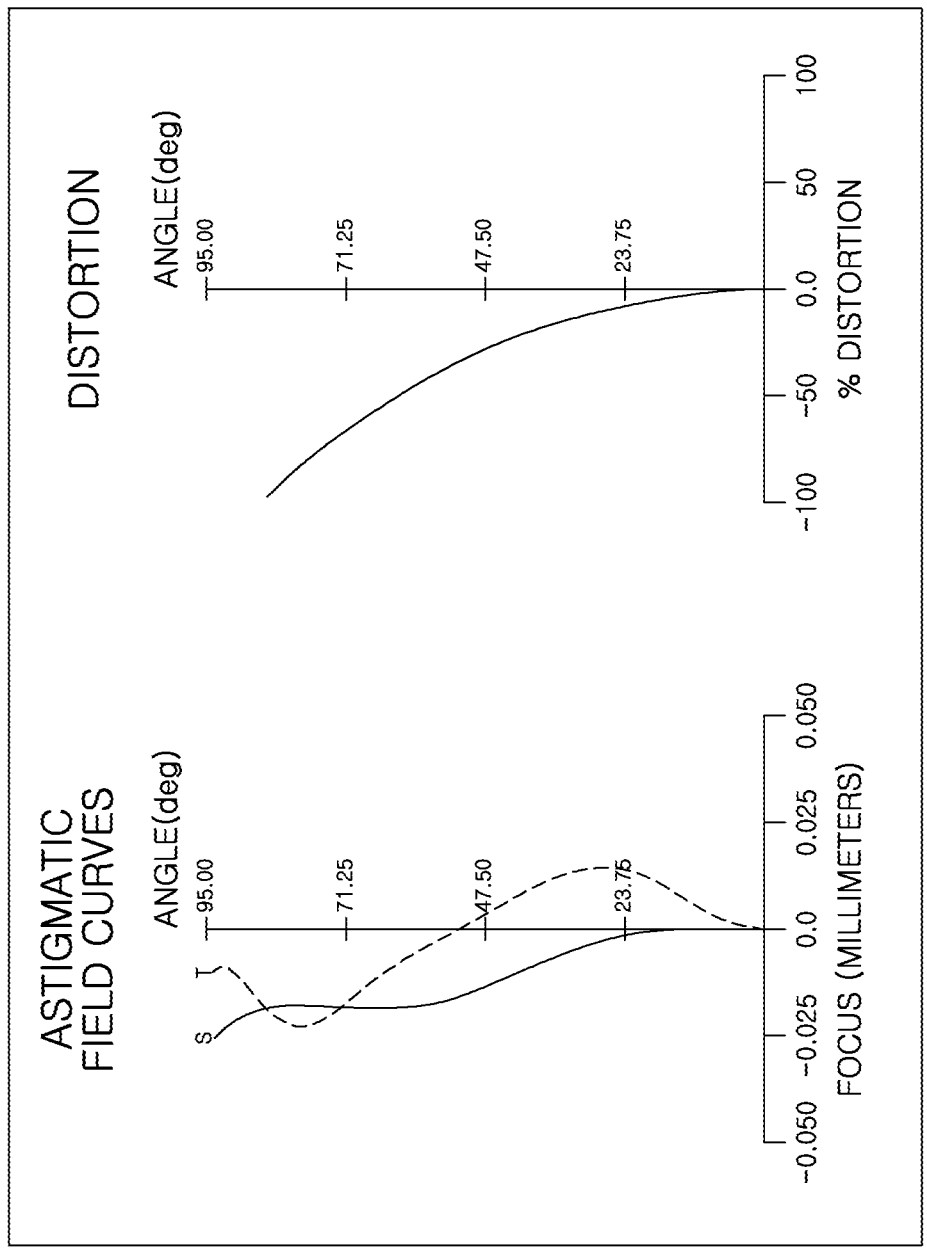
FIG. 6 displays aberration curves of the imaging lens system illustrated in FIG. 5.

Tables 5 and 6 list characteristics of the lenses and aspheric values of the imaging lens system according to the embodiment, and FIG. 6 displays aberration curves of the imaging lens system according to the embodiment.

TABLE 5

| Surface No. | Components | Radius of Curvature | Thickness/ Distance | Refractive Index | Abbe Number | Effective Radius |
|---|---|---|---|---|---|---|
| S1 | 1st lens | 11.4840 | 0.8000 | 1.776 | 49.6 | 5.412 |
| S2 | | 3.5000 | 2.1510 | | | 3.121 |
| S3 | 2nd lens | −9.3560 | 0.8000 | 1.539 | 56.0 | 2.908 |
| S4 | | 3.7890 | 0.9950 | | | 1.872 |
| S5 | 3rd lens | −13.7630 | 1.3860 | 1.778 | 23.9 | 1.830 |
| S6 | | −5.0730 | 0.8250 | | | 1.660 |
| S7 | Stop | Infinity | 0.2650 | | | 1.290 |
| S8 | 4th lens | −8.4890 | 1.7440 | 1.539 | 56.0 | 1.376 |
| S9 | | −3.0490 | 0.1100 | | | 1.793 |
| S10 | 5th lens | 4.4200 | 1.9370 | 1.537 | 56.1 | 2.023 |
| S11 | | −3.8480 | 0.1800 | | | 2.016 |
| S12 | 6th lens | −4.0190 | 0.8000 | 1.668 | 20.4 | 1.955 |
| S13 | | 5.2780 | 0.5480 | | | 2.207 |
| S14 | 7th lens | 5.0060 | 2.1090 | 1.539 | 56.0 | 2.587 |
| S15 | | −5.5280 | 0.6000 | | | 2.756 |
| S16 | Filter | Infinity | 0.4000 | 1.519 | 64.2 | 2.856 |
| S17 | | Infinity | 0.5000 | | | 2.879 |
| S18 | Cover glass | Infinity | 0.4000 | 1.500 | 67.0 | 2.923 |
| S19 | | Infinity | 0.4510 | | | 2.946 |
| S20 | Imaging plane | Infinity | 0.0000 | | | 2.991 |

TABLE 6

| Surface No. | S3 | S4 | S5 | S6 | S8 | S9 |
|---|---|---|---|---|---|---|
| K | 0 | 0 | 0 | 0 | 0 | 0 |
| A | 1.678E−02 | 2.943E−02 | 5.113E−03 | 1.178E−02 | 1.609E−02 | 8.056E−04 |
| B | −2.568E−03 | −2.137E−04 | 1.697E−03 | 6.915E−04 | −4.557E−03 | 9.917E−05 |
| C | 1.816E−04 | 6.929E−04 | −2.793E−04 | −5.354E−04 | 3.441E−04 | −1.505E−04 |
| D | −4.561E−06 | −2.495E−04 | −9.241E−05 | 3.816E−05 | −1.128E−04 | 0.000E+00 |

| Surface No. | S10 | S11 | S12 | S13 | S14 | S15 |
|---|---|---|---|---|---|---|
| K | 0 | 0 | 0 | 0 | −7.590E−01 | −1.207E+01 |
| A | −6.867E−03 | −1.461E−02 | −8.673E−03 | 3.555E−03 | −2.713E−03 | −6.829E−03 |
| B | 7.591E−04 | 9.317E−03 | 6.743E−03 | −1.669E−03 | 3.144E−04 | 1.491E−03 |
| C | 9.178E−06 | −1.920E−03 | −1.723E−03 | 1.777E−04 | −1.883E−05 | −1.225E−04 |
| D | 5.503E−07 | 1.299E−04 | 9.972E−05 | −1.017E−05 | −2.170E−06 | 1.677E−06 |

Figure 7:
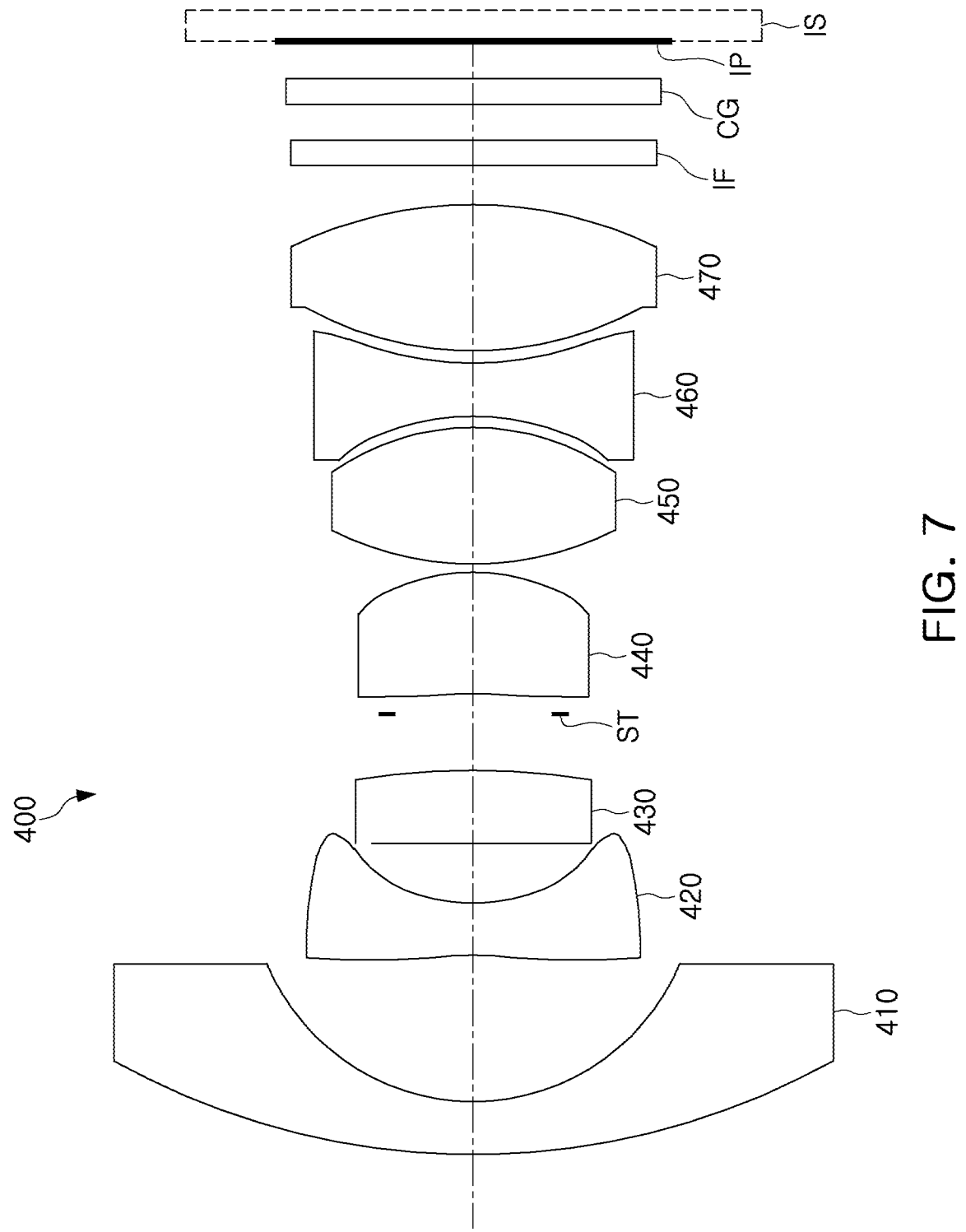
FIG. 7 is a diagram illustrating an imaging lens system according to a fourth embodiment of the present disclosure.

An imaging lens system according to a fourth embodiment will be described with reference to FIG. 7.

The imaging lens system 400 may include a first lens 410, a second lens 420, a third lens 430, a fourth lens 440, a fifth lens 450, a sixth lens 460, and a seventh lens 470.

The first lens 410 may have negative refractive power, and may have a convex object-side surface and a concave image-side surface. The second lens 420 may have negative refractive power, and may have a concave object-side surface and a concave image-side surface. The third lens 430 may have positive refractive power, and may have a concave object-side surface and a convex image-side surface. The fourth lens 440 may have positive refractive power, and may have a concave object-side surface and a convex image-side surface. The fifth lens 450 may have positive refractive power, and may have a convex object-side surface and a convex image-side surface. The sixth lens 460 may have negative refractive power, and may have a concave object-side surface and a concave image-side surface. The seventh lens 470 may have positive refractive power, and may have a convex object-side surface and a convex image-side surface.

The imaging lens system 400 may include a lens having an inflection point. For example, an inflection point may be formed on an object-side surface of the second lens 420 in the imaging lens system 400 according to the embodiment. However, the lens in which the inflection point is formed is not limited to the second lens 420.

The imaging lens system 400 may further include a stop ST, a filter IF, a cover glass CG, and an imaging plane IP. The stop ST may be disposed between the third lens 430 and the fourth lens 440, and the filter IF and the cover glass CG may be disposed in this order between the seventh lens 470 and the imaging plane IP. The imaging plane IP may be formed on one surface of the image sensor IS of the camera module or in the image sensor IS.

Figure 8:
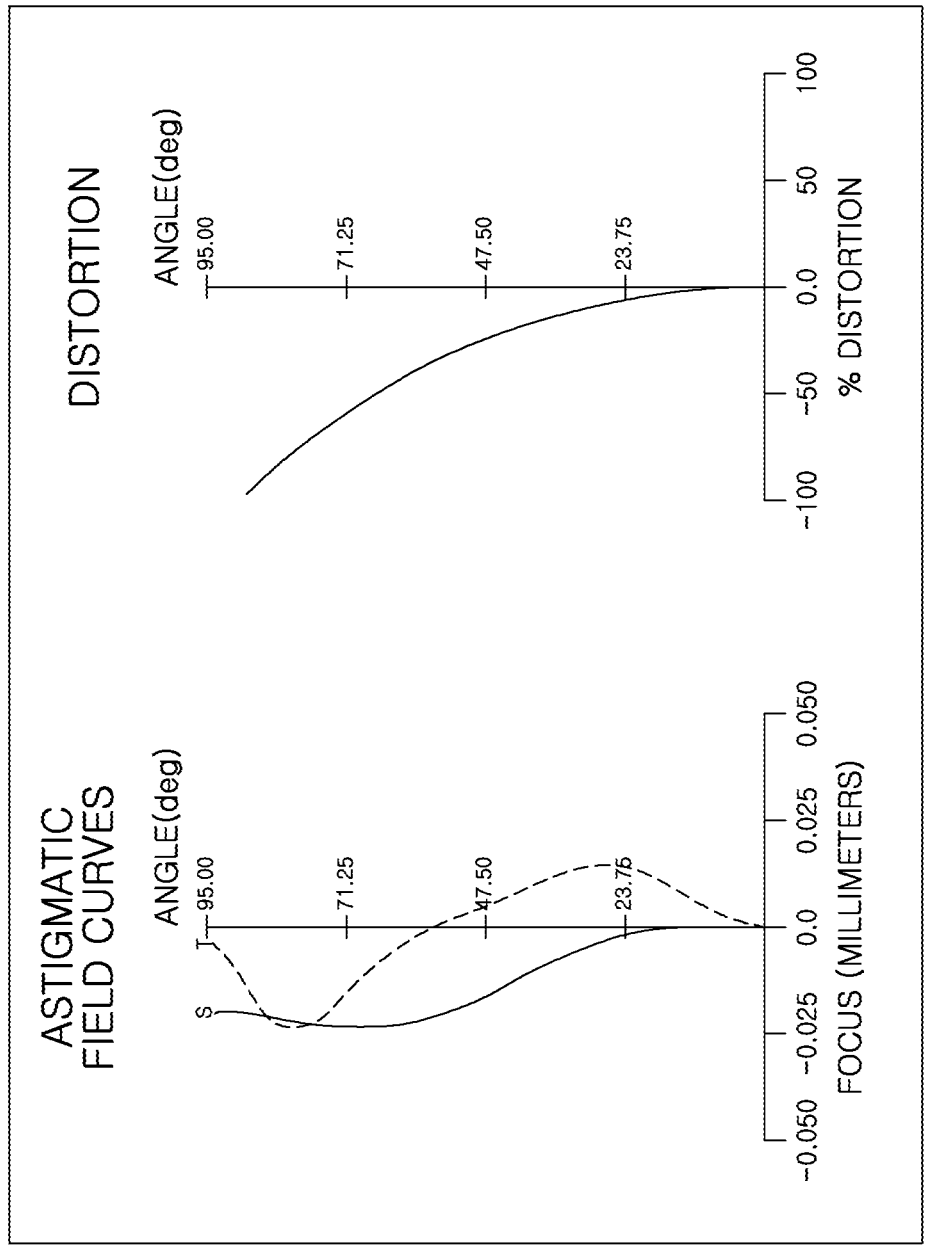
FIG. 8 displays aberration curves of the imaging lens system illustrated in FIG. 7.

Tables 7 and 8 list characteristics of the lenses and aspheric values of the imaging lens system according to the embodiment, and FIG. 8 displays aberration curves of the imaging lens system according to the embodiment.

TABLE 7

| Surface No. | Components | Radius of Curvature | Thickness/ Distance | Refractive Index | Abbe Number | Effective Radius |
|---|---|---|---|---|---|---|
| S1 | 1st lens | 11.8490 | 0.8000 | 1.776 | 49.6 | 5.668 |
| S2 | | 3.5000 | 2.2290 | | | 3.203 |
| S3 | 2nd lens | −9.8320 | 0.8000 | 1.539 | 56.0 | 2.992 |
| S4 | | 3.7000 | 0.9260 | | | 1.877 |

TABLE 7-continued

| Surface No. | Components | Radius of Curvature | Thickness/ Distance | Refractive Index | Abbe Number | Effective Radius |
|---|---|---|---|---|---|---|
| S5 | 3rd lens | −29.2170 | 1.1190 | 1.842 | 22.3 | 1.837 |
| S6 | | −6.7830 | 0.8440 | | | 1.661 |
| S7 | Stop | Infinity | 0.3190 | | | 1.240 |
| S8 | 4th lens | −9.0460 | 1.8710 | 1.539 | 56.0 | 1.357 |
| S9 | | −3.0140 | 0.1100 | | | 1.830 |
| S10 | 5th lens | 4.5120 | 2.0700 | 1.537 | 56.1 | 2.202 |
| S11 | | −4.0510 | 0.1800 | | | 2.204 |
| S12 | 6th lens | −4.2330 | 0.8000 | 1.668 | 20.4 | 2.123 |
| S13 | | 5.2780 | 0.1960 | | | 2.511 |
| S14 | 7th lens | 4.8890 | 2.2380 | 1.539 | 56.0 | 2.696 |
| S15 | | −5.3120 | 0.6000 | | | 2.850 |
| S16 | Filter | Infinity | 0.4000 | 1.519 | 64.2 | 2.903 |
| S17 | | Infinity | 0.5000 | | | 2.914 |
| S18 | Cover | Infinity | 0.4000 | 1.500 | 67.0 | 2.935 |

TABLE 7-continued

| Surface No. | Components | Radius of Curvature | Thickness/ Distance | Refractive Index | Abbe Number | Effective Radius |
|---|---|---|---|---|---|---|
| | glass | | | | | |
| S19 | | Infinity | 0.6010 | | | 2.947 |
| S20 | Imaging plane | Infinity | 0.0000 | | | 2.984 |

TABLE 8

| Surface No. | S3 | S4 | S5 | S6 | S8 | S9 |
|---|---|---|---|---|---|---|
| K | 0 | 0 | 0 | 0 | 0 | 0 |
| A | 1.705E−02 | 2.674E−02 | 4.283E−03 | 1.137E−02 | 1.466E−02 | 1.783E−04 |
| B | −2.312E−03 | 1.746E−04 | 2.746E−03 | 1.758E−03 | −3.524E−03 | 4.792E−04 |
| C | 1.491E−04 | 9.932E−04 | −5.856E−04 | −8.455E−04 | 1.693E−04 | −2.134E−04 |
| D | −3.304E−06 | −3.207E−04 | −8.119E−05 | 5.616E−05 | −1.270E−04 | 0.000E+00 |

| Surface No. | S10 | S11 | S12 | S13 | S14 | S15 |
|---|---|---|---|---|---|---|
| K | 0 | 0 | 0 | 0 | −5.660E−01 | −1.250E+01 |
| A | −6.647E−03 | −1.542E−02 | −9.448E−03 | 3.678E−03 | −2.428E−03 | −7.634E−03 |
| B | 8.865E−04 | 9.416E−03 | 6.847E−03 | −1.342E−03 | 4.665E−04 | 1.633E−03 |
| C | −7.772E−05 | −1.845E−03 | −1.620E−03 | 5.264E−05 | −6.586E−05 | −1.443E−04 |
| D | 1.018E−05 | 1.155E−04 | 7.629E−05 | −5.933E−07 | 1.414E−06 | 3.388E−06 |

Figure 9:
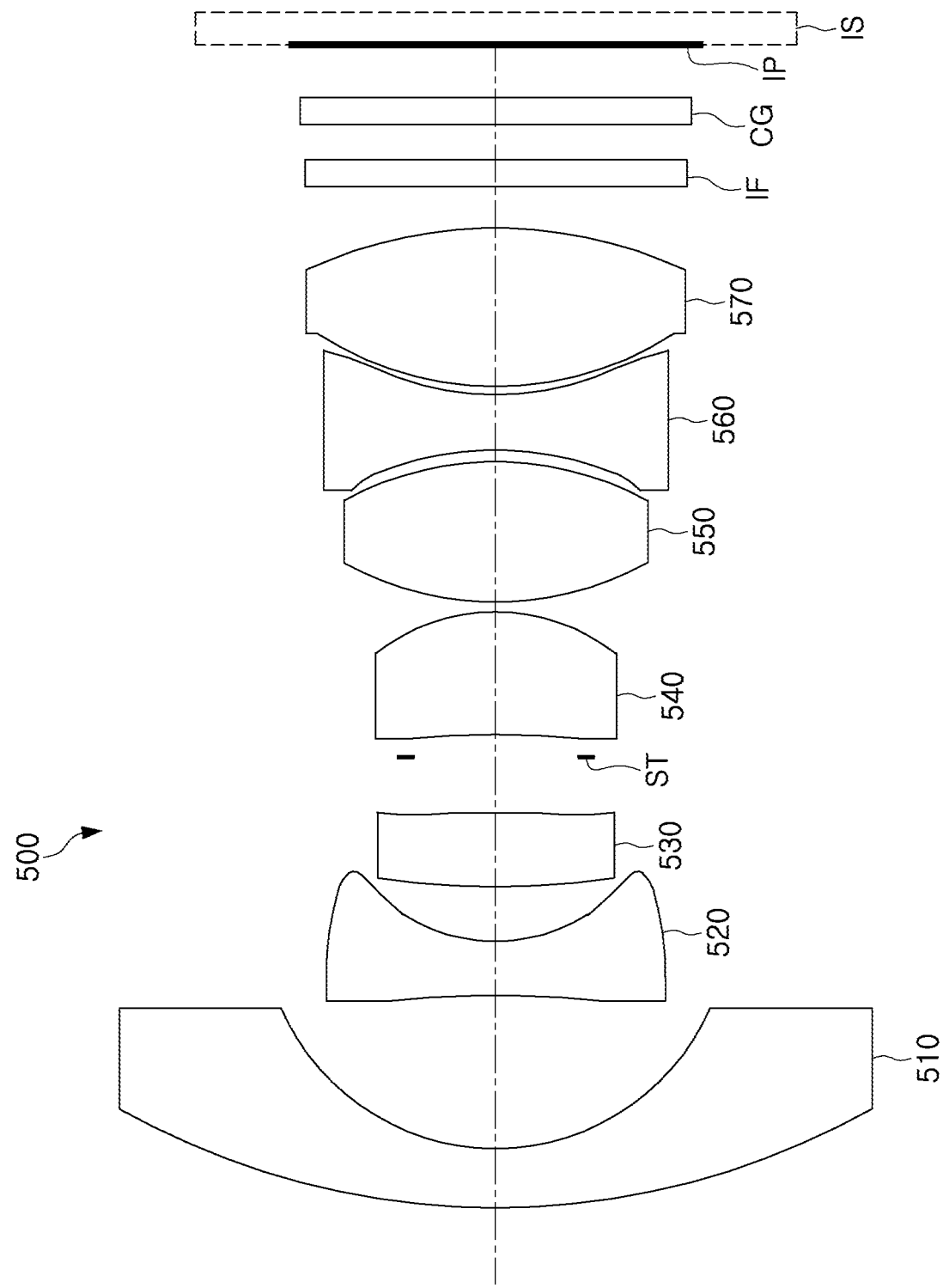
FIG. 9 is a diagram illustrating an imaging lens system according to a fifth embodiment of the present disclosure.

An imaging lens system according to a fifth embodiment will be described with reference to FIG. 9.

The imaging lens system 500 may include a first lens 510, a second lens 520, a third lens 530, a fourth lens 540, a fifth lens 550, a sixth lens 560, and a seventh lens 570.

The first lens 510 may have negative refractive power, and may have a convex object-side surface and a concave image-side surface. The second lens 520 may have negative refractive power, and may have a concave object-side surface and a concave image-side surface. The third lens 530 may have positive refractive power, and may have a convex object-side surface and a convex image-side surface. The fourth lens 540 may have positive refractive power, and may have a concave object-side surface and a convex image-side surface. The fifth lens 550 may have positive refractive power, and may have a convex object-side surface and a convex image-side surface. The sixth lens 560 may have negative refractive power, and may have a concave object-side surface and a concave image-side surface. The seventh lens 570 may have positive refractive power, and may have a convex object-side surface and a convex image-side surface.

The imaging lens system 500 may include a lens having an inflection point. For example, an inflection point may be formed on an object-side surface of the second lens 520 in the imaging lens system 500 according to the embodiment. However, the lens in which the inflection point is formed is not limited to the second lens 520.

The imaging lens system 500 may further include a stop ST, a filter IF, a cover glass CG, and an imaging plane IP. The stop ST may be disposed between the third lens 530 and the fourth lens 540, and the filter IF and the cover glass CG may be disposed in this order between the seventh lens 570 and the imaging plane IP. The imaging plane IP may be formed on one surface of the image sensor IS of the camera module or in the image sensor IS.

Figure 10:
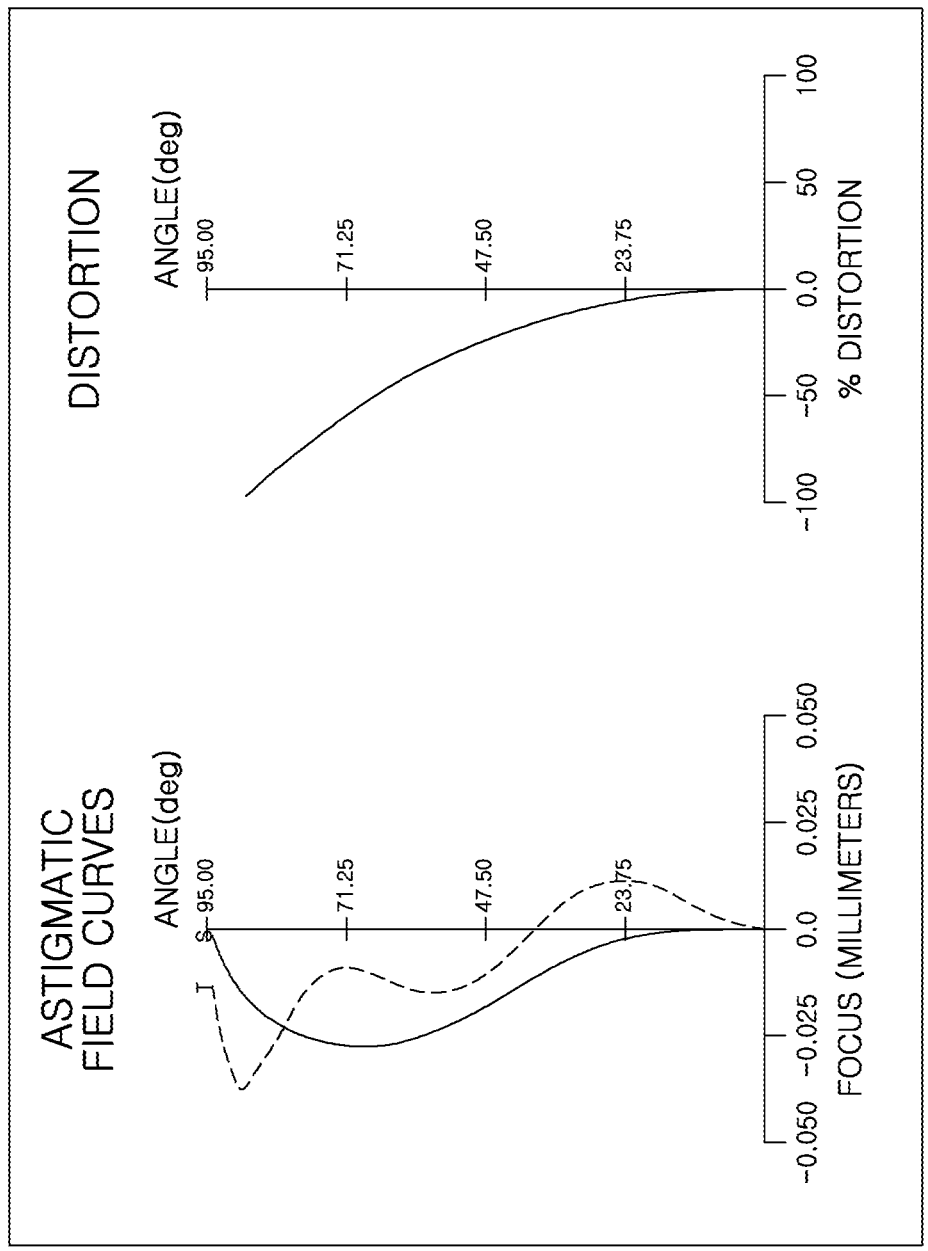
FIG. 10 displays aberration curves of the imaging lens system illustrated in FIG. 9.

Tables 9 and 10 list characteristics of the lenses and aspheric values of the imaging lens system according to the embodiment, and FIG. 10 displays aberration curves of the imaging lens system according to the embodiment.

TABLE 9

| Surface No. | Components | Radius of Curvature | Thickness/ Distance | Refractive Index | Abbe Number | Effective Radius |
|---|---|---|---|---|---|---|
| S1 | 1st lens | 11.8480 | 0.8000 | 1.776 | 49.6 | 5.668 |
| S2 | | 3.5000 | 2.2860 | | | 3.203 |
| S3 | 2nd lens | −7.3030 | 0.8000 | 1.539 | 56.0 | 2.992 |
| S4 | | 3.7000 | 0.7860 | | | 1.846 |
| S5 | 3rd lens | 15.9190 | 1.0840 | 1.669 | 20.4 | 1.790 |
| S6 | | −13.1060 | 0.8270 | | | 1.563 |
| S7 | Stop | Infinity | 0.3130 | | | 1.234 |
| S8 | 4th lens | −9.3920 | 1.8170 | 1.528 | 52.2 | 1.361 |
| S9 | | −3.0000 | 0.1100 | | | 1.833 |
| S10 | 5th lens | 4.1330 | 2.0740 | 1.537 | 56.1 | 2.271 |
| S11 | | −4.8040 | 0.1800 | | | 2.257 |
| S12 | 6th lens | −5.2510 | 0.8000 | 1.668 | 20.4 | 2.194 |
| S13 | | 4.4760 | 0.1100 | | | 2.583 |
| S14 | 7th lens | 4.3480 | 2.3320 | 1.539 | 56.0 | 2.722 |
| S15 | | −5.2090 | 0.6000 | | | 2.856 |
| S16 | Filter | Infinity | 0.4000 | 1.519 | 64.2 | 2.904 |
| S17 | | Infinity | 0.5000 | | | 2.915 |
| S18 | Cover glass | Infinity | 0.4000 | 1.500 | 67.0 | 2.934 |
| S19 | | Infinity | 0.7800 | | | 2.945 |
| S20 | Imaging plane | Infinity | 0.0000 | | | 2.981 |

TABLE 10

| Surface No. | S3 | S4 | S5 | S6 | S8 | S9 |
|---|---|---|---|---|---|---|
| K | 0 | 0 | 0 | 0 | 0 | 0 |
| A | 1.882E−02 | 2.307E−02 | 1.217E−03 | 1.343E−02 | 1.477E−02 | −7.219E−04 |
| B | −2.311E−03 | 1.675E−03 | 4.528E−03 | 3.248E−03 | −2.914E−03 | 1.251E−03 |
| C | 1.443E−04 | 1.124E−03 | −6.745E−04 | −1.251E−03 | 3.216E−04 | −3.916E−04 |
| D | −3.196E−06 | −4.025E−04 | −2.125E−04 | −1.488E−05 | −2.271E−04 | 0.000E+00 |

TABLE 10-continued

| Surface No. | S10 | S11 | S12 | S13 | S14 | S15 |
|---|---|---|---|---|---|---|
| K | 0 | 0 | 0 | 0 | −5.563E−01 | −7.701E+00 |
| A | −7.446E−03 | −1.832E−02 | −1.232E−02 | 4.881E−03 | −4.831E−04 | −4.035E−03 |
| B | 1.807E−03 | 1.166E−02 | 8.755E−03 | −1.696E−03 | −7.304E−05 | 9.157E−04 |
| C | −3.336E−04 | −2.431E−03 | −2.173E−03 | 7.696E−05 | −1.818E−05 | −7.547E−05 |
| D | 2.800E−05 | 1.633E−04 | 1.351E−04 | −1.520E−06 | 2.392E−07 | 1.413E−06 |

Figure 11:
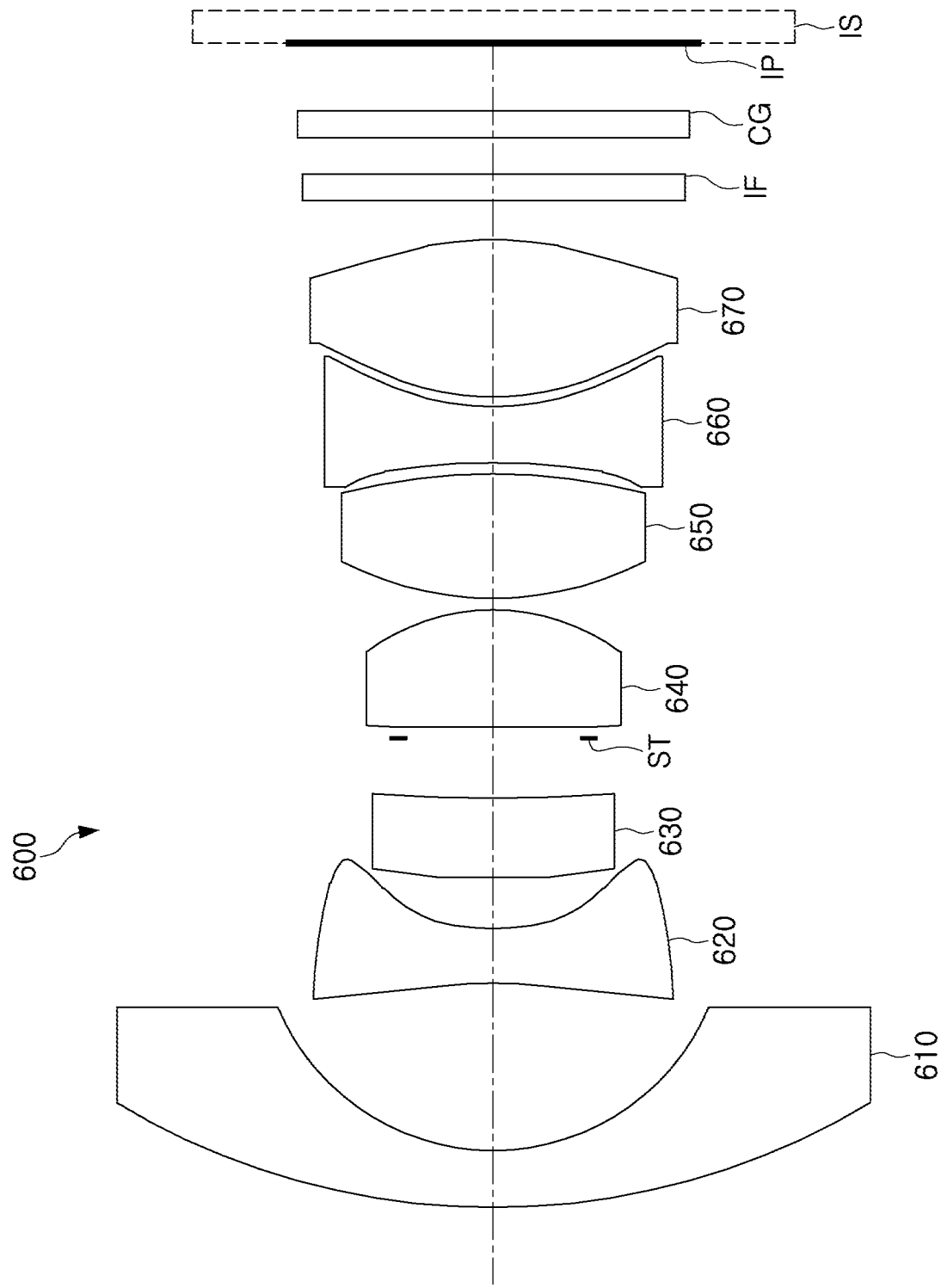
FIG. 11 is a diagram illustrating an imaging lens system according to a sixth embodiment of the present disclosure.

An imaging lens system according to a sixth embodiment will be described with reference to FIG. 11.

The imaging lens system 600 may include a first lens 610, a second lens 620, a third lens 630, a fourth lens 640, a fifth lens 650, a sixth lens 660, and a seventh lens 670.

The first lens 610 may have negative refractive power, and may have a convex object-side surface and a concave image-side surface. The second lens 620 may have negative refractive power, and may have a concave object-side surface and a concave image-side surface. The third lens 630 may have positive refractive power, and may have a convex object-side surface and a convex image-side surface. The fourth lens 640 may have positive refractive power, and may have a concave object-side surface and a convex image-side surface. The fifth lens 650 may have positive refractive power, and may have a convex object-side surface and a convex image-side surface. The sixth lens 660 may have negative refractive power, and may have a concave object-side surface and a concave image-side surface. The seventh lens 670 may have positive refractive power, and may have a convex object-side surface and a convex image-side surface.

The imaging lens system 600 may include a lens having an inflection point. For example, an inflection point may be formed on an object-side surface of the second lens 620 in the imaging lens system 600 according to the embodiment. However, the lens in which the inflection point is formed is not limited to the second lens 620.

The imaging lens system 600 may further include a stop ST, a filter IF, a cover glass CG, and an imaging plane IP. The stop ST may be disposed between the third lens 630 and the fourth lens 640, and the filter IF and the cover glass CG may be disposed in this order between the seventh lens 670 and the imaging plane IP. The imaging plane IP may be formed on one surface of the image sensor IS of the camera module or in the image sensor IS.

Figure 12:
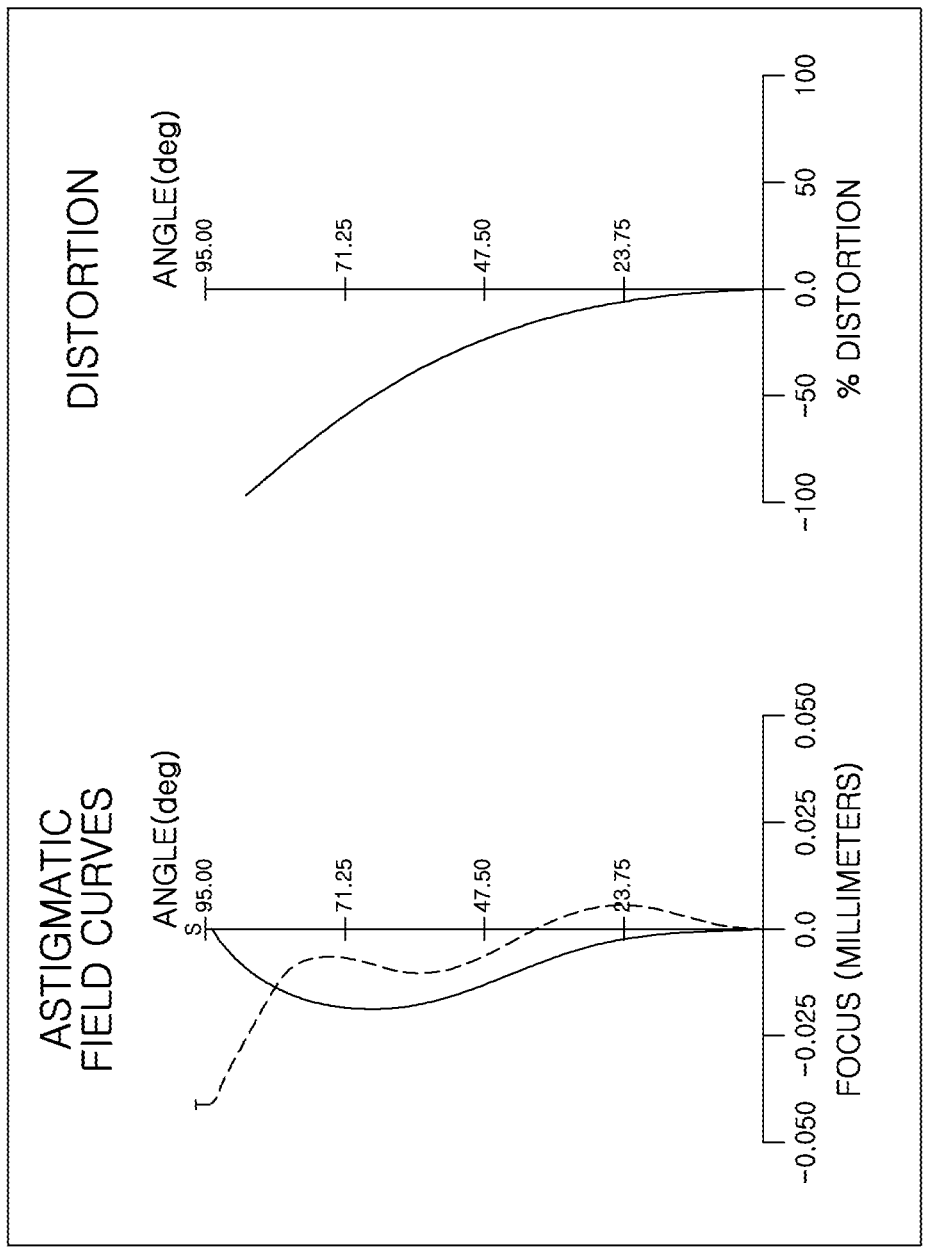
FIG. 12 displays aberration curves of the imaging lens system illustrated in FIG. 11.

Tables 11 and 12 list characteristics of the lenses and aspheric values of the imaging lens system according to the embodiment, and FIG. 12 displays aberration curves of the imaging lens system according to the embodiment.

TABLE 11

| Surface No. | Components | Radius of Curvature | Thickness/ Distance | Refractive Index | Abbe Number | Effective Radius |
|---|---|---|---|---|---|---|
| S1 | 1st lens | 11.1500 | 0.8000 | 1.776 | 49.6 | 5.643 |
| S2 |  | 3.5000 | 2.4600 |  |  | 3.203 |
| S3 | 2nd lens | −5.8440 | 0.8000 | 1.539 | 56.0 | 2.973 |
| S4 |  | 3.7000 | 0.7320 |  |  | 1.838 |
| S5 | 3rd lens | 11.5970 | 1.1720 | 1.669 | 20.4 | 1.784 |
| S6 |  | −28.9980 | 0.8680 |  |  | 1.534 |
| S7 | Stop | Infinity | 0.1710 |  |  | 1.291 |
| S8 | 4th lens | −30.8600 | 1.7490 | 1.516 | 54.1 | 1.442 |
| S9 |  | −3.0000 | 0.1100 |  |  | 1.911 |
| S10 | 5th lens | 4.2520 | 1.8340 | 1.537 | 56.1 | 2.274 |
| S11 |  | −11.3220 | 0.1800 |  |  | 2.245 |
| S12 | 6th lens | −9.7790 | 0.8000 | 1.668 | 20.4 | 2.223 |
| S13 |  | 3.8140 | 0.1300 |  |  | 2.490 |
| S14 | 7th lens | 3.7870 | 2.3040 | 1.539 | 56.0 | 2.606 |
| S15 |  | −4.9130 | 0.6000 |  |  | 2.753 |
| S16 | Filter | Infinity | 0.4000 | 1.519 | 64.2 | 2.834 |
| S17 |  | Infinity | 0.5000 |  |  | 2.852 |
| S18 | Cover glass | Infinity | 0.4000 | 1.500 | 67.0 | 2.887 |
| S19 |  | Infinity | 0.9910 |  |  | 2.905 |
| S20 | Imaging plane | Infinity | 0.0000 |  |  | 2.987 |

TABLE 12

| Surface No. | S3 | S4 | S5 | S6 | S8 | S9 |
|---|---|---|---|---|---|---|
| K | 0 | 0 | 0 | 0 | 0 | 0 |
| A | 2.021E−02 | 2.226E−02 | 4.730E−04 | 1.256E−02 | 1.140E−02 | −3.904E−04 |
| B | −2.859E−03 | 3.111E−03 | 3.959E−03 | 3.401E−03 | 6.206E−04 | 9.917E−04 |
| C | 2.156E−04 | 1.727E−04 | −2.932E−04 | −9.005E−04 | −1.003E−03 | −2.298E−04 |
| D | −6.115E−06 | −2.586E−04 | −2.641E−04 | −4.356E−05 | 1.386E−04 | 0.000E+00 |

| Surface No. | S10 | S11 | S12 | S13 | S14 | S15 |
|---|---|---|---|---|---|---|
| K | 0 | 0 | 0 | 0 | −7.631E−01 | −7.579E+00 |
| A | −5.890E−03 | −1.914E−02 | −1.232E−02 | 5.101E−03 | 1.203E−03 | −3.327E−03 |
| B | 1.229E−03 | 1.176E−02 | 8.895E−03 | −2.769E−03 | −1.505E−03 | 8.488E−04 |
| C | −2.715E−04 | −2.667E−03 | −2.300E−03 | 2.819E−04 | 2.413E−04 | −5.874E−05 |
| D | 2.505E−05 | 1.958E−04 | 1.615E−04 | −1.558E−05 | −1.578E−05 | 3.846E−07 |

Figure 13:
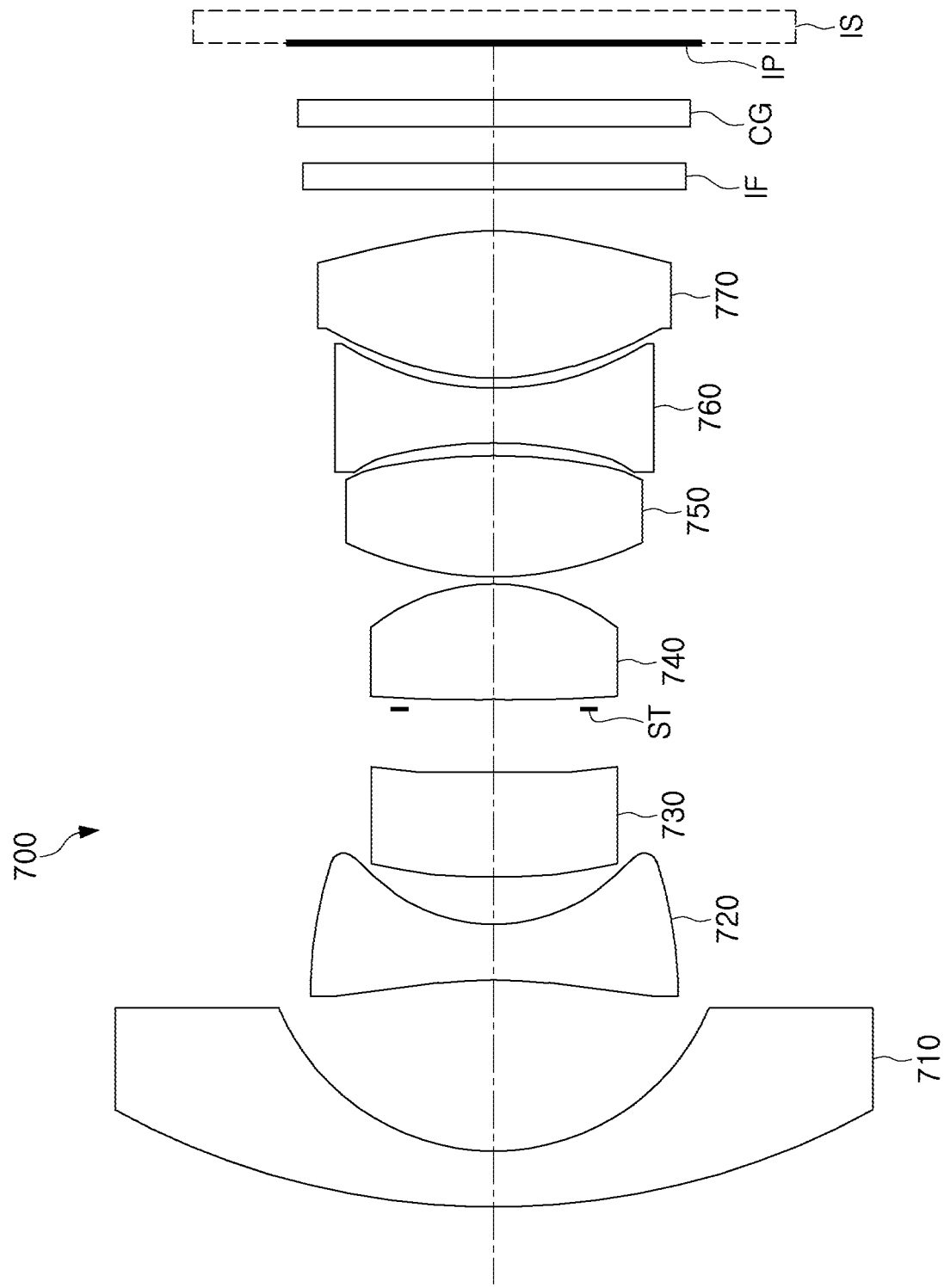
FIG. 13 is a diagram illustrating an imaging lens system according to a seventh embodiment of the present disclosure.

An imaging lens system according to a seventh embodiment will be described with reference to FIG. 13.

The imaging lens system 700 may include a first lens 710, a second lens 720, a third lens 730, a fourth lens 740, a fifth lens 750, a sixth lens 760, and a seventh lens 770.

The first lens 710 may have negative refractive power, and may have a convex object-side surface and a concave image-side surface. The second lens 720 may have negative refractive power, and may have a concave object-side surface and a concave image-side surface. The third lens 730 may have positive refractive power, and may have a convex object-side surface and a convex image-side surface. The fourth lens 740 may have positive refractive power, and may have a concave object-side surface and a convex image-side surface. The fifth lens 750 may have positive refractive power, and may have a convex object-side surface and a convex image-side surface. The sixth lens 760 may have negative refractive power, and may have a concave object-side surface and a concave image-side surface. The seventh lens 770 may have positive refractive power, and may have a convex object-side surface and a convex image-side surface.

The imaging lens system 700 may include a lens having an inflection point. For example, an inflection point may be formed on an object-side surface of the second lens 720 in the imaging lens system 700 according to the embodiment. However, the lens in which the inflection point is formed is not limited to the second lens 720.

The imaging lens system 700 may further include a stop ST, a filter IF, a cover glass CG, and an imaging plane IP. The stop ST may be disposed between the third lens 730 and the fourth lens 740, and the filter IF and the cover glass CG may be disposed in this order between the seventh lens 770 and the imaging plane IP. The imaging plane IP may be formed on one surface of the image sensor IS of the camera module or in the image sensor IS.

Figure 14:
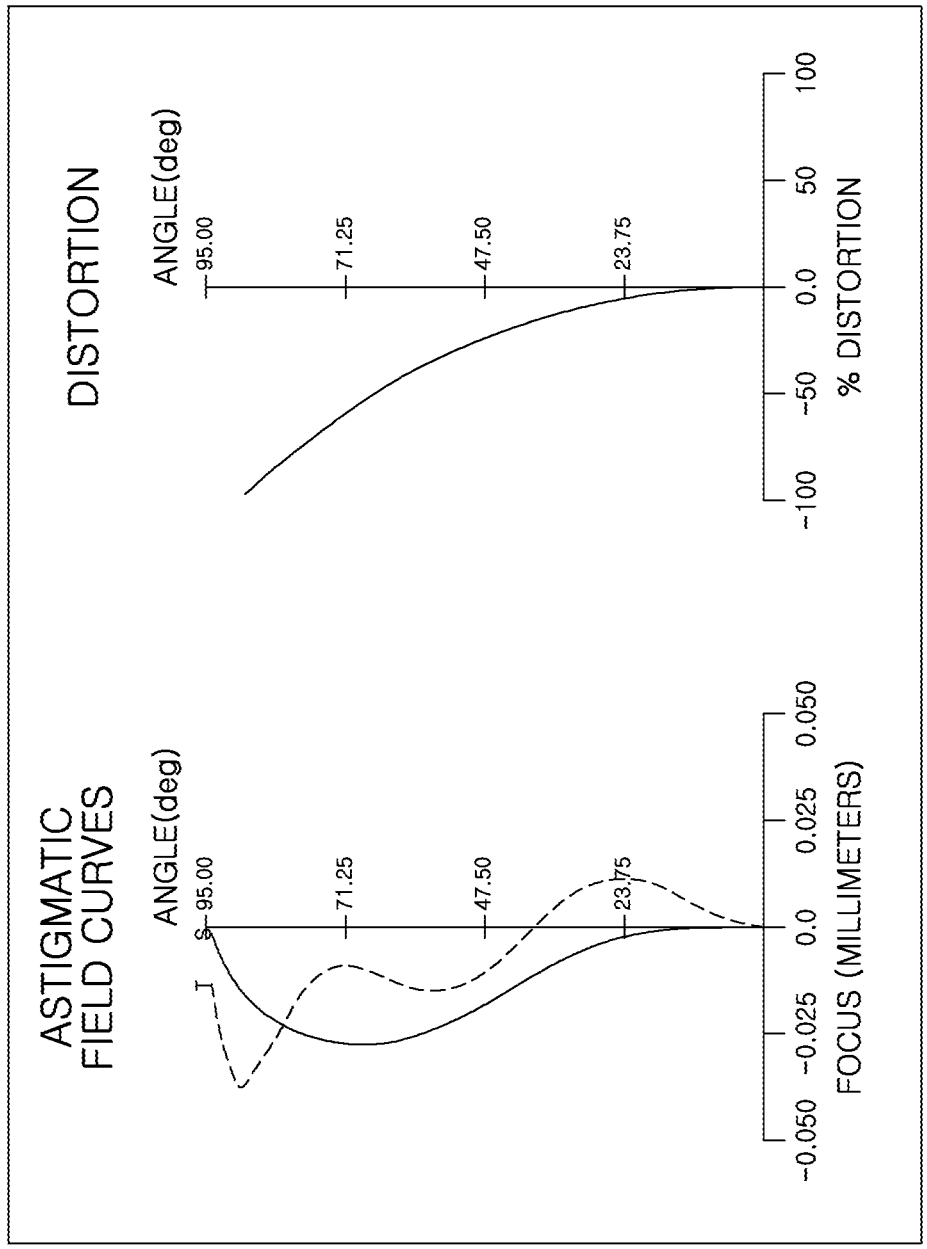
FIG. 14 displays aberration curves of the imaging lens system illustrated in FIG. 13.

Tables 13 and 14 list characteristics of the lenses and aspheric values of the imaging lens system according to the embodiment, and FIG. 14 displays aberration curves of the imaging lens system according to the embodiment.

TABLE 13

| Surface No. | Components | Radius of Curvature | Thickness/ Distance | Refractive Index | Abbe Number | Effective Radius |
|---|---|---|---|---|---|---|
| S1 | 1st lens | 12.1030 | 0.8000 | 1.776 | 49.6 | 5.675 |
| S2 | | 3.5000 | 2.5240 | | | 3.203 |
| S3 | 2nd lens | −5.6380 | 0.8000 | 1.539 | 56.0 | 2.999 |
| S4 | | 3.7000 | 0.6920 | | | 1.894 |
| S5 | 3rd lens | 9.8910 | 1.5420 | 1.816 | 22.8 | 1.852 |
| S6 | | −32.1540 | 0.8990 | | | 1.550 |
| S7 | Stop | Infinity | 0.1500 | | | 1.314 |
| S8 | 4th lens | −43.7650 | 1.6760 | 1.537 | 56.1 | 1.451 |
| S9 | | −3.0000 | 0.1100 | | | 1.867 |
| S10 | 5th lens | 4.3780 | 1.7790 | 1.537 | 56.1 | 2.170 |
| S11 | | −10.4900 | 0.1800 | | | 2.150 |
| S12 | 6th lens | −7.3750 | 0.8000 | 1.668 | 20.4 | 2.133 |

TABLE 13-continued

| Surface No. | Components | Radius of Curvature | Thickness/ Distance | Refractive Index | Abbe Number | Effective Radius |
|---|---|---|---|---|---|---|
| S13 | | 3.9130 | 0.1300 | | | 2.385 |
| S14 | 7th lens | 3.9350 | 2.1660 | 1.539 | 56.0 | 2.514 |
| S15 | | −4.8370 | 0.6000 | | | 2.655 |
| S16 | Filter | Infinity | 0.4000 | 1.519 | 64.2 | 2.777 |
| S17 | | Infinity | 0.5000 | | | 2.807 |
| S18 | Cover glass | Infinity | 0.4000 | 1.500 | 67.0 | 2.863 |
| S19 | | Infinity | 0.8520 | | | 2.893 |
| S20 | Imaging plane | Infinity | 0.0000 | | | 2.989 |

TABLE 14

| Surface No. | S3 | S4 | S5 | S6 | S8 | S9 |
|---|---|---|---|---|---|---|
| K | 0 | 0 | 0 | 0 | 0 | 0 |
| A | 1.733E−02 | 1.777E−02 | 1.709E−03 | 1.129E−02 | 1.164E−02 | 2.204E−03 |
| B | −2.402E−03 | 2.306E−03 | 2.064E−03 | 3.172E−03 | 1.680E−03 | 1.613E−04 |
| C | 1.960E−04 | 1.960E−04 | 1.304E−04 | −1.080E−03 | −1.628E−03 | −9.213E−05 |
| D | −6.090E−06 | −1.818E−04 | −2.263E−04 | 3.442E−05 | 2.638E−04 | 0.000E+00 |

| Surface No. | S10 | S11 | S12 | S13 | S14 | S15 |
|---|---|---|---|---|---|---|
| K | 0 | 0 | 0 | 0 | −6.829E−01 | −9.522E+00 |
| A | −3.264E−03 | −1.223E−02 | −1.057E−02 | −1.845E−03 | −1.372E−04 | −2.086E−03 |
| B | 1.667E−05 | 7.366E−03 | 7.528E−03 | 6.213E−04 | −6.547E−04 | 8.044E−04 |
| C | −1.711E−04 | −2.047E−03 | −2.078E−03 | −2.791E−04 | 9.709E−05 | −8.544E−05 |
| D | 3.227E−05 | 1.816E−04 | 1.521E−04 | 1.718E−05 | −7.497E−06 | 3.506E−06 |

Figure 15:
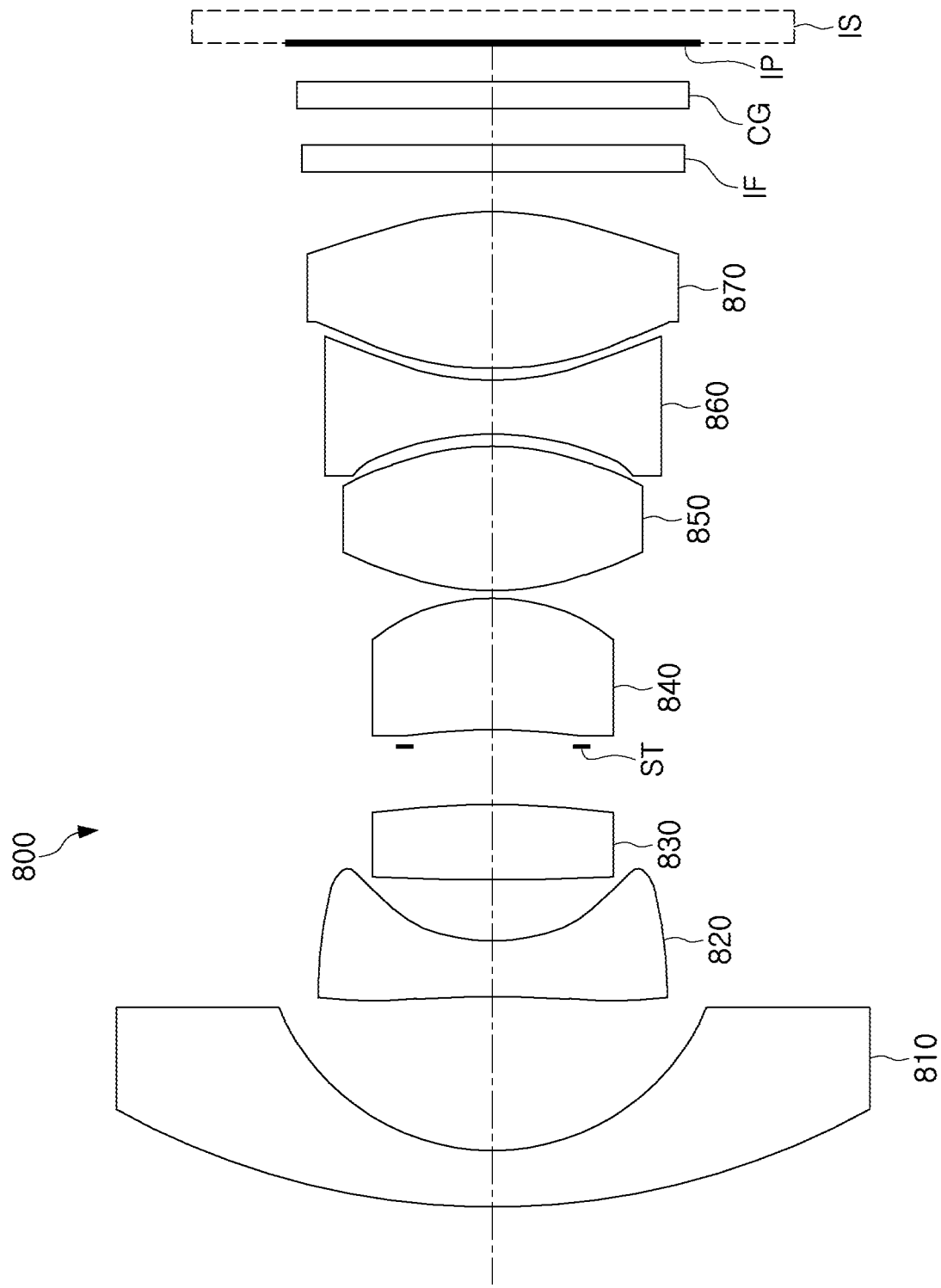
FIG. 15 is a diagram illustrating an imaging lens system according to an eighth embodiment of the present disclosure.

An imaging lens system according to an eighth embodiment will be described with reference to FIG. 15.

The imaging lens system 800 may include a first lens 810, a second lens 820, a third lens 830, a fourth lens 840, a fifth lens 850, a sixth lens 860, and a seventh lens 870.

The first lens 810 may have negative refractive power, and may have a convex object-side surface and a concave image-side surface. The second lens 820 may have negative refractive power, and may have a concave object-side surface and a concave image-side surface. The third lens 830 may have positive refractive power, and may have a concave object-side surface and a convex image-side surface. The fourth lens 840 may have positive refractive power, and may have a concave object-side surface and a convex image-side surface. The fifth lens 850 may have positive refractive power, and may have a convex object-side surface and a convex image-side surface. The sixth lens 860 may have negative refractive power, and may have a concave object-side surface and a concave image-side surface. The seventh lens 870 may have positive refractive power, and may have a convex object-side surface and a convex image-side surface.

The imaging lens system 800 may include a lens having an inflection point. For example, an inflection point may be formed on an object-side surface of the second lens 820 in the imaging lens system 800 according to the embodiment. However, the lens in which the inflection point is formed is not limited to the second lens 820.

The imaging lens system 800 may further include a stop ST, a filter IF, a cover glass CG, and an imaging plane IP. The stop ST may be disposed between the third lens 830 and the fourth lens 840, and the filter IF and the cover glass CG may be disposed in this order between the seventh lens 870 and the imaging plane IP. The imaging plane IP may be formed on one surface of the image sensor IS of the camera module or in the image sensor IS.

Figure 16:
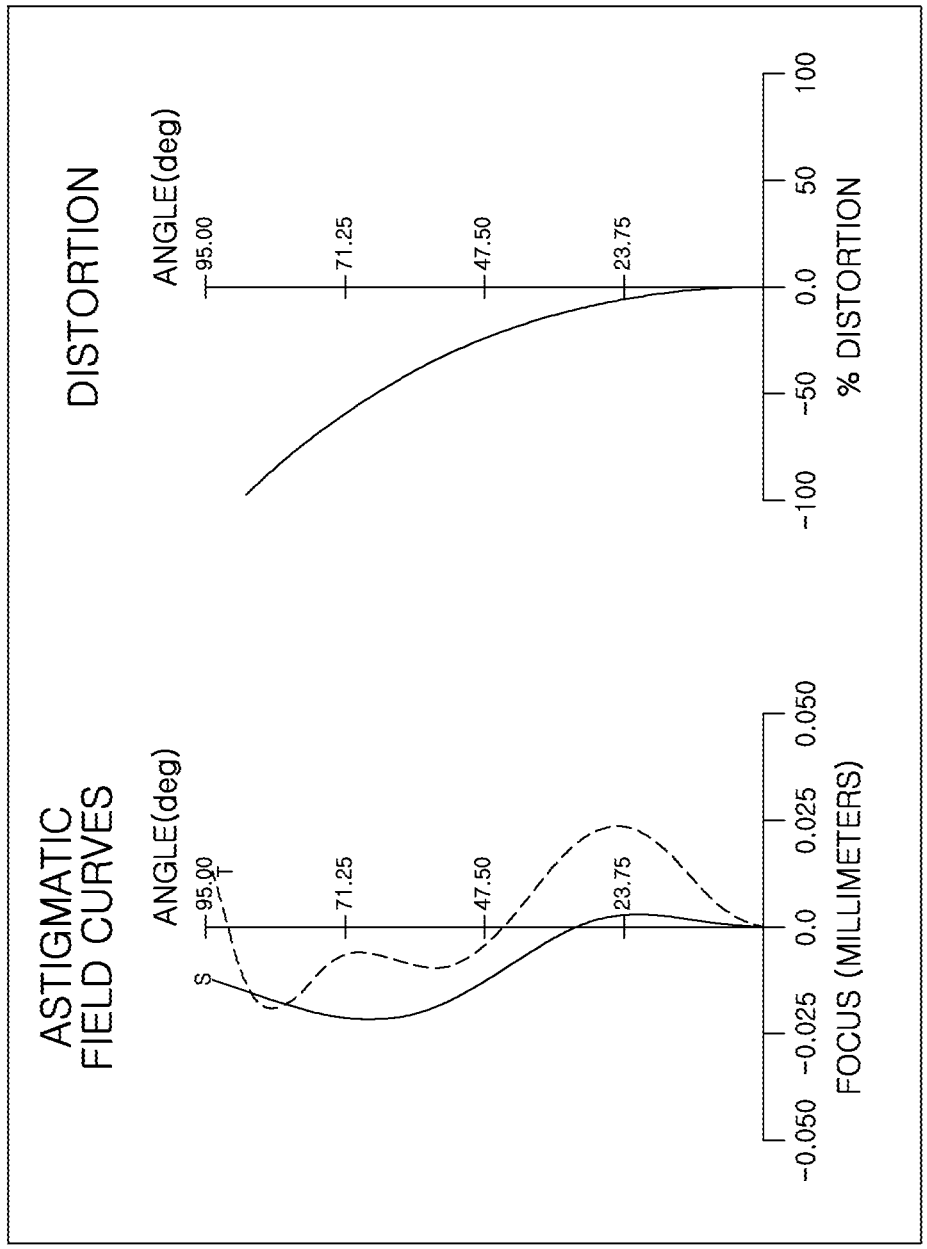
FIG. 16 displays aberration curves of the imaging lens system illustrated in FIG. 15.

Tables 15 and 16 list characteristics of the lenses and aspheric values of the imaging lens system according to the embodiment, and FIG. 16 displays aberration curves of the imaging lens system according to the embodiment.

TABLE 15

| Surface No. | Components | Radius of Curvature | Thickness/ Distance | Refractive Index | Abbe Number | Effective Radius |
|---|---|---|---|---|---|---|
| S1 | 1st lens | 11.7810 | 0.8000 | 1.776 | 49.6 | 5.666 |
| S2 | | 3.5000 | 2.2860 | | | 3.203 |
| S3 | 2nd lens | −8.8310 | 0.8000 | 1.539 | 56.0 | 2.991 |
| S4 | | 3.7000 | 0.8910 | | | 1.866 |
| S5 | 3rd lens | −205.4740 | 1.0850 | 1.816 | 22.8 | 1.814 |
| S6 | | −7.4900 | 0.8510 | | | 1.643 |
| S7 | Stop | Infinity | 0.2430 | | | 1.230 |
| S8 | 4th lens | −7.8750 | 1.9360 | 1.539 | 56.0 | 1.307 |
| S9 | | −3.0000 | 0.1100 | | | 1.828 |
| S10 | 5th lens | 4.2060 | 2.1000 | 1.537 | 56.1 | 2.247 |
| S11 | | −4.6940 | 0.1800 | | | 2.244 |
| S12 | 6th lens | −4.8730 | 0.8000 | 1.668 | 20.4 | 2.166 |
| S13 | | 4.7950 | 0.1600 | | | 2.511 |
| S14 | 7th lens | 4.7980 | 2.2860 | 1.539 | 56.0 | 2.657 |
| S15 | | −4.9950 | 0.6000 | | | 2.801 |
| S16 | Filter | Infinity | 0.4000 | 1.519 | 64.2 | 2.879 |
| S17 | | Infinity | 0.5000 | | | 2.896 |
| S18 | Cover glass | Infinity | 0.4000 | 1.500 | 67.0 | 2.928 |
| S19 | | Infinity | 0.5720 | | | 2.944 |
| S20 | Imaging plane | Infinity | 0.0000 | | | 2.985 |

TABLE 16

| Surface No. | S3 | S4 | S5 | S6 | S8 | S9 |
|---|---|---|---|---|---|---|
| K | 0 | 0 | 0 | 0 | 0 | 0 |
| A | 1.714E−02 | 2.656E−02 | 3.927E−03 | 1.100E−02 | 1.447E−02 | 2.723E−04 |
| B | −2.454E−03 | −3.511E−04 | 2.986E−03 | 2.756E−03 | −2.501E−03 | 6.934E−04 |
| C | 1.738E−04 | 1.181E−03 | −3.942E−04 | −1.128E−03 | −2.259E−04 | −2.928E−04 |
| D | −4.440E−06 | −3.435E−04 | −1.659E−04 | 3.958E−05 | −9.447E−05 | 0.000E+00 |

| Surface No. | S10 | S11 | S12 | S13 | S14 | S15 |
|---|---|---|---|---|---|---|
| K | 0 | 0 | 0 | 0 | −3.496E−01 | −1.320E+01 |
| A | −6.037E−03 | −1.651E−02 | −1.055E−02 | 4.254E−03 | −2.504E−03 | −8.972E−03 |
| B | 1.178E−03 | 1.018E−02 | 7.218E−03 | −1.261E−03 | 7.681E−04 | 1.656E−03 |
| C | −1.750E−04 | −2.006E−03 | −1.770E−03 | 3.323E−05 | −1.209E−04 | −1.256E−04 |
| D | 1.167E−05 | 1.187E−04 | 1.005E−04 | 1.287E−07 | 4.427E−06 | 2.719E−06 |

Figure 17:
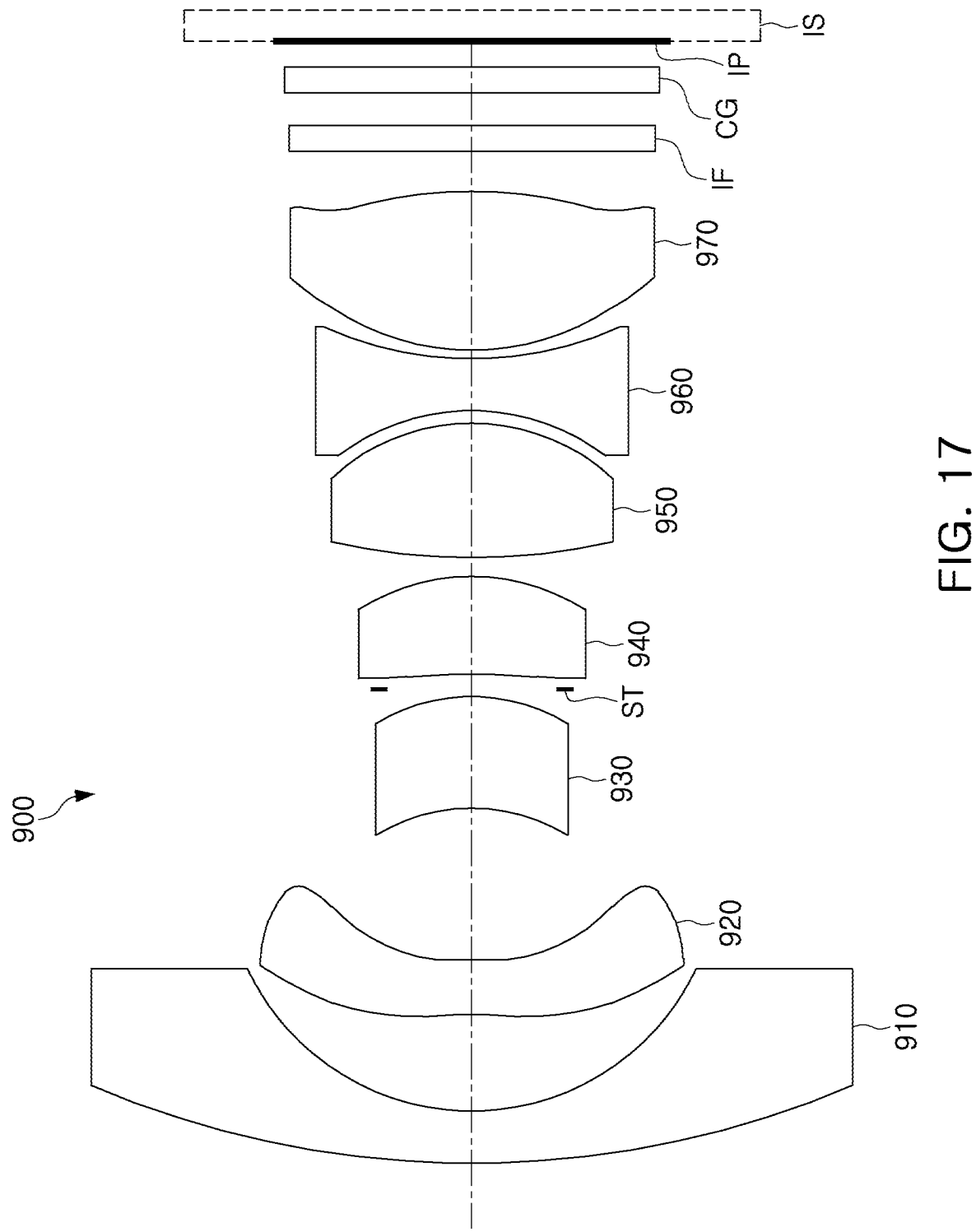
FIG. 17 is a diagram illustrating an imaging lens system according to a ninth embodiment of the present disclosure.

An imaging lens system according to a ninth embodiment will be described with reference to FIG. 17.

The imaging lens system 900 may include a first lens 910, a second lens 920, a third lens 930, a fourth lens 940, a fifth lens 950, a sixth lens 960, and a seventh lens 970.

The first lens 910 may have negative refractive power, and may have a convex object-side surface and a concave image-side surface. The second lens 920 may have negative refractive power, and may have a concave object-side surface and a concave image-side surface. The third lens 930 may have positive refractive power, and may have a concave object-side surface and a convex image-side surface. The fourth lens 940 may have positive refractive power, and may have a concave object-side surface and a convex image-side surface. The fifth lens 950 may have positive refractive power, and may have a convex object-side surface and a convex image-side surface. The sixth lens 960 may have negative refractive power, and may have a concave object-side surface and a concave image-side surface. The seventh lens 970 may have positive refractive power, and may have a convex object-side surface and a convex image-side surface.

The imaging lens system 900 may include a lens having an inflection point. For example, an inflection point may be formed on an object-side surface of the second lens 920 in the imaging lens system 900 according to the embodiment. However, the lens in which the inflection point is formed is not limited to the second lens 920.

The imaging lens system 900 may further include a stop ST, a filter IF, a cover glass CG, and an imaging plane IP. The stop ST may be disposed between the third lens 930 and the fourth lens 940, and the filter IF and the cover glass CG may be disposed in this order between the seventh lens 970 and the imaging plane IP. The imaging plane IP may be formed on one surface of the image sensor IS of the camera module or in the image sensor IS.

Figure 18:
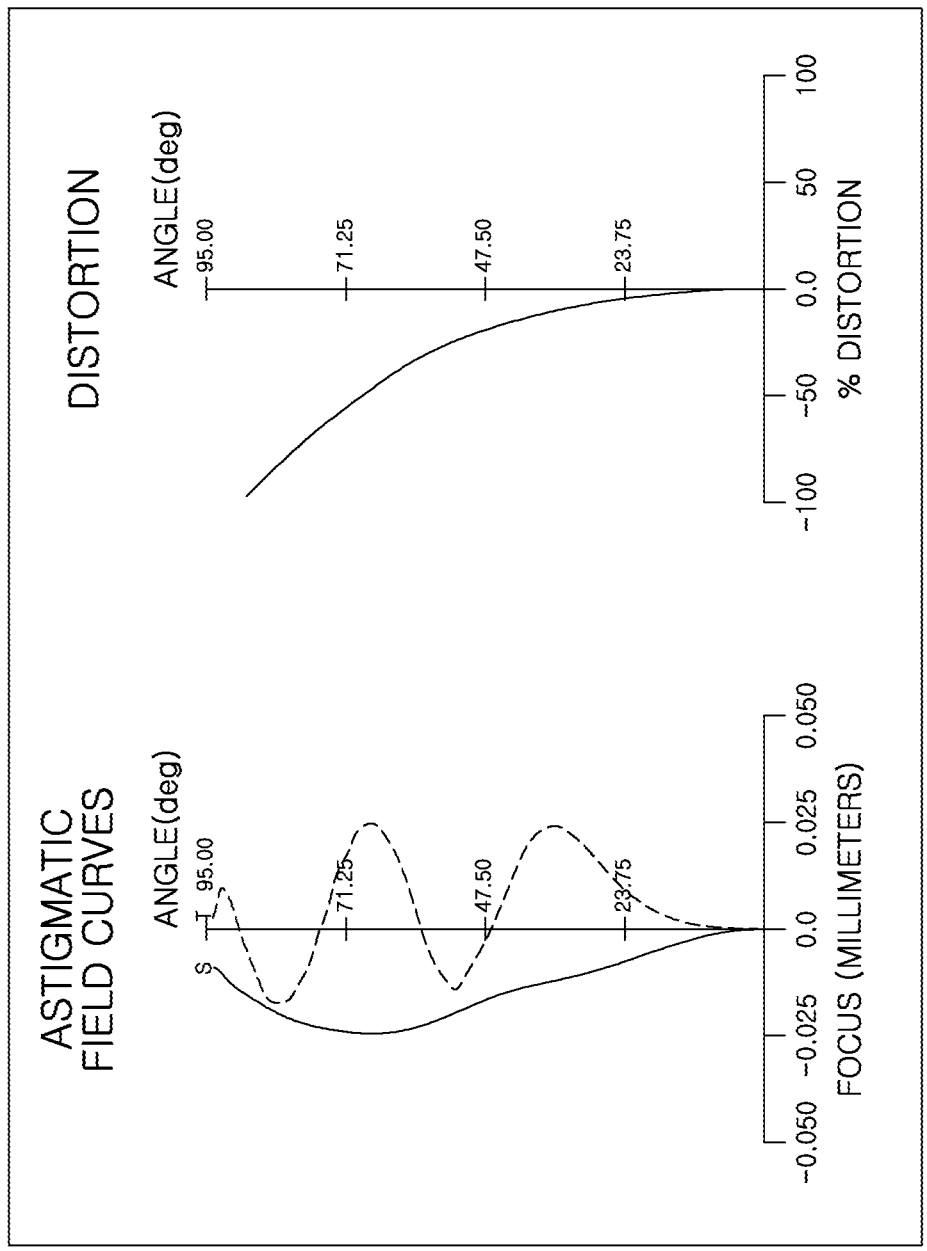
FIG. 18 displays aberration curves of the imaging lens system illustrated in FIG. 17.

Tables 17 and 18 list characteristics of the lenses and aspheric values of the imaging lens system according to the embodiment, and FIG. 18 displays aberration curves of the imaging lens system according to the embodiment.

TABLE 17

| Surface No. | Components | Radius of Curvature | Thickness/ Distance | Refractive Index | Abbe Number | Effective Radius |
|---|---|---|---|---|---|---|
| S1 | 1st lens | 15.3120 | 0.8000 | 1.776 | 49.6 | 5.971 |
| S2 | | 3.9000 | 1.4200 | | | 3.478 |
| S3 | 2nd lens | −29.5310 | 0.8410 | 1.537 | 55.7 | 3.362 |

TABLE 17-continued

| Surface No. | Components | Radius of Curvature | Thickness/ Distance | Refractive Index | Abbe Number | Effective Radius |
|---|---|---|---|---|---|---|
| S4 | | 5.5130 | 2.3310 | | | 2.400 |
| S5 | 3rd lens | −3.1030 | 1.6760 | 1.749 | 32.6 | 1.495 |
| S6 | | −2.6590 | 0.1100 | | | 1.487 |
| S7 | Stop | Infinity | 0.2410 | | | 1.300 |
| S8 | 4th lens | −10.4590 | 1.4910 | 1.544 | 42.9 | 1.325 |
| S9 | | −3.4040 | 0.2550 | | | 1.746 |
| S10 | 5th lens | 9.6750 | 2.0560 | 1.503 | 56.4 | 2.055 |
| S11 | | −3.2310 | 0.1770 | | | 2.176 |
| S12 | 6th lens | −3.4920 | 0.8000 | 1.688 | 18.5 | 2.089 |
| S13 | | 5.2610 | 0.1190 | | | 2.421 |
| S14 | 7th lens | 3.5680 | 2.4010 | 1.537 | 55.7 | 2.774 |
| S15 | | −4.2900 | 0.6000 | | | 2.691 |
| S16 | Filter | Infinity | 0.4000 | 1.519 | 64.2 | 2.795 |
| S17 | | Infinity | 0.5000 | | | 2.827 |
| S18 | Cover glass | Infinity | 0.4000 | 1.500 | 67.0 | 2.889 |
| S19 | | Infinity | 0.3820 | | | 2.922 |
| S20 | Imaging plane | Infinity | 0.0000 | | | 2.988 |

TABLE 18

| Surface No. | S3 | S4 | S5 | S6 | S8 | S9 |
|---|---|---|---|---|---|---|
| K | 0 | 0 | 0 | 0 | 0 | 0 |
| A | 1.455E−02 | 1.453E−02 | −1.637E−02 | 1.071E−03 | −1.011E−02 | −4.816E−03 |
| B | −1.995E−04 | 4.628E−03 | 9.205E−04 | 5.053E−03 | 7.075E−03 | −1.031E−04 |
| C | −7.218E−05 | −1.053E−03 | 7.493E−04 | −1.116E−03 | −1.963E−03 | 3.313E−04 |
| D | 3.334E−06 | 4.013E−05 | −1.411E−06 | 2.327E−04 | 2.854E−04 | −2.544E−05 |

| Surface No. | S10 | S11 | S12 | S13 | S14 | S15 |
|---|---|---|---|---|---|---|
| K | 0 | 0 | 0 | 0 | −7.875E−01 | −1.321E+01 |
| A | 4.591E−03 | 5.500E−03 | −6.637E−04 | −7.140E−04 | −6.128E−05 | −6.598E−03 |
| B | −2.689E−03 | −3.952E−03 | 1.537E−03 | 3.918E−04 | −7.145E−04 | 5.261E−03 |
| C | 6.058E−04 | 8.485E−04 | −4.890E−04 | −1.737E−04 | 9.087E−05 | −9.455E−04 |
| D | −4.912E−05 | −5.339E−05 | 4.222E−05 | 8.208E−06 | −1.563E−06 | 6.070E−05 |

Figure 19:
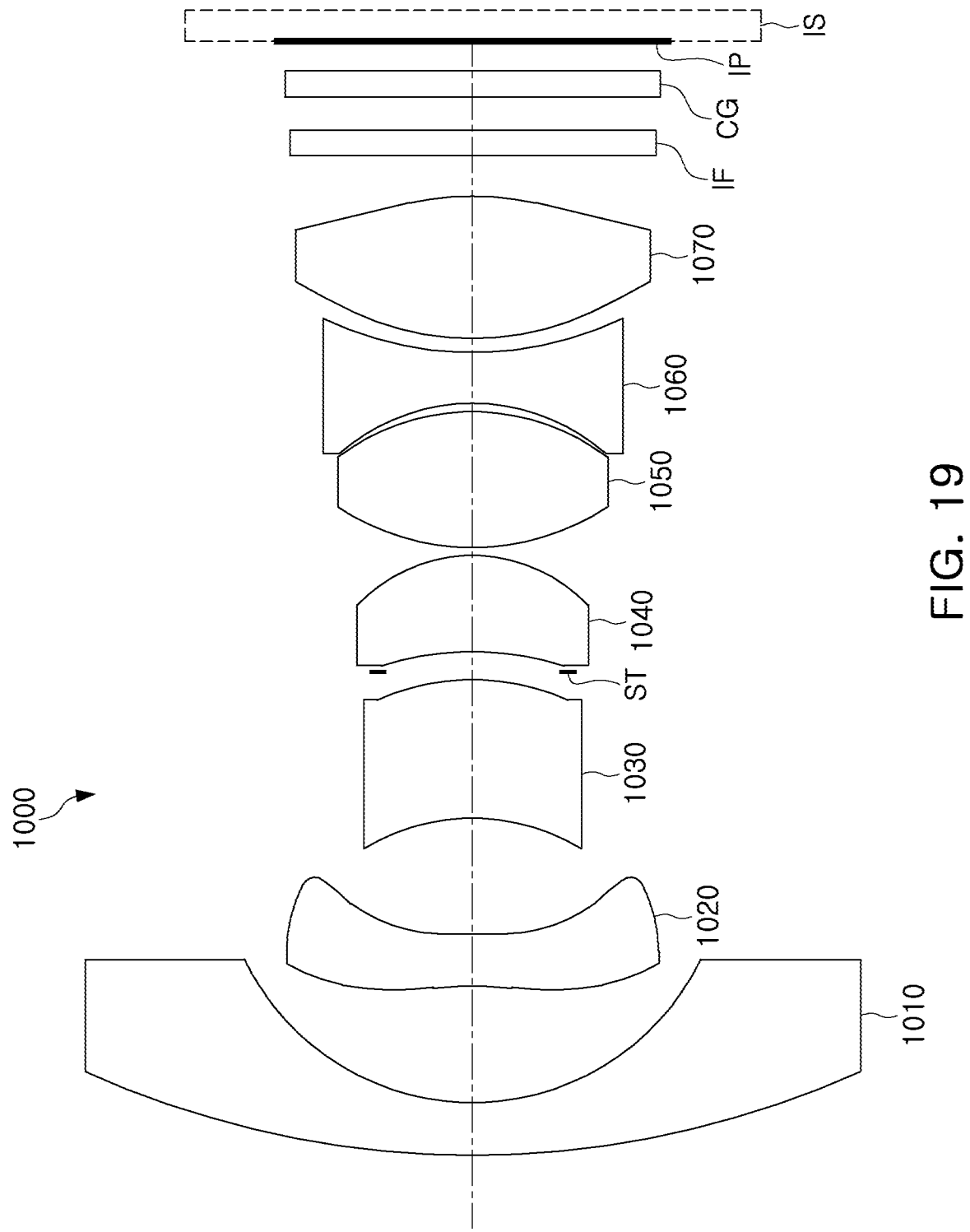
FIG. 19 is a diagram illustrating an imaging lens system according to a tenth embodiment of the present disclosure.

An imaging lens system according to a tenth embodiment will be described with reference to FIG. 19.

The imaging lens system 1000 may include a first lens 1010, a second lens 1020, a third lens 1030, a fourth lens 1040, a fifth lens 1050, a sixth lens 1060, and a seventh lens 1070.

The first lens 1010 may have negative refractive power, and may have a convex object-side surface and a concave image-side surface. The second lens 1020 may have negative refractive power, and may have a concave object-side surface and a concave image-side surface. The third lens 1030 may have positive refractive power, and may have a concave object-side surface and a convex image-side surface. The fourth lens 1040 may have positive refractive power, and may have a concave object-side surface and a convex image-side surface. The fifth lens 1050 may have positive refractive power, and may have a convex object-side surface and a convex image-side surface. The sixth lens 1060 may have negative refractive power, and may have a concave object-side surface and a concave image-side surface. The seventh lens 1070 may have positive refractive power, and may have a convex object-side surface and a convex image-side surface.

The imaging lens system 1000 may include a lens having an inflection point. For example, an inflection point may be formed on an object-side surface of the second lens 1020 in the imaging lens system 1000 according to the embodiment. However, the lens in which the inflection point is formed is not limited to the second lens 1020.

The imaging lens system 1000 may further include a stop ST, a filter IF, a cover glass CG, and an imaging plane IP. The stop ST may be disposed between the third lens 1030 and the fourth lens 1040, and the filter IF and the cover glass CG may be disposed in this order between the seventh lens 1070 and the imaging plane IP. The imaging plane IP may be formed on one surface of the image sensor IS of the camera module or in the image sensor IS.

Figure 20:
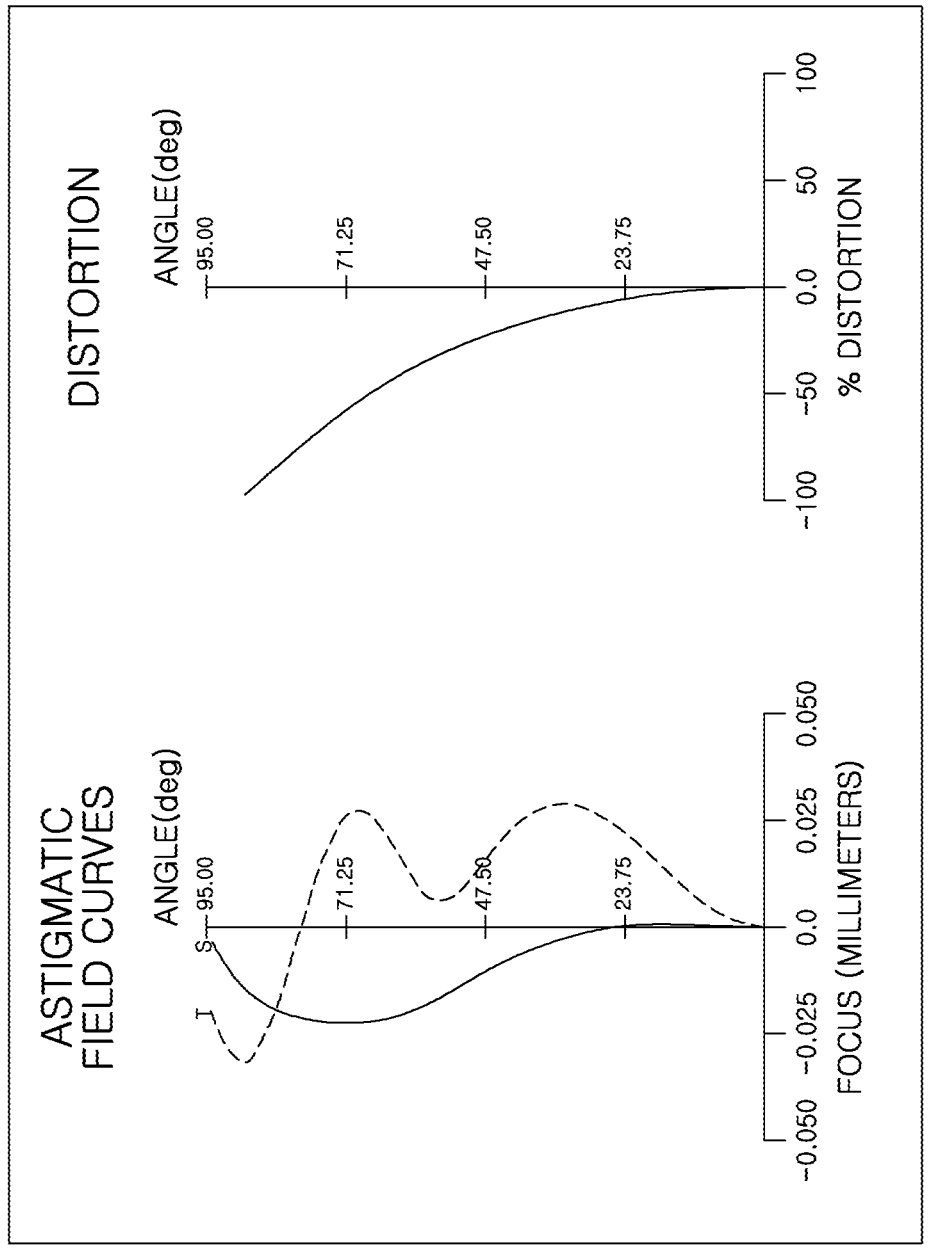
FIG. 20 displays aberration curves of the imaging lens system illustrated in FIG. 19.

Tables 19 and 20 list characteristics of the lenses and aspheric values of the imaging lens system according to the embodiment, and FIG. 20 displays aberration curves of the imaging lens system according to the embodiment.

TABLE 19

| Surface No. | Components | Radius of Curvature | Thickness/ Distance | Refractive Index | Abbe Number | Effective Radius |
|---|---|---|---|---|---|---|
| S1 | 1st lens | 14.8470 | 0.8000 | 1.776 | 49.6 | 6.073 |
| S2 | | 4.0000 | 1.7780 | | | 3.560 |
| S3 | 2nd lens | −9.6060 | 0.8000 | 1.537 | 55.7 | 3.312 |
| S4 | | 9.8010 | 1.7610 | | | 2.336 |
| S5 | 3rd lens | −4.0740 | 2.1250 | 1.626 | 25.9 | 1.766 |
| S6 | | −3.0190 | 0.1100 | | | 1.500 |
| S7 | Stop | Infinity | 0.3120 | | | 1.345 |
| S8 | 4th lens | −4.6210 | 1.4720 | 1.503 | 56.4 | 1.398 |
| S9 | | −2.5690 | 0.1100 | | | 1.781 |
| S10 | 5th lens | 3.8140 | 2.0830 | 1.503 | 56.4 | 2.165 |
| S11 | | −3.3000 | 0.1100 | | | 2.114 |
| S12 | 6th lens | −3.0350 | 0.8000 | 1.816 | 22.8 | 2.072 |
| S13 | | 4.9380 | 0.1700 | | | 2.332 |
| S14 | 7th lens | 3.8000 | 2.2150 | 1.537 | 55.7 | 2.681 |
| S15 | | −4.0000 | 0.6000 | | | 2.785 |
| S16 | Filter | Infinity | 0.4000 | 1.519 | 64.2 | 2.863 |
| S17 | | Infinity | 0.5000 | | | 2.881 |
| S18 | Cover glass | Infinity | 0.4000 | 1.500 | 67.0 | 2.914 |
| S19 | | Infinity | 0.4540 | | | 2.933 |
| S20 | Imaging plane | Infinity | 0.0000 | | | 2.981 |

TABLE 20

| Surface No. | S3 | S4 | S5 | S6 | S8 | S9 |
|---|---|---|---|---|---|---|
| K | 0 | 0 | 0 | 0 | 0 | 0 |
| A | 1.714E−02 | 2.047E−02 | −1.453E−02 | 8.078E−03 | 3.166E−03 | −1.381E−03 |
| B | −7.459E−04 | 5.499E−04 | 1.465E−03 | 5.776E−03 | 2.778E−03 | −8.062E−04 |
| C | −3.600E−07 | 3.429E−04 | 1.286E−04 | −2.153E−03 | −1.914E−03 | 2.258E−04 |
| D | 7.156E−07 | −9.675E−05 | 0.000E+00 | 5.753E−04 | 1.464E−04 | −7.060E−05 |

| Surface No. | S10 | S11 | S12 | S13 | S14 | S15 |
|---|---|---|---|---|---|---|
| K | 0 | 0 | 0 | 0 | −1.242E+00 | −8.753E+00 |
| A | 4.375E−04 | −1.660E−02 | −1.762E−02 | −6.011E−03 | −1.507E−03 | −6.502E−03 |
| B | −8.415E−04 | 1.108E−02 | 1.472E−02 | 2.950E−03 | 1.550E−04 | 4.053E−03 |

TABLE 20-continued

| | | | | | |
|---|---|---|---|---|---|
| C | −3.008E−05 | −2.595E−03 | −3.440E−03 | −5.961E−04 | −5.044E−05 | −6.669E−04 |
| D | 3.239E−05 | 2.402E−04 | 2.795E−04 | 3.420E−05 | 3.820E−06 | 3.478E−05 |

Figure 21:
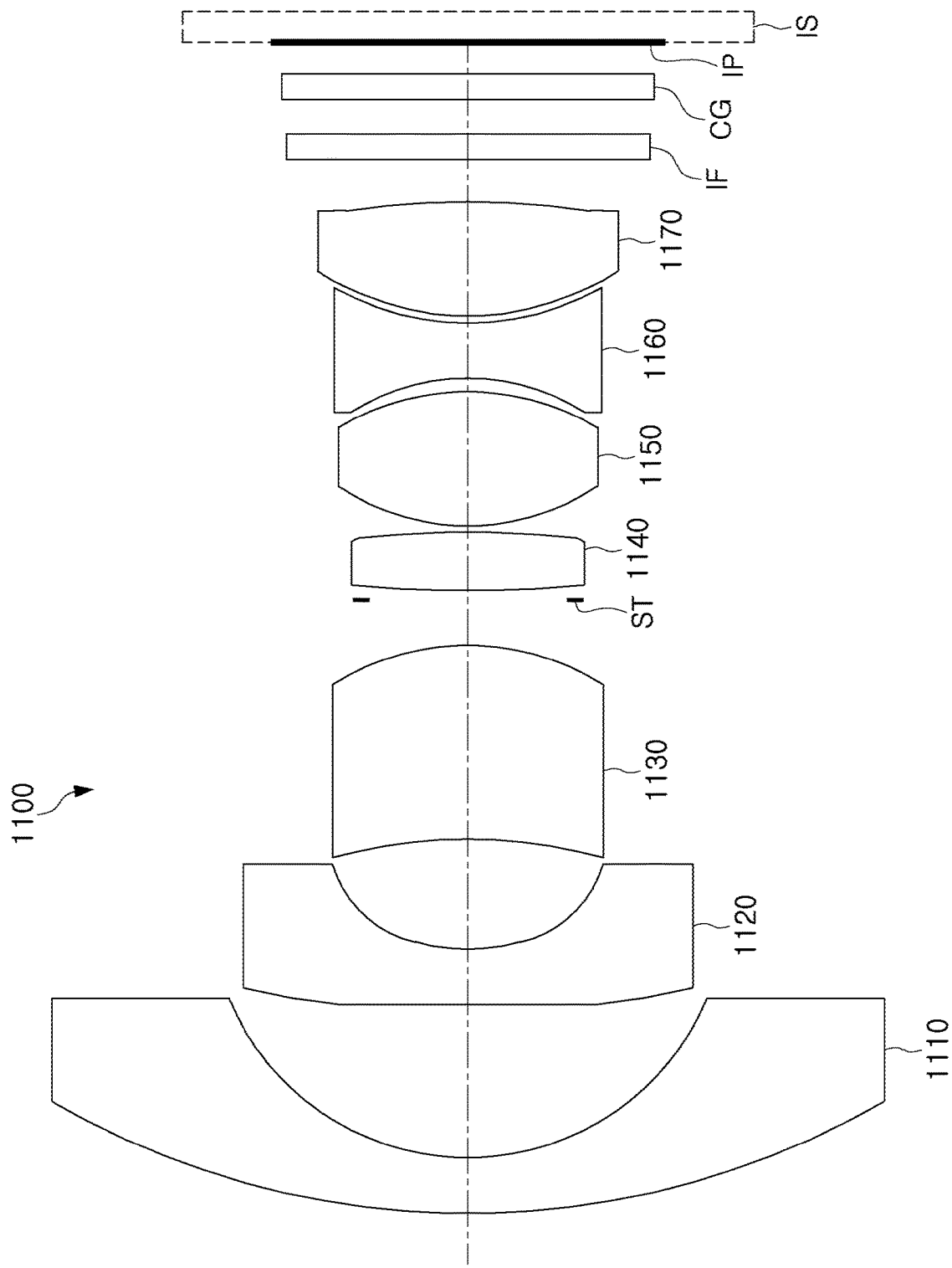
FIG. 21 is a diagram illustrating an imaging lens system according to an eleventh embodiment of the present disclosure.

An imaging lens system according to an eleventh embodiment will be described with reference to FIG. 21.

The imaging lens system 1100 may include a first lens 1110, a second lens 1120, a third lens 1130, a fourth lens 1140, a fifth lens 1150, a sixth lens 1160, and a seventh lens 1170.

The first lens 1110 may have negative refractive power, and may have a convex object-side surface and a concave image-side surface. The second lens 1120 may have negative refractive power, and may have a concave object-side surface and a concave image-side surface. The third lens 1130 may have positive refractive power, and may have a concave object-side surface and a convex image-side surface. The fourth lens 1140 may have negative refractive power, and may have a concave object-side surface and a convex image-side surface. The fifth lens 1150 may have positive refractive power, and may have a convex object-side surface and a convex image-side surface. The sixth lens 1160 may have negative refractive power, and may have a concave object-side surface and a concave image-side surface. The seventh lens 1170 may have positive refractive power, and may have a convex object-side surface and a convex image-side surface.

The imaging lens system 1100 may include a lens having an inflection point. For example, an inflection point may be formed on an object-side surface of the second lens 1120 in the imaging lens system 1100 according to the embodiment. However, the lens in which the inflection point is formed is not limited to the second lens 1120.

The imaging lens system 1100 may further include a stop ST, a filter IF, a cover glass CG, and an imaging plane IP.

TABLE 21

| Surface No. | Components | Radius of Curvature | Thickness/ Distance | Refractive Index | Abbe Number | Effective Radius |
|---|---|---|---|---|---|---|
| S1 | 1st lens | 12.5950 | 0.8000 | 1.776 | 49.6 | 6.191 |
| S2 | | 3.8970 | 2.2400 | | | 3.566 |
| S3 | 2nd lens | −19.9430 | 0.8000 | 1.539 | 56.0 | 3.347 |
| S4 | | 3.7000 | 1.6050 | | | 2.002 |
| S5 | 3rd lens | −9.8970 | 2.8000 | 1.666 | 39.5 | 1.980 |
| S6 | | −3.3830 | 0.6440 | | | 2.022 |
| S7 | Stop | Infinity | 0.1510 | | | 1.484 |
| S8 | 4th lens | −20.5660 | 0.8350 | 1.504 | 56.4 | 1.574 |
| S9 | | −21.0000 | 0.1100 | | | 1.734 |
| S10 | 5th lens | 2.9300 | 1.9380 | 1.537 | 56.1 | 1.935 |
| S11 | | −3.8000 | 0.1800 | | | 1.865 |
| S12 | 6th lens | −4.0720 | 0.8000 | 1.668 | 20.4 | 1.781 |
| S13 | | 3.6100 | 0.1100 | | | 1.996 |
| S14 | 7th lens | 3.2910 | 1.6560 | 1.539 | 56.0 | 2.122 |
| S15 | | −17.1090 | 0.6000 | | | 2.244 |
| S16 | Filter | Infinity | 0.4000 | 1.519 | 64.2 | 2.507 |
| S17 | | Infinity | 0.5000 | | | 2.598 |
| S18 | Cover glass | Infinity | 0.4000 | 1.500 | 67.0 | 2.777 |
| S19 | | Infinity | 0.4320 | | | 2.870 |
| S20 | Imaging plane | Infinity | 0.0000 | | | 3.028 |

TABLE 22

| Surface No. | S3 | S4 | S5 | S6 | S8 | S9 |
|---|---|---|---|---|---|---|
| K | 0 | 0 | 0 | 0 | 0 | 0 |
| A | 6.709E−01 | 5.603E−01 | −6.205E−02 | 1.185E−01 | 1.180E−01 | −2.303E−02 |
| B | −1.079E−01 | 9.549E−02 | 5.120E−03 | −9.058E−03 | −1.158E−02 | −5.661E−03 |
| C | −6.412E−04 | 1.669E−02 | −7.287E−04 | 6.788E−04 | 6.567E−04 | 3.533E−04 |
| D | 3.199E−03 | 2.071E−03 | 2.000E−05 | −8.800E−05 | −1.090E−04 | |

| Surface No. | S10 | S11 | S12 | S13 | S14 | S15 |
|---|---|---|---|---|---|---|
| K | 0 | 0 | 0 | 0 | −1.207E+00 | −9.900E+01 |
| A | −1.538E−01 | 4.242E−03 | −6.466E−02 | −4.434E−02 | −1.125E−01 | −6.988E−02 |
| B | 8.572E−03 | 4.788E−03 | −6.455E−03 | 1.402E−03 | 2.844E−02 | 3.574E−02 |
| C | 5.343E−04 | −1.170E−03 | −2.915E−03 | −3.122E−03 | −4.333E−03 | 2.061E−03 |
| D | 4.173E−04 | 1.149E−03 | 2.407E−04 | 4.757E−04 | 5.713E−04 | 3.000E−05 |

The stop ST may be disposed between the third lens 1130 and the fourth lens 1140, and the filter IF and the cover glass CG may be disposed in this order between the seventh lens 1170 and the imaging plane IP. The imaging plane IP may be formed on one surface of the image sensor IS of the camera module or in the image sensor IS.

Figure 22:
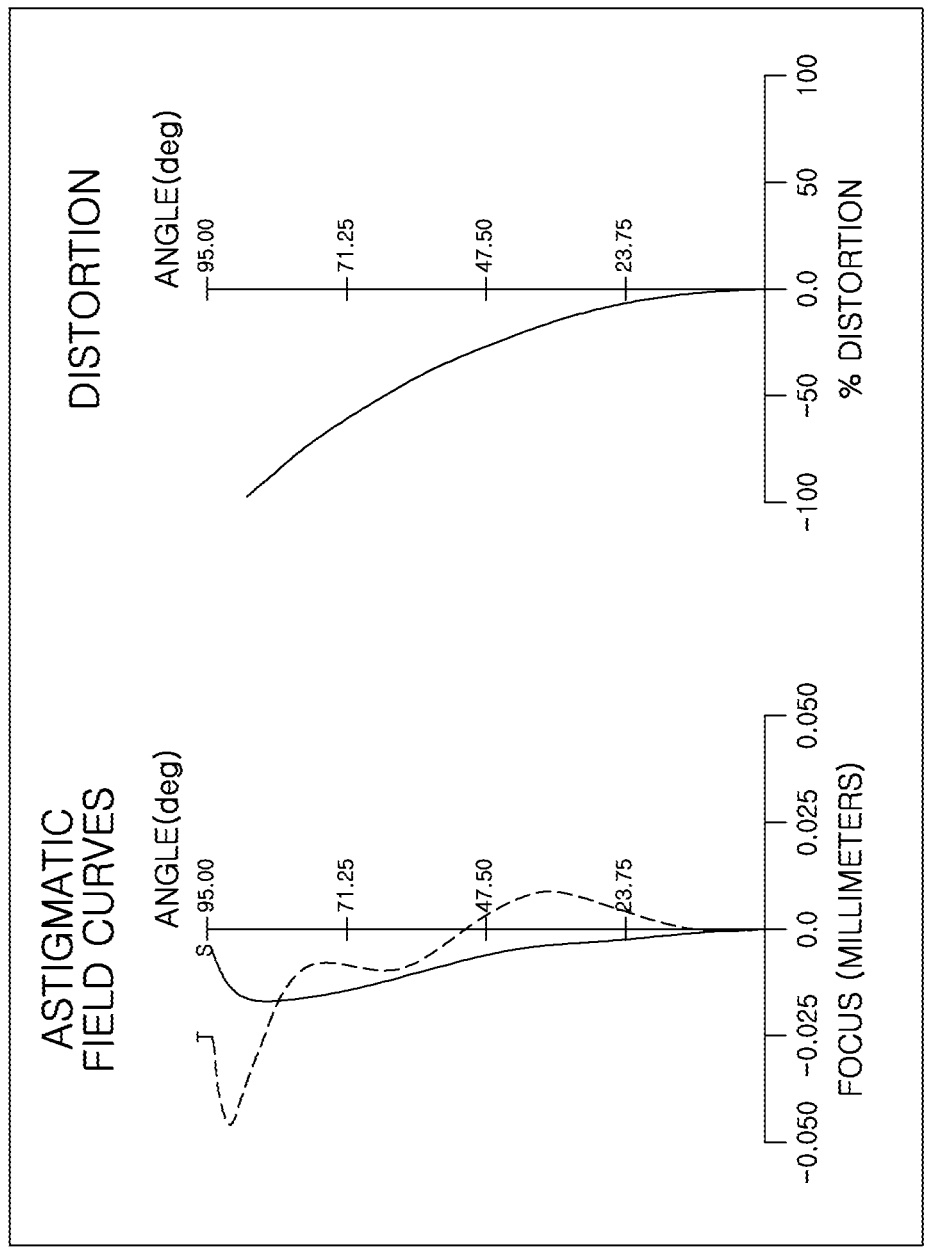
FIG. 22 displays aberration curves of the imaging lens system illustrated in FIG. 21.

Tables 21 and 22 list characteristics of the lenses and aspheric values of the imaging lens system according to the embodiment, and FIG. 22 displays aberration curves of the imaging lens system according to the embodiment.

Figure 23:
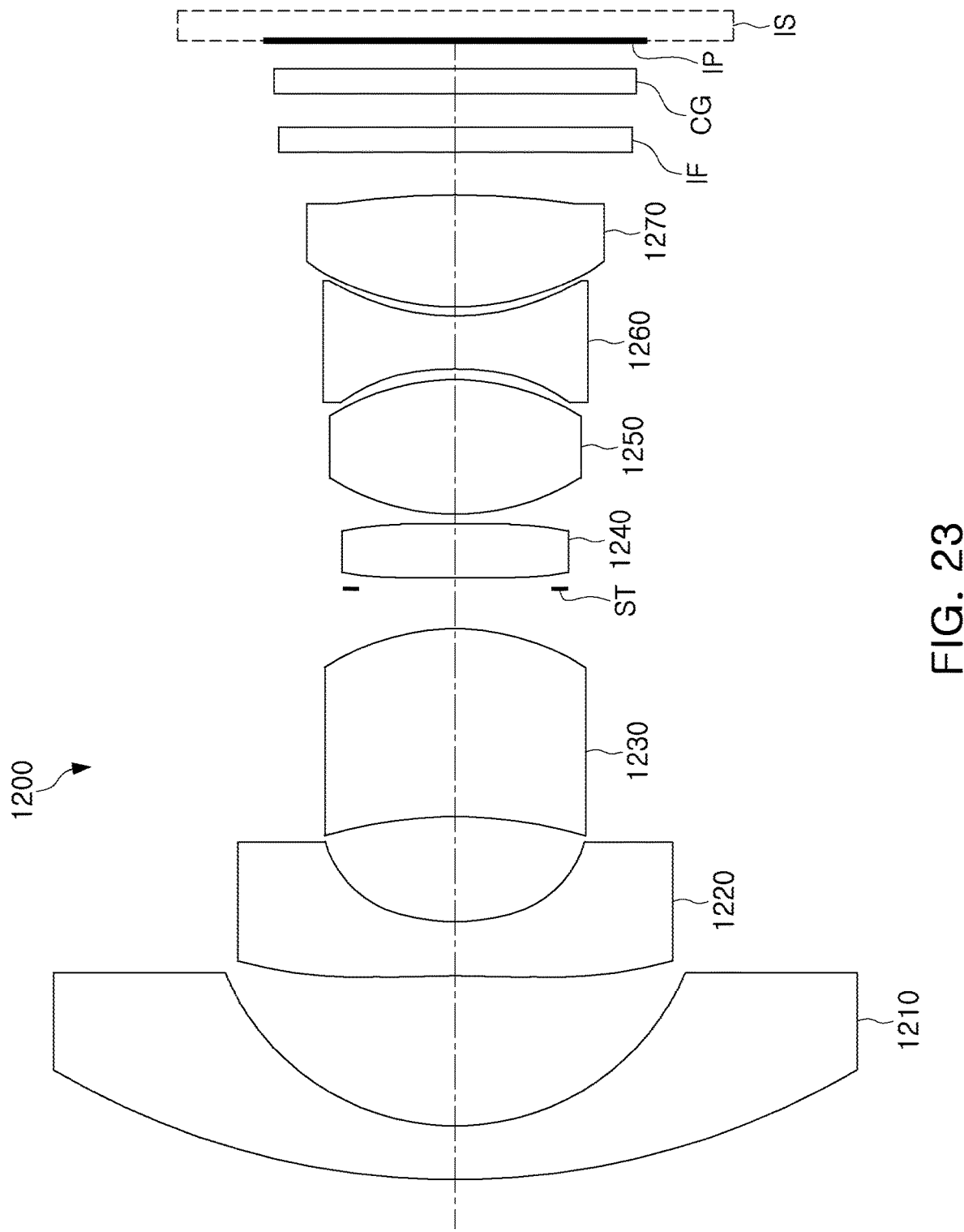
FIG. 23 is a diagram illustrating an imaging lens system according to a twelfth embodiment of the present disclosure.

An imaging lens system according to a twelfth embodiment will be described with reference to FIG. 23.

The imaging lens system 1200 may include a first lens 1210, a second lens 1220, a third lens 1230, a fourth lens 1240, a fifth lens 1250, a sixth lens 1260, and a seventh lens 1270.

The first lens 1210 may have negative refractive power, and may have a convex object-side surface and a concave image-side surface. The second lens 1220 may have negative refractive power, and may have a concave object-side surface and a concave image-side surface. The third lens 1230 may have positive refractive power, and may have a concave object-side surface and a convex image-side surface. The fourth lens 1240 may have negative refractive power, and may have a concave object-side surface and a convex image-side surface. The fifth lens 1250 may have positive refractive power, and may have a convex object-side surface and a convex image-side surface. The sixth lens 1260 may have negative refractive power, and may have a concave object-side surface and a concave image-side surface. The seventh lens 1270 may have positive refractive power, and may have a convex object-side surface and a convex image-side surface.

The imaging lens system 1200 may include a lens having an inflection point. For example, an inflection point may be formed on an object-side surface of the second lens 1220 in the imaging lens system 1200 according to the embodiment. However, the lens in which the inflection point is formed is not limited to the second lens 1220.

The imaging lens system 1200 may further include a stop ST, a filter IF, a cover glass CG, and an imaging plane IP. The stop ST may be disposed between the third lens 1230 and the fourth lens 1240, and the filter IF and the cover glass CG may be disposed in this order between the seventh lens 1270 and the imaging plane IP. The imaging plane IP may be formed on one surface of the image sensor IS of the camera module or in the image sensor IS.

Figure 24:
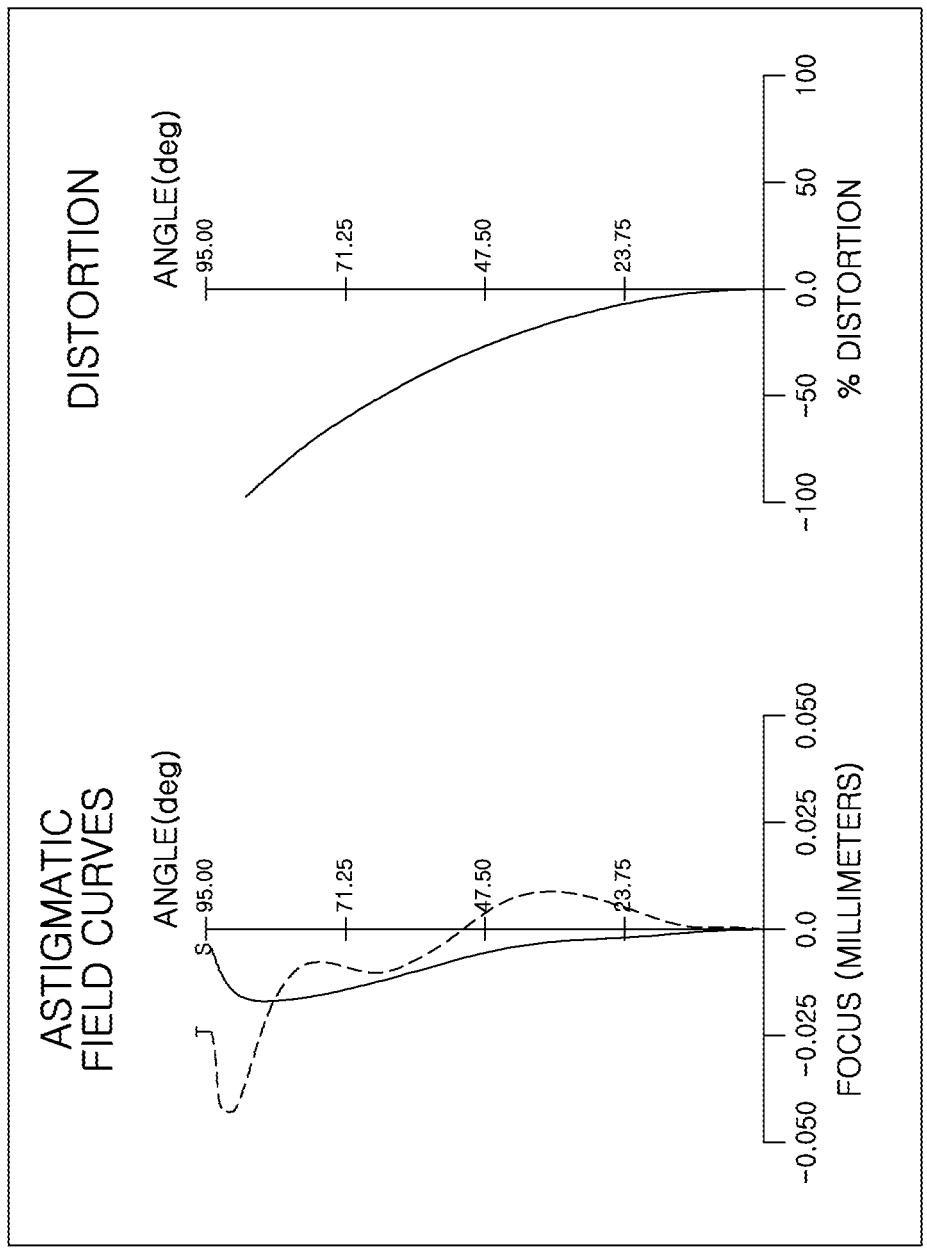
FIG. 24 displays aberration curves of the imaging lens system illustrated in FIG. 23.

Tables 23 and 24 list characteristics of the lenses and aspheric values of the imaging lens system according to the embodiment, and FIG. 24 displays aberration curves of the imaging lens system according to the embodiment.

TABLE 23

| Surface No. | Components | Radius of Curvature | Thickness/ Distance | Refractive Index | Abbe Number | Effective Radius |
|---|---|---|---|---|---|---|
| S1 | 1st lens | 12.4870 | 0.8000 | 1.776 | 49.6 | 6.146 |
| S2 | | 3.8650 | 2.2390 | | | 3.536 |
| S3 | 2nd lens | −18.4860 | 0.8000 | 1.539 | 56.0 | 3.316 |
| S4 | | 3.7000 | 1.5700 | | | 1.985 |
| S5 | 3rd lens | −9.8620 | 2.8000 | 1.660 | 39.9 | 1.963 |
| S6 | | −3.3500 | 0.6010 | | | 2.002 |
| S7 | Stop | Infinity | 0.1510 | | | 1.490 |
| S8 | 4th lens | −20.5660 | 0.8350 | 1.504 | 56.4 | 1.584 |
| S9 | | −23.0000 | 0.1100 | | | 1.742 |

TABLE 23-continued

| Surface No. | Components | Radius of Curvature | Thickness/ Distance | Refractive Index | Abbe Number | Effective Radius |
|---|---|---|---|---|---|---|
| S10 | 5th lens | 2.9120 | 1.9990 | 1.537 | 56.1 | 1.940 |
| S11 | | −3.8000 | 0.1800 | | | 1.869 |
| S12 | 6th lens | −4.0330 | 0.8000 | 1.668 | 20.4 | 1.786 |
| S13 | | 3.6250 | 0.1100 | | | 2.024 |
| S14 | 7th lens | 3.2800 | 1.6960 | 1.539 | 56.0 | 2.174 |
| S15 | | −15.6010 | 0.6000 | | | 2.274 |
| S16 | Filter | Infinity | 0.4000 | 1.519 | 64.2 | 2.528 |
| S17 | | Infinity | 0.5000 | | | 2.617 |
| S18 | Cover glass | Infinity | 0.4000 | 1.500 | 67.0 | 2.790 |
| S19 | | Infinity | 0.4090 | | | 2.880 |
| S20 | Imaging plane | Infinity | 0.0000 | | | 3.025 |

TABLE 24

| Surface No. | S3 | S4 | S5 | S6 | S8 | S9 |
|---|---|---|---|---|---|---|
| K | 0 | 0 | 0 | 0 | 0 | 0 |
| A | 5.992E−01 | 5.091E−01 | −7.999E−02 | 1.122E−01 | 1.365E−01 | −3.102E−02 |
| B | −8.299E−02 | 8.387E−02 | 6.869E−03 | −8.011E−03 | −1.418E−02 | −6.318E−03 |
| C | −2.323E−03 | 1.413E−02 | −9.657E−04 | 6.355E−04 | 8.318E−04 | 5.804E−04 |
| D | 2.060E−03 | 1.698E−03 | 6.300E−05 | −8.100E−05 | −1.581E−04 | |

| Surface No. | S10 | S11 | S12 | S13 | S14 | S15 |
|---|---|---|---|---|---|---|
| K | 0 | 0 | 0 | 0 | −1.136E+00 | −9.900E+01 |
| A | −1.919E−01 | 2.652E−03 | −7.567E−02 | −6.634E−02 | −1.240E−01 | −6.256E−02 |
| B | 1.241E−02 | 2.972E−03 | −8.612E−03 | −2.025E−03 | 3.660E−02 | 4.778E−02 |
| C | 1.495E−03 | −1.212E−03 | −3.369E−03 | −4.475E−03 | −5.621E−03 | 3.062E−03 |
| D | 7.048E−04 | 9.360E−04 | 2.816E−04 | 9.519E−04 | 9.639E−04 | 1.357E−04 |

Figure 25:
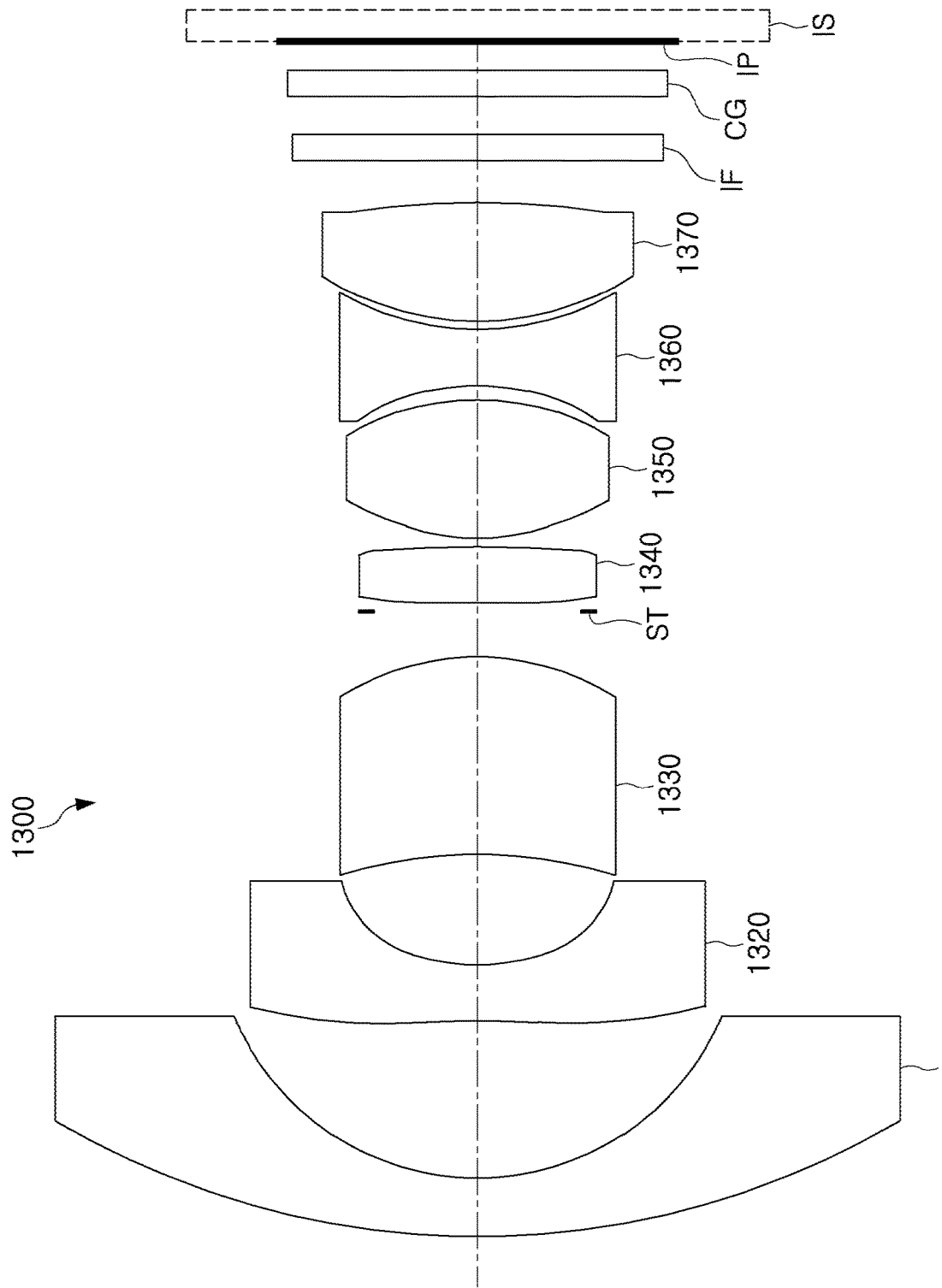
FIG. 25 is a diagram illustrating an imaging lens system according to a thirteenth embodiment of the present disclosure.

An imaging lens system according to a thirteenth embodiment will be described with reference to FIG. 25.

The imaging lens system 1300 may include a first lens 1310, a second lens 1320, a third lens 1330, a fourth lens 1340, a fifth lens 1350, a sixth lens 1360, and a seventh lens 1370.

The first lens 1310 may have negative refractive power, and may have a convex object-side surface and a concave image-side surface. The second lens 1320 may have negative refractive power, and may have a concave object-side surface and a concave image-side surface. The third lens 1330 may have positive refractive power, and may have a concave object-side surface and a convex image-side surface. The fourth lens 1340 may have negative refractive power, and may have a concave object-side surface and a convex image-side surface. The fifth lens 1350 may have positive refractive power, and may have a convex object-side surface and a convex image-side surface. The sixth lens 1360 may have negative refractive power, and may have a concave object-side surface and a concave image-side surface. The seventh lens 1370 may have positive refractive power, and may have a convex object-side surface and a convex image-side surface.

The imaging lens system 1300 may include a lens having an inflection point. For example, an inflection point may be formed on an object-side surface of the second lens 1320 in the imaging lens system 1300 according to the embodiment. However, the lens in which the inflection point is formed is not limited to the second lens 1320.

The imaging lens system 1300 may further include a stop ST, a filter IF, a cover glass CG, and an imaging plane IP. The stop ST may be disposed between the third lens 1330 and the fourth lens 1340, and the filter IF and the cover glass CG may be disposed in this order between the seventh lens 1370 and the imaging plane IP. The imaging plane IP may be formed on one surface of the image sensor IS of the camera module or in the image sensor IS.

Figure 26:
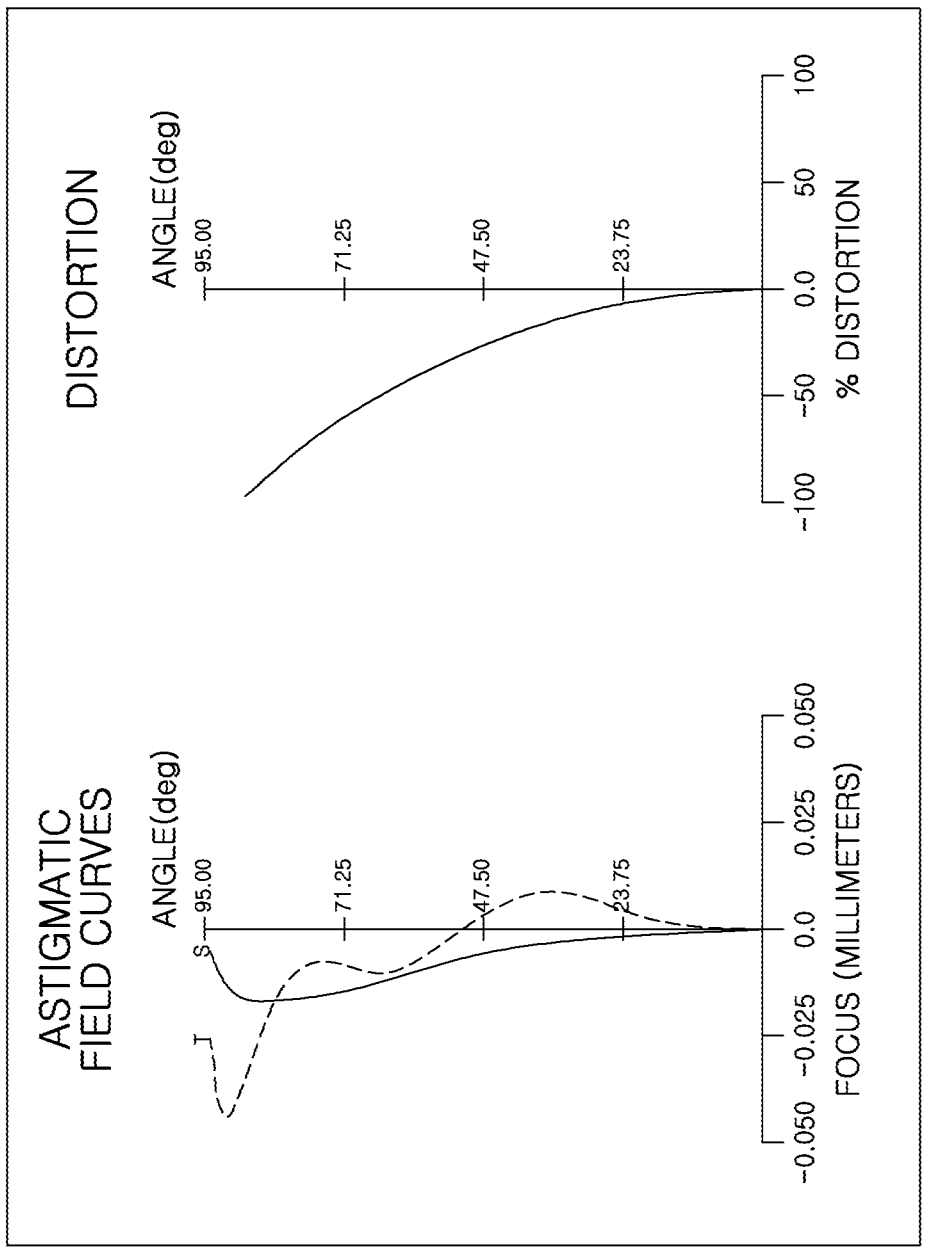
FIG. 26 displays aberration curves of the imaging lens system illustrated in FIG. 25.

Tables 25 and 26 list characteristics of the lenses and aspheric values of the imaging lens system according to the embodiment, and FIG. 26 displays aberration curves of the imaging lens system according to the embodiment.

TABLE 25

| Surface No. | Components | Radius of Curvature | Thickness/ Distance | Refractive Index | Abbe Number | Effective Radius |
|---|---|---|---|---|---|---|
| S1 | 1st lens | 12.4720 | 0.8000 | 1.776 | 49.6 | 6.159 |
| S2 | | 3.8760 | 2.2500 | | | 3.546 |
| S3 | 2nd lens | −18.3660 | 0.8000 | 1.539 | 56.0 | 3.325 |
| S4 | | 3.7000 | 1.5680 | | | 1.990 |
| S5 | 3rd lens | −9.6010 | 2.8000 | 1.660 | 39.8 | 1.972 |
| S6 | | −3.3240 | 0.6350 | | | 2.023 |
| S7 | Stop | Infinity | 0.1510 | | | 1.491 |
| S8 | 4th lens | −20.5660 | 0.8000 | 1.504 | 56.4 | 1.585 |
| S9 | | −23.0000 | 0.1100 | | | 1.733 |
| S10 | 5th lens | 2.9180 | 1.9820 | 1.537 | 56.1 | 1.926 |
| S11 | | −3.8000 | 0.1800 | | | 1.860 |
| S12 | 6th lens | −4.0270 | 0.8000 | 1.668 | 20.4 | 1.780 |
| S13 | | 3.6150 | 0.1100 | | | 2.014 |
| S14 | 7th lens | 3.2920 | 1.6990 | 1.539 | 56.0 | 2.167 |
| S15 | | −14.9630 | 0.6000 | | | 2.267 |
| S16 | Filter | Infinity | 0.4000 | 1.519 | 64.2 | 2.523 |
| S17 | | Infinity | 0.5000 | | | 2.612 |
| S18 | Cover glass | Infinity | 0.4000 | 1.500 | 67.0 | 2.787 |
| S19 | | Infinity | 0.4160 | | | 2.877 |
| S20 | Imaging plane | Infinity | 0.0000 | | | 3.025 |

TABLE 26

| Surface No. | S3 | S4 | S5 | S6 | S8 | S9 |
|---|---|---|---|---|---|---|
| K | 0 | 0 | 0 | 0 | 0 | 0 |
| A | 5.992E−01 | 5.090E−01 | −7.999E−02 | 1.123E−01 | 1.370E−01 | −3.129E−02 |
| B | −8.299E−02 | 8.387E−02 | 6.495E−03 | −6.969E−03 | −1.386E−02 | −6.095E−03 |
| C | −1.933E−03 | 1.422E−02 | −8.664E−04 | 5.825E−04 | 8.358E−04 | 6.701E−04 |
| D | 1.991E−03 | 1.734E−03 | 5.400E−05 | −6.900E−05 | −1.550E−04 | |
| Surface No. | S10 | S11 | S12 | S13 | S14 | S15 |
| K | 0 | 0 | 0 | 0 | −1.082E+00 | −9.900E+01 |
| A | −1.919E−01 | 2.652E−03 | −7.567E−02 | −6.634E−02 | −1.240E−01 | −6.256E−02 |
| B | 1.199E−02 | 1.795E−03 | −8.651E−03 | −1.345E−03 | 3.664E−02 | 4.778E−02 |
| C | 1.482E−03 | −7.396E−04 | −3.101E−03 | −4.409E−03 | −5.532E−03 | 3.157E−03 |
| D | 7.087E−04 | 1.062E−03 | 2.879E−04 | 9.475E−04 | 9.904E−04 | 1.909E−04 |

Figure 27:
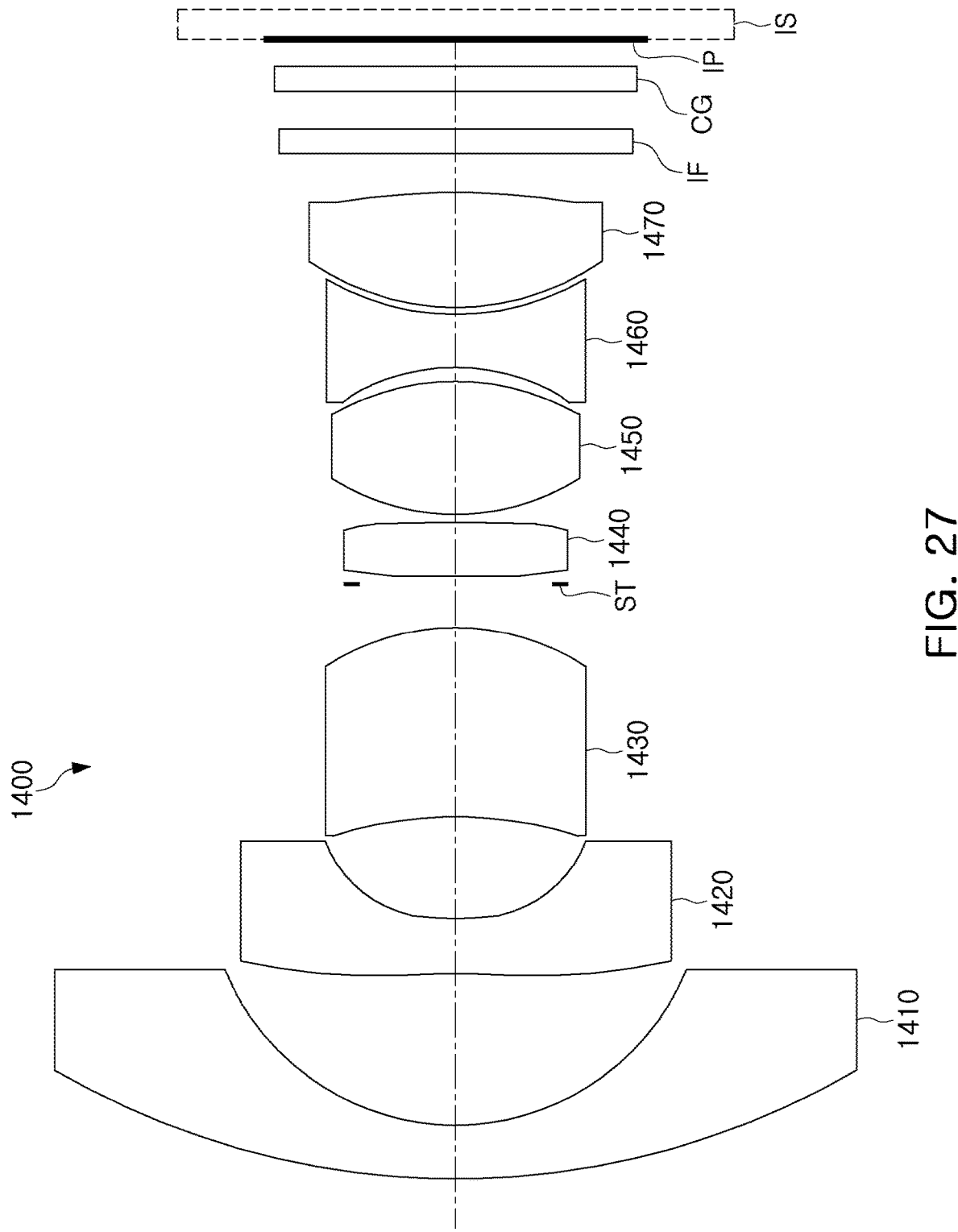
FIG. 27 is a diagram illustrating an imaging lens system according to a fourteenth embodiment of the present disclosure.

An imaging lens system according to a fourteenth embodiment will be described with reference to FIG. 27.

The imaging lens system 1400 may include a first lens 1410, a second lens 1420, a third lens 1430, a fourth lens 1440, a fifth lens 1450, a sixth lens 1460, and a seventh lens 1470.

The first lens 1410 may have negative refractive power, and may have a convex object-side surface and a concave image-side surface. The second lens 1420 may have negative refractive power, and may have a concave object-side surface and a concave image-side surface. The third lens 1430 may have positive refractive power, and may have a concave object-side surface and a convex image-side surface. The fourth lens 1440 may have negative refractive power, and may have a concave object-side surface and a convex image-side surface. The fifth lens 1450 may have positive refractive power, and may have a convex object-side surface and a convex image-side surface. The sixth lens 1460 may have negative refractive power, and may have a concave object-side surface and a concave image-side surface. The seventh lens 1470 may have positive refractive power, and may have a convex object-side surface and a convex image-side surface.

The imaging lens system 1400 may include a lens having an inflection point. For example, an inflection point may be formed on an object-side surface of the second lens 1420 in the imaging lens system 1400 according to the embodiment. However, the lens in which the inflection point is formed is not limited to the second lens 1420.

The imaging lens system 1400 may further include a stop ST, a filter IF, a cover glass CG, and an imaging plane IP. The stop ST may be disposed between the third lens 1430 and the fourth lens 1440, and the filter IF and the cover glass CG may be disposed in this order between the seventh lens 1470 and the imaging plane IP. The imaging plane IP may be formed on one surface of the image sensor IS of the camera module or in the image sensor IS.

Figure 28:
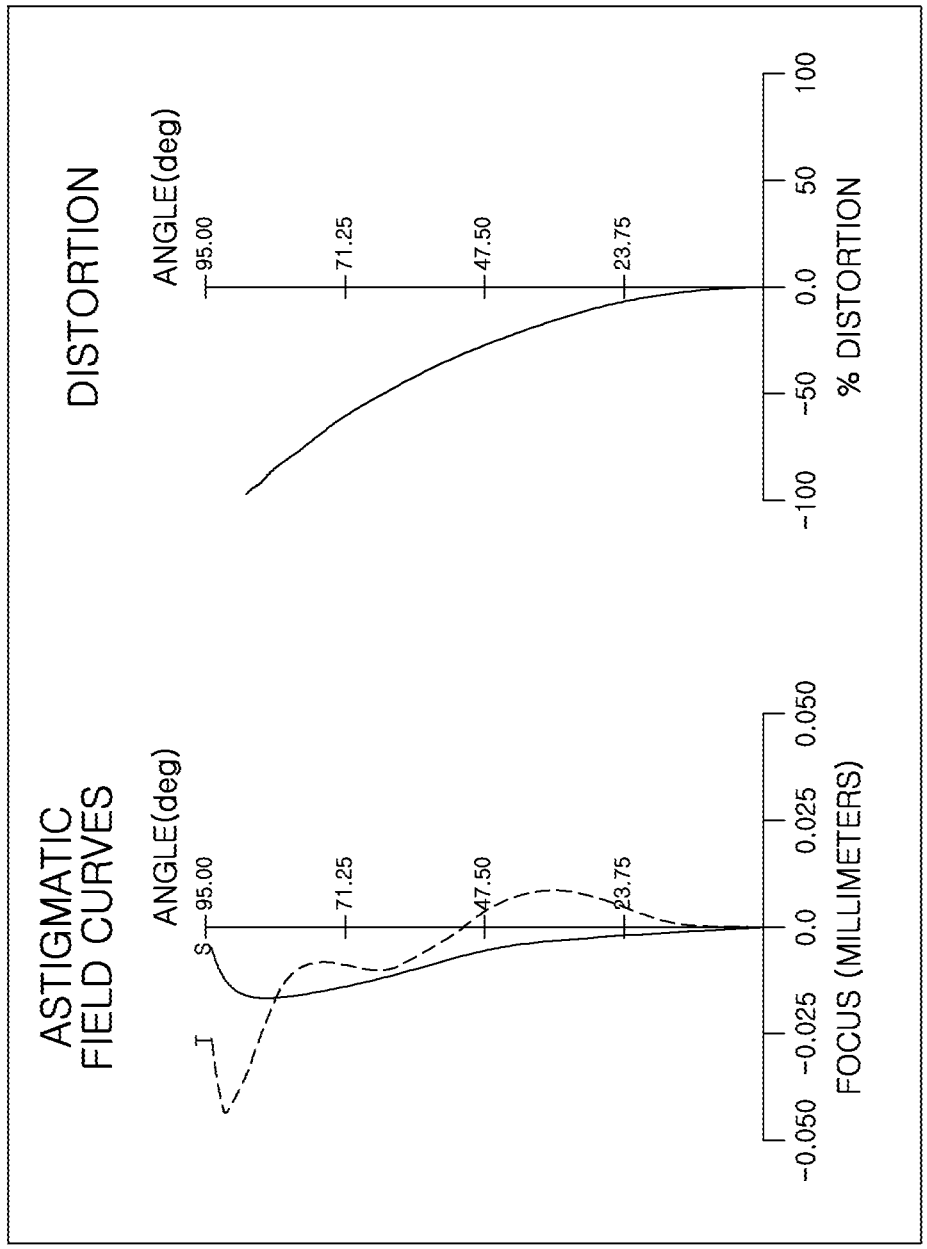
FIG. 28 displays aberration curves of the imaging lens system illustrated in FIG. 27.

Tables 27 and 28 list characteristics of the lenses and aspheric values of the imaging lens system according to the embodiment, and FIG. 28 displays aberration curves of the imaging lens system according to the embodiment.

TABLE 27

| Surface No. | Components | Radius of Curvature | Thickness/ Distance | Refractive Index | Abbe Number | Effective Radius |
|---|---|---|---|---|---|---|
| S1 | 1st lens | 12.4200 | 0.8000 | 1.776 | 49.6 | 6.157 |
| S2 | | 3.8760 | 2.2530 | | | 3.546 |
| S3 | 2nd lens | −18.5030 | 0.8000 | 1.539 | 56.0 | 3.324 |

TABLE 27-continued

| Surface No. | Components | Radius of Curvature | Thickness/ Distance | Refractive Index | Abbe Number | Effective Radius |
|---|---|---|---|---|---|---|
| S4 | | 3.7000 | 1.5620 | | | 1.991 |
| S5 | 3rd lens | −9.3220 | 2.8000 | 1.659 | 39.9 | 1.970 |
| S6 | | −3.3040 | 0.6340 | | | 2.019 |
| S7 | Stop | Infinity | 0.1510 | | | 1.493 |
| S8 | 4th lens | −20.5000 | 0.8000 | 1.504 | 56.4 | 1.593 |
| S9 | | −23.0000 | 0.1100 | | | 1.737 |
| S10 | 5th lens | 2.9110 | 1.9840 | 1.537 | 56.1 | 1.928 |
| S11 | | −3.8000 | 0.1800 | | | 1.863 |
| S12 | 6th lens | −4.0240 | 0.8000 | 1.668 | 20.4 | 1.783 |
| S13 | | 3.5940 | 0.1100 | | | 2.013 |
| S14 | 7th lens | 3.3100 | 1.7020 | 1.539 | 56.0 | 2.168 |
| S15 | | −14.3470 | 0.6000 | | | 2.265 |
| S16 | Filter | Infinity | 0.4000 | 1.519 | 64.2 | 2.522 |

TABLE 27-continued

| Surface No. | Components | Radius of Curvature | Thickness/ Distance | Refractive Index | Abbe Number | Effective Radius |
|---|---|---|---|---|---|---|
| S17 | | Infinity | 0.5000 | | | 2.611 |
| S18 | Cover glass | Infinity | 0.4000 | 1.500 | 67.0 | 2.787 |
| S19 | | Infinity | 0.4140 | | | 2.877 |
| S20 | Imaging plane | Infinity | 0.0000 | | | 3.026 |

TABLE 28

| Surface No. | S3 | S4 | S5 | S6 | S8 | S9 |
|---|---|---|---|---|---|---|
| K | 0 | 0 | 0 | 0 | 0 | 0 |
| A | 5.992E−01 | 5.063E−01 | −7.999E−02 | 1.132E−01 | 1.377E−01 | −3.205E−02 |
| B | −8.299E−02 | 8.385E−02 | 5.809E−03 | −6.267E−03 | −1.336E−02 | −5.186E−03 |
| C | −1.651E−03 | 1.427E−02 | −7.555E−04 | 6.046E−04 | 8.894E−04 | 8.761E−04 |
| D | 2.021E−03 | 1.749E−03 | 3.800E−05 | −5.900E−05 | −1.437E−04 | |

| Surface No. | S10 | S11 | S12 | S13 | S14 | S15 |
|---|---|---|---|---|---|---|
| K | 0 | 0 | 0 | 0 | −1.017E+00 | −9.900E+01 |
| A | −1.919E−01 | 2.652E−03 | −7.567E−02 | −6.634E−02 | −1.240E−01 | −6.256E−02 |
| B | 1.088E−02 | 4.592E−04 | −8.525E−03 | −3.737E−04 | 3.675E−02 | 4.778E−02 |
| C | 1.419E−03 | 8.800E−05 | −2.626E−03 | −4.256E−03 | −5.427E−03 | 3.306E−03 |
| D | 6.519E−04 | 1.122E−03 | 2.572E−04 | 8.701E−04 | 9.956E−04 | 2.681E−04 |

Tables 29 to 31 are optical characteristic values and conditional expression values of the imaging lens system according to the first to fourteenth embodiments.

TABLE 29

| Elements | First Embodiment | Second Embodiment | Third Embodiment | Fourth Embodiment | Fifth Embodiment | Sixth Embodiment | Seventh Embodiment |
|---|---|---|---|---|---|---|---|
| f1 | −6.624 | −6.698 | −6.785 | −6.681 | −6.681 | −6.889 | −6.614 |
| f2 | −5.120 | −5.051 | −4.899 | −4.886 | −4.443 | −4.083 | −4.024 |
| f3 | 7.877 | 9.223 | 9.653 | 10.258 | 10.908 | 12.528 | 9.425 |
| f4 | 10.171 | 8.556 | 7.936 | 7.564 | 7.602 | 6.305 | 5.913 |
| f5 | 4.036 | 4.081 | 4.172 | 4.342 | 4.502 | 6.003 | 6.003 |
| f6 | −3.262 | −3.271 | −3.302 | −3.402 | −3.502 | −4.013 | −3.722 |
| f7 | 5.412 | 5.340 | 5.241 | 5.116 | 4.808 | 4.373 | 4.407 |
| TTL | 17.002 | 17.000 | 17.001 | 17.003 | 16.999 | 17.001 | 17.000 |
| BFL | 2.272 | 2.296 | 2.351 | 2.501 | 2.680 | 2.891 | 2.752 |
| f | 1.910 | 1.909 | 1.909 | 1.908 | 1.910 | 1.908 | 1.910 |
| f number | 1.859 | 1.850 | 1.858 | 1.850 | 1.850 | 1.850 | 1.850 |
| ImgHT | 3.688 | 3.688 | 3.688 | 3.688 | 3.688 | 3.688 | 3.688 |
| HImH | 2.880 | 2.880 | 2.880 | 2.880 | 2.880 | 2.880 | 2.880 |
| FOV | 190.0 | 190.0 | 190.0 | 190.0 | 190.0 | 190.0 | 190.0 |
| HFOV | 180.0 | 180.0 | 180.0 | 180.0 | 180.0 | 180.0 | 180.0 |

| Elements | Eighth Embodiment | Ninth Embodiment | Tenth Embodiment | Eleventh Embodiment | Twelfth Embodiment | Thirteenth Embodiment | Fourteenth Embodiment |
|---|---|---|---|---|---|---|---|
| f1 | −6.699 | −6.956 | −7.290 | −7.576 | −7.518 | −7.554 | −7.570 |
| f2 | −4.732 | −8.579 | −8.906 | −5.722 | −5.648 | −5.642 | −5.649 |
| f3 | 9.503 | 9.482 | 10.489 | 6.586 | 6.565 | 6.543 | 6.555 |
| f4 | 7.893 | 8.634 | 9.275 | −5557.675 | −435.676 | −433.317 | −419.154 |
| f5 | 4.502 | 5.087 | 3.899 | 3.425 | 3.427 | 3.427 | 3.423 |
| f6 | −3.502 | −2.941 | −2.204 | −2.750 | −2.743 | −2.737 | −2.727 |
| f7 | 4.945 | 4.061 | 4.029 | 5.271 | 5.192 | 5.175 | 5.164 |
| TTL | 17.000 | 17.000 | 17.000 | 17.001 | 17.000 | 17.001 | 17.000 |
| BFL | 2.472 | 2.282 | 2.354 | 2.332 | 2.309 | 2.316 | 2.314 |
| f | 1.910 | 1.780 | 1.890 | 1.909 | 1.909 | 1.909 | 1.909 |
| f number | 1.850 | 1.850 | 1.850 | 1.859 | 1.859 | 1.859 | 1.859 |
| ImgHT | 3.688 | 3.688 | 3.688 | 3.688 | 3.688 | 3.688 | 3.688 |
| HImH | 2.880 | 2.880 | 2.880 | 2.880 | 2.880 | 2.880 | 2.880 |
| FOV | 190.0 | 190.0 | 190.0 | 190.0 | 190.0 | 190.0 | 190.0 |
| HFOV | 180.0 | 180.0 | 180.0 | 180.0 | 180.0 | 180.0 | 180.0 |

TABLE 30

| Conditional Expressions | First Embodiment | Second Embodiment | Third Embodiment | Fourth Embodiment | Fifth Embodiment | Sixth Embodiment | Seventh Embodiment |
|---|---|---|---|---|---|---|---|
| HFOV/L1S1ED | 16.9109 | 16.6914 | 16.6297 | 15.8786 | 15.8786 | 15.9490 | 15.8590 |
| L1S1ED/TTL | 0.6260 | 0.6344 | 0.6367 | 0.6667 | 0.6669 | 0.6638 | 0.6676 |
| FOV*f | 362.8639 | 362.7100 | 362.7100 | 362.5200 | 362.9000 | 362.5200 | 362.9000 |
| f1/f | −3.4685 | −3.5088 | −3.5540 | −3.5015 | −3.4979 | −3.6104 | −3.4628 |
| f1/f2 | 1.2939 | 1.3262 | 1.3849 | 1.3672 | 1.5037 | 1.6870 | 1.6437 |
| f1/f3 | −0.8409 | −0.7263 | −0.7028 | −0.6513 | −0.6125 | −0.5499 | −0.7017 |
| f1/f4 | −0.6513 | −0.7829 | −0.8549 | −0.8832 | −0.8789 | −1.0925 | −1.1186 |
| f/f6 | −0.5855 | −0.5835 | −0.5782 | −0.5609 | −0.5454 | −0.4755 | −0.5132 |
| f5/f6 | −1.2373 | −1.2474 | −1.2636 | −1.2762 | −1.2856 | −1.4960 | −1.6130 |
| V1 − V3 | 21.4070 | 24.8230 | 25.7650 | 27.3530 | 29.2240 | 29.2240 | 26.8640 |
| V5 − V6 | 35.7220 | 35.7220 | 35.7220 | 35.7220 | 35.7220 | 35.7220 | 35.7220 |
| ImgHT/TTL | 0.2169 | 0.2169 | 0.2169 | 0.2169 | 0.2170 | 0.2169 | 0.2169 |
| HFOV/TTL | 10.5870 | 10.5882 | 10.5876 | 10.5864 | 10.5889 | 10.5876 | 10.5882 |
| R1/R3 | −1.2214 | −1.1229 | −1.2274 | −1.2051 | −1.6223 | −1.9079 | −2.1467 |
| R3/R4 | −2.5079 | −2.7809 | −2.4693 | −2.6573 | −1.9738 | −1.5795 | −1.5238 |
| (R3 + R4)/(R3 − R4) | 0.4299 | 0.4710 | 0.4235 | 0.4531 | 0.3275 | 0.2246 | 0.2075 |
| (R5 + R6)/(R5 − R6) | 1.8493 | 2.0935 | 2.1675 | 1.6047 | 0.0969 | −0.4286 | −0.5295 |
| (R7 + R8)/(R7 − R8) | 3.3586 | 2.4370 | 2.1210 | 1.9993 | 1.9387 | 1.2154 | 1.1472 |
| (T2 + T3)/D23 | 2.6087 | 2.2968 | 2.1970 | 2.0724 | 2.3969 | 2.6940 | 3.3844 |
| (T3 + T4)/D34 | 3.6543 | 3.2199 | 2.8716 | 2.5709 | 2.5447 | 2.8114 | 3.0677 |
| (T4 + T5)/D45 | 32.3182 | 33.6455 | 33.4636 | 35.8273 | 35.3727 | 32.5727 | 31.4091 |
| T3/D34 | 1.8876 | 1.4721 | 1.2716 | 0.9622 | 0.9509 | 1.1280 | 1.4700 |
| T4/D45 | 15.1455 | 16.2545 | 15.8545 | 17.0091 | 16.5182 | 15.9000 | 15.2364 |
| D23/D67 | 1.5122 | 1.6705 | 1.8157 | 4.7245 | 7.1455 | 5.6308 | 5.3231 |
| D45/D67 | 0.1682 | 0.1830 | 0.2007 | 0.5612 | 1.0000 | 0.8462 | 0.8462 |

TABLE 31

| Conditional Expressions | Eighth Embodiment | Ninth Embodiment | Tenth Embodiment | Eleventh Embodiment | Twelfth Embodiment | Thirteenth Embodiment | Fourteenth Embodiment |
|---|---|---|---|---|---|---|---|
| HFOV/L1S1ED | 15.8842 | 15.0729 | 14.8197 | 14.5372 | 14.6437 | 14.6128 | 14.6175 |
| L1S1ED/TTL | 0.6666 | 0.7025 | 0.7145 | 0.7283 | 0.7231 | 0.7245 | 0.7244 |
| FOV*f | 362.9000 | 338.2000 | 359.1000 | 362.6910 | 362.6910 | 362.6910 | 362.6910 |
| f1/f | −3.5075 | −3.9081 | −3.8574 | −3.9690 | −3.9385 | −3.9574 | −3.9659 |
| f1/f2 | 1.4158 | 0.8108 | 0.8186 | 1.3240 | 1.3310 | 1.3390 | 1.3401 |
| f1/f3 | −0.7050 | −0.7336 | −0.6950 | −1.1504 | −1.1452 | −1.1546 | −1.1550 |
| f1/f4 | −0.8488 | −0.8057 | −0.7860 | 0.0014 | 0.0173 | 0.0174 | 0.0181 |
| f/f6 | −0.5454 | −0.6052 | −0.8575 | −0.6942 | −0.6959 | −0.6974 | −0.6999 |
| f5/f6 | −1.2856 | −1.7295 | −1.7691 | −1.2456 | −1.2492 | −1.2521 | −1.2551 |
| V1 − V3 | 26.8640 | 16.9910 | 23.6880 | 10.1180 | 9.7670 | 9.7790 | 9.7300 |
| V5 − V6 | 35.7220 | 37.9110 | 33.6390 | 35.7220 | 35.7220 | 35.7220 | 35.7220 |
| ImgHT/TTL | 0.2169 | 0.2169 | 0.2169 | 0.2169 | 0.2169 | 0.2169 | 0.2169 |
| HFOV/TTL | 10.5882 | 10.5882 | 10.5882 | 10.5876 | 10.5882 | 10.5876 | 10.5882 |
| R1/R3 | −1.3341 | −0.5185 | −1.5456 | −0.6315 | −0.6755 | −0.6791 | −0.6712 |
| R3/R4 | −2.3868 | −5.3566 | −0.9801 | −5.3900 | −4.9962 | −4.9638 | −5.0008 |
| (R3 + R4)/(R3 − R4) | 0.4095 | 0.6854 | −0.0100 | 0.6870 | 0.6665 | 0.6646 | 0.6667 |
| (R5 + R6)/(R5 − R6) | 1.0757 | 12.9775 | 6.7232 | 2.0387 | 2.0289 | 2.0591 | 2.0980 |
| (R7 + R8)/(R7 − R8) | 2.2308 | 1.9650 | 3.5039 | −95.7742 | −17.8989 | −17.8989 | −17.4000 |
| (T2 + T3)/D23 | 2.1156 | 1.0798 | 1.6610 | 2.2430 | 2.2930 | 2.2959 | 2.3047 |
| (T3 + T4)/D34 | 2.7614 | 9.0228 | 8.5237 | 4.5723 | 4.8338 | 4.5802 | 4.5860 |
| (T4 + T5)/D45 | 36.6909 | 13.9098 | 32.3182 | 25.2091 | 25.7636 | 25.2909 | 25.3091 |
| T3/D34 | 0.9918 | 4.7749 | 5.0355 | 3.5220 | 3.7234 | 3.5623 | 3.5669 |
| T4/D45 | 17.6000 | 5.8471 | 13.3818 | 7.5909 | 7.5909 | 7.2727 | 7.2727 |
| D23/D67 | 5.5688 | 19.5882 | 10.3588 | 14.5909 | 14.2727 | 14.2545 | 14.2000 |
| D45/D67 | 0.6875 | 2.1429 | 0.6471 | 1.0000 | 1.0000 | 1.0000 | 1.0000 |

According to the aforementioned embodiments, an imaging lens system having a relatively wide field of view and a relatively low f number may be implemented.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An imaging lens system, comprising:
a first lens having refractive power;
a second lens having a concave object-side surface;
a third lens having refractive power;

a fourth lens having a concave object-side surface;
a fifth lens having refractive power;
a sixth lens having a concave object-side surface; and
a seventh lens having refractive power,
wherein the first to the seventh lenses are disposed in sequential order from an object side,
wherein a field of view is 190 degrees or more, and
wherein $-4.0<f1/f<-3.0$, where f is a focal length of the imaging lens system and f1 is a focal length of the first lens.

2. The imaging lens system of claim 1, wherein the first lens has a convex object-side surface.

3. The imaging lens system of claim 1, wherein the third lens has a convex image-side surface.

4. The imaging lens system of claim 1, wherein the fifth lens has a convex object-side surface.

5. The imaging lens system of claim 1, wherein the seventh lens has a convex object-side surface.

6. The imaging lens system of claim 1, wherein a conditional expression as below is satisfied:

$$0<f1/f2,$$

where f2 is a focal length of the second lens.

7. The imaging lens system of claim 1, wherein a conditional expression as below is satisfied:

$$f1/f3<0,$$

where f3 is a focal length of the third lens.

8. The imaging lens system of claim 1, wherein a conditional expression as below is satisfied:

$$15<V1-V3,$$

where V1 is an Abbe number of the first lens, and V3 is an Abbe number of the third lens.

9. The imaging lens system of claim 1, wherein a conditional expression as below is satisfied:

$$30<V5-V6,$$

where V5 is an Abbe number of the fifth lens, and V6 is an Abbe number of the sixth lens.

10. The imaging lens system of claim 1, wherein a conditional expression as below is satisfied:

$$-168 \text{ mm}<f1234<23.0 \text{ mm},$$

where f1234 is a combined focal length of the first to fourth lenses.

11. The imaging lens system of claim 1, wherein a conditional expression as below is satisfied:

$$3.5 \text{ mm}<f567<7.0 \text{ mm},$$

where f567 is a focal length of the fifth to seventh lenses.

12. An imaging lens system, comprising:
a first lens having refractive power;
a second lens having refractive power;
a third lens having refractive power;
a fourth lens having a concave object-side surface;
a fifth lens having refractive power;
a sixth lens having a concave object-side surface; and
a seventh lens having refractive power,
wherein the first to the seventh lenses are disposed in sequential order from an object side,
wherein f number is equal to or less than 1.9, and a field of view (FOV) is equal to or greater than 190 degrees,
wherein a conditional expression as below is satisfied:
$$-3.0<R1/R3<-0.4,$$
where R1 is a radius of curvature of an object-side surface of the first lens, and R3 is a radius of curvature of an object-side surface of the second lens, and
wherein $-4.0<f1/f<3.0$, where f is a focal length of the imaging lens system and f1 is a focal length of the first lens.

13. The imaging lens system of claim 12, wherein the third lens has a convex image-side surface.

14. The imaging lens system of claim 12, wherein a conditional expression as below is satisfied:

$$330° \text{ mm}<FOV*f<370° \text{ mm}.$$

15. The imaging lens system of claim 12, wherein a conditional expression as below is satisfied:

$$0.6<f1/f2<2.0,$$

where f2 is a focal length of the second lens.

16. An imaging lens system, comprising:
a first lens having negative refractive power and a convex object-side surface;
a second lens having negative refractive power and a concave object-side surface;
a third lens having positive refractive power and a convex image-side surface;
a fourth lens having a concave object-side surface;
a fifth lens having positive refractive power and a convex image-side surface;
a sixth lens having negative refractive power and a concave object-side surface; and
a seventh lens having positive refractive power and a convex object-side surface,
wherein the first to the seventh lenses are disposed in sequential order from an object side, and
wherein $-4.0<f1/f<-3.0$, where f is a focal length of the imaging lens system and f1 is a focal length of the first lens.

17. The imaging lens system of claim 16, wherein the fourth lens has positive refractive power.

18. The imaging lens system of claim 16, wherein the fourth lens has negative refractive power.

19. The imaging lens system of claim 16, wherein f number is equal to or less than 1.9, and a field of view (FOV) is equal to or greater than 190 degrees.

* * * * *